US012184666B2

(12) United States Patent
Mutolo et al.

(10) Patent No.: US 12,184,666 B2
(45) Date of Patent: *Dec. 31, 2024

(54) MALICIOUS HOMOGLYPHIC DOMAIN NAME DETECTION AND ASSOCIATED CYBER SECURITY APPLICATIONS

(71) Applicant: Centripetal Networks, LLC, Portsmouth, NH (US)

(72) Inventors: Vincent Mutolo, Portsmouth, NH (US); Alexander Chinchilli, Medford, MA (US); Sean Moore, Hollis, NH (US); Matthew Sparrow, Virginia Beach, VA (US); Connor Tess, Merrimack, NH (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,800

(22) Filed: Feb. 13, 2024

(65) Prior Publication Data

US 2024/0187422 A1   Jun. 6, 2024

Related U.S. Application Data

(63) Continuation of application No. 18/222,901, filed on Jul. 17, 2023, which is a continuation of application
(Continued)

(51) Int. Cl.
*H04L 9/00*   (2022.01)
*H04L 9/40*   (2022.01)
*H04L 61/4511*   (2022.01)

(52) U.S. Cl.
CPC .......... *H04L 63/14* (2013.01); *H04L 61/4511* (2022.05); *H04L 63/1416* (2013.01); *H04L 63/1433* (2013.01); *H04L 63/1483* (2013.01)

(58) Field of Classification Search
CPC ............. H04L 63/1416; H04L 63/1433; H04L 63/1483
(Continued)

(56) References Cited

U.S. PATENT DOCUMENTS 8,275,362 B2   9/2012  Longe et al.
8,707,426 B1 *  4/2014  Ramzan .................. G06F 21/51
                                                    726/17
(Continued)

FOREIGN PATENT DOCUMENTS

CN   108632227 A   10/2018
EP   3681121 A1   7/2020
(Continued)

OTHER PUBLICATIONS

"IDN Homograph Attack." Wikipedia. Sep. 21, 2022. <https://en.wikipedia.org/wiki/IDN_homograph_attack>.
(Continued)

*Primary Examiner* — Christopher J Brown
(74) *Attorney, Agent, or Firm* — Banner & Witcoff, Ltd.

(57) ABSTRACT

Malicious homoglyphic domain name (MHDN) detection and associated cyber security applications are described. A domain name may be received that may be a potential MHDN. Homoglyphic domain name detection may be performed by, for example, generating a normalized character string corresponding to the input domain name by applying one or more normalization operations to the input domain name, wherein the one or more normalization operations may be configured to reduce homoglyphic characteristics in the input domain name; and generating a plurality of segmentations of the normalized character string, wherein generating each segmentation, of the plurality of segmentations, may comprise segmenting the normalized character string into a respective plurality of segments, and wherein each
(Continued)

Illustrative environment for MHDN Detection and Generation and Associated Protections segmentation may comprise a different plurality of segments. A segmentation may be selected based on cost values corresponding to each respective segmentation determined using a cost function. The received domain name may be determined to be a homoglyphic domain name based on a determination that one or more segments of the selected first segmentation match a base of a known domain name in the at least one list of known domain names.

30 Claims, 22 Drawing Sheets

Related U.S. Application Data

No. 17/946,900, filed on Sep. 16, 2022, now Pat. No. 11,757,901.

(60) Provisional application No. 63/345,719, filed on May 25, 2022, provisional application No. 63/245,074, filed on Sep. 16, 2021.

(58) Field of Classification Search
USPC .......................................................... 726/23
See application file for complete search history.

(56) References Cited

U.S. PATENT DOCUMENTS

| | | | |
|---|---|---|---|
| 9,882,933 | B1 | 1/2018 | Schiffman |
| 10,200,405 | B2 | 2/2019 | Schiffman |
| 10,320,815 | B2 | 6/2019 | Wallace, III |
| 10,505,968 | B2 | 12/2019 | Oberheide |
| 10,862,907 | B1 | 12/2020 | Pon et al. |
| 11,012,414 | B2 | 5/2021 | Moore et al. |
| 11,082,448 | B2 | 8/2021 | Bagarolo et al. |
| 11,212,313 | B2 | 12/2021 | Schulman et al. |
| 2007/0283000 | A1 | 12/2007 | Proux et al. |
| 2016/0352772 | A1 | 12/2016 | O'Connor |
| 2017/0126730 | A1 | 5/2017 | Oberheide |
| 2017/0237765 | A1 | 8/2017 | Oberheide |
| 2017/0310709 | A1* | 10/2017 | Foxhoven ............... H04L 63/10 |
| 2018/0027013 | A1 | 1/2018 | Wright et al. |
| 2018/0069883 | A1* | 3/2018 | Meshi ................. H04L 63/1425 |
| 2018/0337947 | A1 | 11/2018 | Schiffman |
| 2019/0019058 | A1 | 1/2019 | Woodbridge et al. |
| 2019/0020682 | A1 | 1/2019 | Edwards et al. |
| 2020/0228500 | A1 | 7/2020 | Olumofin |
| 2020/0252428 | A1 | 8/2020 | Gardezi et al. |
| 2020/0314122 | A1 | 10/2020 | Jones et al. |
| 2020/0351242 | A1 | 11/2020 | Huang et al. |
| 2021/0120035 | A1* | 4/2021 | Onut .................... H04L 63/1483 |
| 2021/0240836 | A1 | 8/2021 | Hazony et al. |
| 2022/0182410 | A1 | 6/2022 | Tupsamudre et al. |
| 2022/0239693 | A1 | 7/2022 | Livingood |
| 2022/0394060 | A1 | 12/2022 | Berger et al. |
| 2023/0028490 | A1* | 1/2023 | Diffloth ............... H04L 63/1416 |
| 2023/0188563 | A1 | 6/2023 | Sircar |
| 2023/0275922 | A1 | 8/2023 | Choi et al. |
| 2023/0359330 | A1 | 11/2023 | Haworth et al. |
| 2024/0048579 | A1 | 2/2024 | Weber et al. |

FOREIGN PATENT DOCUMENTS

| | | |
|---|---|---|
| JP | 2020095458 A | 6/2020 |
| WO | 2014074317 A1 | 5/2014 |
| WO | 2016164050 A1 | 10/2016 |
| WO | 2018213574 A1 | 11/2018 |
| WO | 2019038755 A1 | 2/2019 |
| WO | 2024068238 A1 | 4/2024 |

OTHER PUBLICATIONS

"Password Manager Password-Displaying Font Has Ambiguous Characters." Bugzilla. Retrieved Oct. 24, 2022. <https://bugzilla.mozilla.org/show_bug.cgi?id=242418>.

No Homo-Graph_Chrome Web Store. Retrieved Oct. 24, 2022. https://chrome.google.com/webstore/detail/no-homo-graph/knkgpopkjopfceiagfeneimdpeeiffej?hl=en.

Prins, Frank. "The Difficulties With Solving the Domain Names Homograph Attack." Apr. 4, 2019. <https://prinsfrank.nl/2019/04/04/The-difficulties-with-solving-the-domain-names-homograph-attack>.

Cimpanu, Catalin. "Chrome Extension Detects URL Homograph (Unicode) Attacks." Mar. 26, 2018. <https://www.bleepingcomputer.com/news/security/chrome-extension-detects-url-homograph-unicode-attacks/>.

Hu, Hang et al. "Assessing Browser-Level Defense Against IDN-Based Phishing." Retrieved Oct. 24, 2022. <https://gangw.cs.illinois.edu/sec21-b.pdf>.

"DNSTWISTER, The Anti-Phishing Domain Name Search Engine and DNS Monitoring Service." Retrieved Oct. 24, 2022. <https://dnstwister.report/>.

"DomainTools." Retrieved Oct. 24, 2022. <https://www.domaintools.com/products/iris-detect> .

Yazdani, Ramin et al. "A Case of Identity: Detection of Suspicious IDN Homograph Domains Using Active DNS Measurements," retrieved Jan. 19, 2023, <https://ieeexplore.ieee.org/document/9229740>.

Suzuki, Hiroaki et al., "ShamFinder: An Automated Framework for Detecting IDN Homographs," retrieved Jan. 19, 2023, <https://arxiv.org/pdf/1909.07539.pdf>.

"Homoglyph Detection," retrieved Jan. 19, 2023, <https://d3fend.mitre.org/technique/d3f:HomoglyphDetection/>.

Woodbridge, Jonathan et al., "Detecting Homoglyph Attacks with a Siamese Neural Network." retrieved Jan. 19, 2023, Detecting Homoglyph Attacks with a Siamese Neural Network | Request PDF (researchgate.net) <https://www.researchgate.net/publication/326854646_Detecting_Homoglyph_Attacks_with_a_Siamese_Neural_Network>.

Jan. 4, 2023—(WO) International Search Report and Invitation to Pay Additional Fees—App. No. PCT/US2022/043886.

Feb. 27, 2023—(WO) International Search Report and Written Opinion—App. No. PCT/US2022/043886.

Tran et al. "Detection device, detection method, and detection program". JP-2020095458-A. English translation. 2020. (Year: 2020).

\* cited by examiner

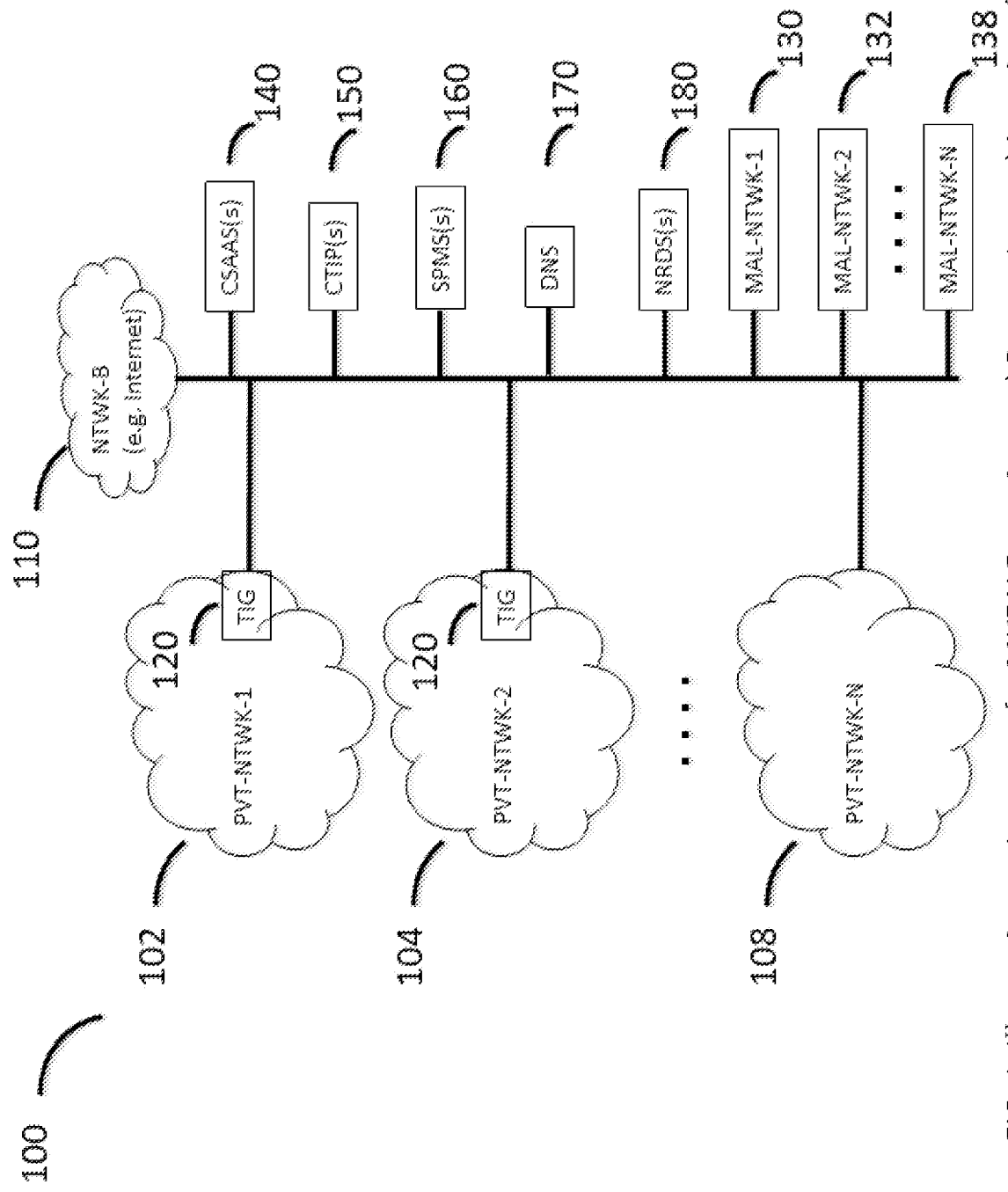
FIG. 1: Illustrative environment for MHDN Detection and Generation and Associated Protections

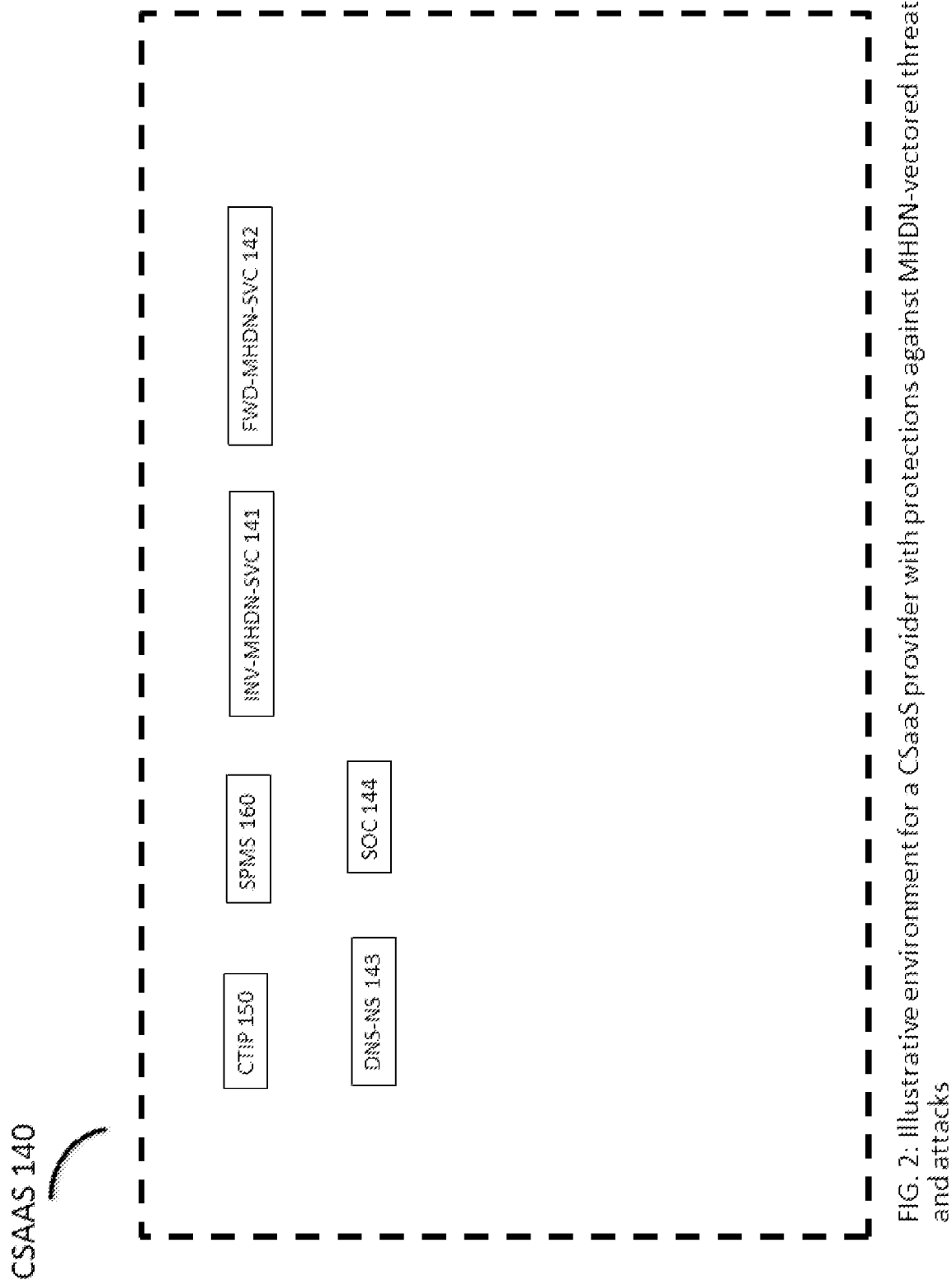
FIG. 2: Illustrative environment for a CSaaS provider with protections against MHDN-vectored threats and attacks

MALICIOUS HOMOGLYPHIC DOMAIN NAME DETECTION AND ASSOCIATED CYBER SECURITY APPLICATIONS

CROSS-REFERENCE TO RELATED APPLICATIONS

This application is a continuation of U.S. patent application Ser. No. 18/222,901, filed Jul. 17, 2023, which is a continuation of and claims the benefit of U.S. patent application Ser. No. 17/946,900, filed Sep. 16, 2022, now U.S. Pat. No. 11,757,901, which is a continuation of and claims the benefit of U.S. Provisional Application No. 63/245,074, filed Sep. 16, 2021 and titled "System and Method for Efficient Detection of Malicious Homoglyphic Domain Names," and U.S. Provisional Application No. 63/345,719, filed May 25, 2022 and titled "System and Method for Efficient Detection and Generation of Malicious Homoglyphic Domain Names." Each of the above-referenced applications is hereby incorporated by reference in its entirety.

BACKGROUND

Malicious actors often register and record so-called "homoglyph" domain names (e.g., domain names in the Internet Domain Name System (DNS) that bear visual or semantic resemblance to popular, trusted, or authoritative domain names) in order to deceive Internet users and imitate the trusted site. Hereinafter, these domain names may be referred to as "malicious homoglyphic domain names" (MHDNs). MHDNs may often be used, for example, in phishing and/or spear phishing attacks, such as when URL links to malicious sites are included in e-mails. A user may be deceived into clicking the link because the domain name or hostname included in the link appears to be, or is mis-perceived to be, the name of a domain that the user trusts.

For example, suppose "www.fruit.com" is the subdomain name for the public website of "Fruit Inc.", a well-known consumer electronics products company. A malicious actor may register (in DNS) the (base) domain name "fru1t.com", where for example the letter "i" has been replaced by the numeric character "1". The malicious actor may then create/record an "A" resource record entry in the DNS for the fully qualified domain name (FQDN) "www.fru1t.com", thereby associating an IPv4 address to which "www.fru1t.com" will resolve, and may configure a malicious web server named "www.fru1t.com" (which is configured with the DNS-resolved IPv4 network address). Since "fru1t" is visually similar to "fruit", some users may be tricked into clicking a URL link that uses "www.fru1t.com" as the hostname because they mis-perceive the hostname to be "www.fruit.com", which they trust. The malicious web site may prompt the unsuspecting user, for example, to provide sensitive credentials and other personal information.

Frequently used methods to create MHDNs may comprise replacing characters in a trusted domain with different characters that are visually similar (which may be termed "confusable characters" or "confusables") (e.g., "fru1t.com"); intentionally misspelling the trusted domain name (e.g., "friut.com"), and/or using the trusted domain name in subdomain labels of the maliciously crafted domain (e.g., "fruit.mymail.com").

MHDN-vectored threats and attacks (e.g., phishing and spear phishing attacks) have long been and continue to be a significant cyber risk. MHDN-vectored threats and attacks may be difficult to defend against. For example, malicious actors may use MHDN generation techniques that produce MHDNs that may be difficult for automated systems (and/or humans) to recognize as MHDNs. Accordingly, efficient and effective cyber protections from MHDN-vectored threats and attacks may not be readily available. Malicious actors currently benefit from a mostly free reign to carry out MHDN-vectored attacks. Thus, comprehensive, reliable, accurate, fast, and efficient automated methods for detecting and generating MHDNs for use in protecting networks from MHDN-vectored threats and associated attacks are needed.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to techniques for detecting and/or generating malicious and/or deceptive domain names that may be used in MHDN-vectored threats and/or attacks. The detection techniques may provide for highly efficient, accurate, and/or automated processes that, for example, may process any quantity (e.g., hundreds, thousands, millions, etc.) of domain names in a short duration (e.g., less than a second to process thousands of domain names). These techniques may be parameterized such that the performance of MHDN detection processes may be adapted to various cybersecurity applications with different performance requirements. The detection and/or generation techniques may provide for protections from MHDN-vectored threats and/or attacks.

Consider the following three archetypal MHDNs of trusted domain name example.com that correspond to the methods described above: confusable (e.g., badactor.exampIe.com), misspelling (e.g., badactor.exomple.com), and trusted domain name as subdomain (e.g., example.com.badactor.com). Internet users, on light inspection, often may not differentiate between imitating (such as in the above examples) and legitimate domains (e.g., example.com above). Malicious actors may exploit human misperception factor(s), for example, to trick human users into clicking on a link (e.g., uniform resource location (URL) link) that may be embedded in an e-mail or document that contains an MHDN. Clicking the link may connect the user to a malicious web site instead of a legitimate, trusted web site that the human user thought they were going to access when they clicked the link. This example describes a form of a phishing attack.

In the context of defending and/or protecting networks from adverse effects of MHDN-vectored threats and/or attacks, there are at least two general problems to solve: (1) the "Forward-MHDN" problem, and (2) the "Inverse-MHDN" problem. The Forward-MHDN problem may address a scenario where, given a legitimate, trusted domain name as input, a desired output comprises a set of potential MHDNs that are (a) resolvable (e.g., registered and recorded) in the Internet Domain Name System (DNS), and/or (b) currently not resolvable in the DNS but in the future are likely to be registered or recorded in the DNS by malicious actors for use in MHDN-vectored attacks. Addressing the Forward-MHDN problem, as described in solutions herein, may advantageously provide data to an MHDN detection system in order to provide improvements in MHDN detection such as increased accuracy and/or increased efficiency. The "Inverse-MHDN" problem may address a scenario where, given an MHDN as an input, a desired output comprises, for example: an indication that the received domain name is an MHDN (e.g., a warning indication and/or an indication for analysis and/or remediation by a cybersecurity application), a replacement with a legitimate, trusted domain name that the MHDN is maliciously imitating (e.g., directing the user to the trusted, legitimate domain name that was imitated by the MHDN), and/or a replacement with a legitimate domain name for a server configured by a cybersecurity administrator to signal an attempted access of a malicious site. Addressing the Inverse-MHDN problem, as described in solutions herein, may provide advantages such as: enabling a user to quickly proceed to the legitimate, trusted domain name intended while avoiding proceeding to the MHDN, and in turn, avoiding a potentially malicious threat and/or attack; and/or re-directing a user to a legitimate site that may signal the user and the user's cybersecurity administrator that they attempted to access a malicious site.

An MHDN generator may be used, for example, to address the Forward-MHDN problem. A Forward-MHDN problem may be addressed by a Cyber-Security-as-a-Service (CSaaS) provider. The CSaaS provider may offer various protections to its subscribers/customers from associated MHDN-vectored threats and/or attacks. For example, if a CSaaS provider has a Forward-MHDN solution that may identify MHDNs targeting the CSaaS provider's subscribers/customers that are registered or recorded in the DNS, but that are not known to cyber threat intelligence (CTI) providers, and/or that are likely to be used in attacks (e.g., spear phishing attacks) on the CSaaS provider's subscribers/customers, then the CSaaS provider may be able to offer even stronger cyber protections to its subscribers/customers. Additionally or alternatively, a Forward-MHDN solution may indicate/identify one or more potential MHDNs that may be targeting a CSaaS provider's subscribers/customers that are not (yet) registered or recorded in the DNS, but that are likely to be registered or recorded by malicious actors for use in MHDN-vectored attacks. A CSaaS provider may use such potential MHDNs to proactively protect its subscribers/customers.

An MHDN detector may be used, for example, to address the Inverse-MHDN problem. An Inverse-MHDN problem may be addressed by an MHDN detector that may operate at the necessary scale, speed, and/or quality for applications related to a CSaaS provider that may protect subscribers/customers (e.g., subscriber/customer networks) from cyber threats and/or attacks. One or more features of an MHDN generator may be used to enhance one or more features of an MHDN detector, such as an input to an MHDN detector providing data for use in more efficiently and/or accurately detecting MHDNs. One or more features of an MHDN detector may be used to enhance one or more features of an MHDN generator, such as an output of an MHDN detector providing data for use in more efficiently and/or accurately generating MHDN(s).

An example Inverse-MHDN solution described herein may detect potential MHDNs in databases of newly or recently registered (in the DNS) domain names. Such domain names may be registered by malicious actors with the intent of using them (soon) in MHDN-vectored attacks; however, these domain names may not yet be included in CTI either because they have not yet been used in attacks or because they have been used in attacks but have not yet been detected by CTI providers and/or published in the providers' CTI feeds. By applying an Inverse-MHDN solution to a database of newly registered domain names, a CTI provider may discover MHDNs that have not yet been used in attacks and then publish the MHDNs in a CTI feed. Subscribers to the CTI feed, for example a CSaaS provider, may then use these MHDNs in their cybersecurity applications to proactively protect their networks from any associated MHDN-vectored attacks.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIG. 1 shows an example network for MHDN detection, generation, and/or associated protections;

FIG. 2 shows an example CSaaS network;

DETAILED DESCRIPTION

Figure 3A:
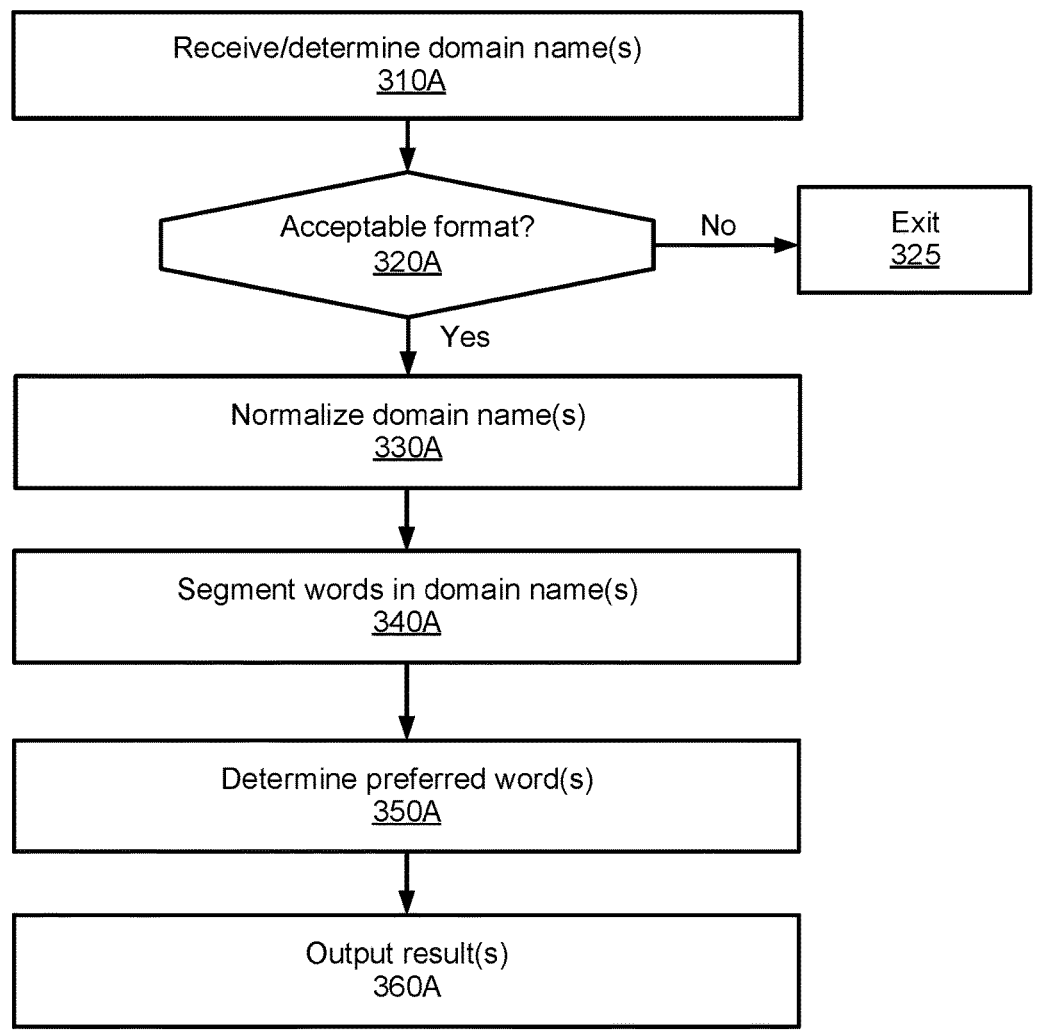
FIGS. 3A-3D show example methods for MHDN detection and/or Inverse-MHDN.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure. In addition, reference is made to particular applications, protocols, and embodiments in which aspects of the disclosure may be practiced. It is to be understood that other applications, protocols, and embodiments may be utilized, and structural and functional modifications may be made, without departing from the scope of the disclosure. It is to be understood that networks may be any combination of physical or virtual, wired or wireless, logical or actual, on-premises or in the cloud, and geographically or logically distributed.

MHDN processes may comprise Inverse-MHDN (INV-MHDN) and/or Forward-MHDN (F-MHDN). Inverse-MHDN may comprise MHDN detection and/or generation of one or more non-MHDNs. Forward-MHDN may comprise generation of one or more MHDNs based on one or more non-MHDNs. One or more MHDNs generated in Forward-MHDN may be used to detect and/or protect against the MHDN(s), for example, by assisting in identification of MHDNs received as an input, such as in training an MHDN detection system. MHDN detection, generation, and/or associated protections are described further below with reference to the following figures. One or more MHDN creation methods computed/determined in Inverse-MHDN may be used to generate and/or protect against MHDN(s), for example, by assisting in generation of MHDNs derived from legitimate trusted domains names received as input to Forward-MHDN processes, such as in training and evaluation in an MHDN generation system.

One or more systems, apparatuses, methods and/or computer readable media herein may be used for an Inverse-MHDN solution. An Inverse-MHDN solution may detect various types of MHDNs in "soft real time", such as in single-digit milliseconds on average. An inverse-MHDN solution may comprise as an input one or more potential MHDNs (e.g., badactor.example.com), and/or may produce as one or more outputs the "inverse homoglyph", such as the trusted name that the malicious domain was imitating (e.g., example.com). The one or more outputs may comprise metadata associated with the inverse homoglyph such as confidence scores and/or information about the associated MHDN creation techniques that may have been used by malicious actors.

An example Inverse-MHDN solution may apply one or more approaches to protect users, such as via packet-filtering and/or retroactive action(s). For example, one or more MHDNs may be identified "inline" as traffic passes through a packet-filtering device (which may be, for example, a RuleGATE® device or any other device configured as a CTI gateway, or a packet-filtering device with a deep packet inspection (DPI) capability to recognize domain names contained in application-level packets, etc.). Packet-filtering may help protect users from accessing malicious sites. This approach may utilize a specially tuned variant of an MHDN detector/Inverse-MHDN solution to match one or more performance requirements of, for example, soft-real-time detection (e.g. ≈1 ms average detection speed, ≈10 ms average detection speed if a packet contains a DNS query request), and/or any other detection speed). An (e.g., inline) MHDN detector/Inverse-MHDN solution may comprise a fast lookup (e.g., O(1)) cache that may comprise known MHDNs and/or associated information (e.g., inverse homoglyph(s)), such that any cache hit may result in near-instantaneous detection (e.g., a few microseconds or less). In such a configuration, an MHDN detector may be able to find potential MHDNs if/when they are detected/observed in in-transit packets and/or an MHDN detector may dynamically determine to allow or block access to the associated domains based on information about the domain names' likelihoods to be actual MHDNs of trusted sites and/or other contextual information. This operation may enable preemptive and/or proactive measures against an associated threat and/or attack, which may not only alert users to one or more potential compromises but may also prevent them altogether.

As another example, MHDN detection technology may be applied retroactively. For example, MHDN detection technology may be applied retroactively to domain names used to access domains by, for example, users associated with a CSaaS subscriber/customer network. If/when cyber threat detection technology (such as RuleGATE® technology) may be used to protect a network, recorded domain names may have already "matched" on CTI, and thus may have some baseline non-zero level of suspicion and/or threat risk. Using MHDN detection processes described herein, network communication events associated with domain names that may be imitating a trusted domain name (for example, potential MHDNs) may be identified/detected and presented to human cyber analysts for review (e.g., with priority over other events associated with domain names that may not be MHDNs). This process may lead to a large acceleration in the cyber analysts' workflow, for example, improvements in a cyber analyst's efficiency and/or effectiveness in protecting a network from cyber threats and attacks.

Inverse-MHDN solutions described herein may be implemented using segmentation and cost functions. For example, an Inverse-MHDN solution may "segment" character strings, for example domain names, into their component words. For example, "apple", "google", and "microsoft" may be segmented from a string "applegooglemicrosoft". Words may be identified and/or segmented even in the presence of errors, such as in a string of misspelled words in "appegoglemacrosoft". Additionally or alternatively, a cost function may encode knowledge specific to a particular cybersecurity application to find what may be deemed to be the most important words in a string, which may provide advantages such as increased efficiency and/or accuracy in MHDN detection.

As described herein, a domain name may be analyzed to detect an MHDN and/or to generate another domain name (e.g., a non-MHDN and/or an MHDN based on a domain name input). A domain name may be analyzed based on syntax of the domain name. Domain name syntax (e.g., MHDN syntax) from one or more sources may be used. For example, an official standardized terminology for domain names syntax, such as described in relevant RFCs, may be used. An official standardized terminology for domain names syntax may be insufficient such that additional or alternative syntax may be used. For example, the DNS community at large has developed de facto standard terminology for several concepts, such as the public suffix list (PSL), the effective top-level domain (eTLD), and/or other concepts, for describing new DNS-related concepts and/or technology. Accordingly, as described herein, efficient and/or useful terminology may be used for syntax. For brevity, the understanding of a person of ordinary skill in the art of DNS and/or of domain name syntax and/or semantics may be assumed. Standard and/or de facto standard terminology may be mixed with terminology used herein, either explicitly or implicitly. The term "(sub)domain" may be used to mean "(sub)domain name," as this is common parlance/jargon by persons of ordinary skill in the art. Context may be used to disambiguate syntax described herein.

A CSaaS provider may offer one or more cyber protections, such as network protections for cyber threats and/or attacks, to its subscribers/customers. A general approach to network protections that a CSaaS provider may employ may comprise the following procedures. A CSaaS may collect cyber threat intelligence (CTI). CTI may comprise information in the form of IP addresses, domain names, URLs, and/or any other information of known cyber threats. A CSaaS may translate the CTI into one or more packet filtering rules. A CSaaS may configure one or more inline packet filtering devices located at one or more Internet access points in subscriber(s)' network(s) with one or more rules and/or policies. A CSaaS may apply the rules and/or policies to traffic (e.g., all packet traffic) between a subscriber's network and the Internet. Any in-transit packet that matches a CTI-based rule may have the rule's/policy's protective action(s) (e.g., block, allow, log, capture, etc., the packet) applied to it and/or to the other packets in the same flow (e.g., packets with the same 5-tuple values) as the CTI-matching packet. The associated flow of packets may be called a threat event. The associated packet logs may be aggregated into a threat event log. The threat event logs may be sent to a security operations center (SOC). The SOC may be operated by the CSaaS provider, for example, for processing, analysis, and/or remediation of the associated threat and/or attack.

An example of an Inverse-MHDN solution described herein may involve a CSaaS provider. The CSaaS provider may identify domain names in its subscribers'/customers' threat event logs that are (potential) MHDNs. The CSaaS may augment the threat event log(s) accordingly (for example, by increasing the likelihood that the threat event may be investigated by a human cyberanalyst for possible reporting to the associated CSaaS subscriber/customer). Another example application of an Inverse-MHDN solution described herein is that the CSaaS provider may apply a solution to all domain names in CTI databases that it collects from CTI providers. The CSaaS provider may enhance/augment the CTI associated with any domain names that are potential MHDNs. CTI providers may not identify whether a domain name in their CTI is a (potential) MHDN. But these applications described herein may comprise the CSaaS provider applying the Inverse-MHDN solution to domain names that are contained in packets being filtered by packet-filtering devices at CSaaS providers' customer networks, and/or that are included in CTI that is applied to packets by the packet-filtering devices. A CSaaS provider may use other Inverse-MHDN-based applications with a broader scope of applicability, and/or in different contexts, as described further herein.

CTI may be supplied by one or more CTI provider organizations. CTI may comprise network threat intelligence reports and/or associated network threat indicators in the form of IP addresses, 5-tuples, domain names, URLs, and/or any other form, of hosts and/or resources that may be associated with network threats and/or attacks. CTI consumers, such as network administrators, cyberanalysts, cybersecurity applications, CSaaS providers, and/or any other entity or device may use CTI to identify and/or remediate threats and/or attacks on the network(s) they are protecting. CTI providers may supply network threat indicators in structured files and/or streams that may be referred to as CTI feeds. A CTI feed may be characterized by indicator type (e.g., TP address, domain name, URL, etc.), threat type (e.g., ransomware, botnet, reconnaissance, etc.), confidence level (e.g., low, medium, high), and/or any other characteristic.

At least some CSaaS providers may only be applying an Inverse-MHDN solution to a (small) subset of the domain names that may be contained in packets that may be filtered by packet-filtering devices. For example, an Inverse-MHDN solution may be applied to fewer than all domain names (e.g., a small subset of domain names) based on one or more of: the CTI may have gaps (e.g., significant gaps) in coverage of MHDNs; a CSaaS provider may apply an Inverse-MHDN solution only to domain names that are contained in packets being filtered by packet-filtering devices at CSaaS providers' customer networks and/or that are included in CTI that is applied to packets by the packet-filtering devices; and/or a small quantity of network communications (e.g., typically only a few percentage points of network communications) may correspond to the CTI. Accordingly, there may be many MHDNs in the network communications at CSaaS subscriber/customer sites that may not be detected. These (undetected) MHDNs may be domain names that may be recorded in the DNS (e.g., by malicious actors) and/or that may be actively used, for example, in phishing attacks, before they have been identified by CTI providers as malicious and/or as threat indicators. Thus, these undetected MHDNs may not be in CTI feeds of domain names. At least some CTI feeds may include domain names that are MHDNs but are not identified as such by the associated CTI providers. Furthermore, there may be MHDNs (e.g., many MHDNs) that may be recorded in the DNS that are not recognized as such by CTI providers and, thus, that are not included in one or more CTI feeds (e.g., are not included in any CTI feeds).

At least some examples described herein may be characterized as "offline" applications in the sense that the Inverse-MHDN solution may not be applied to active network communications. For example, at least some examples described herein may comprise Inverse-MHDN solutions that may be applied to in-transit packets that may comprise domain names. A sufficiently efficient Inverse-MHDN solution may be applied "inline" to active network communications to detect MHDNs and then potentially stop and/or mitigate the associated threat or attack. For example, an in-transit packet containing a DNS query request to resolve a domain name may be filtered by an Inverse-MHDN process (for example, that may be executed by a DNS proxy or a packet filtering device) to determine if the domain name is a potential MHDN. If the domain name is determined to be a potential MHDN, then the associated threat/attack may be mitigated by, for example, preventing the request from accessing the DNS and/or by allowing the request to access the DNS but then monitoring subsequent network communications for the MHDN and its associated/resolved IP address.

To assist with the description of domain name syntax, and ultimately the detection and/or generation of MHDNs described herein, the following (simple) first example is provided: "www.fruit.com". At a highest level, a domain name syntax/schema (e.g., for a public DNS) may comprise a list (e.g., an ordered list) and/or sequence of labels that may be separated/delimited by "." (i.e., the dot character). Labels may be comprised of (case-insensitive) alphanumeric characters Aa-Zz and 0-9 and the hyphen "-" character. The root domain name may be empty and may be indicated by a single rightmost dot, which may be implicit (e.g., is usually implicit, e.g., may not be present) in (non-root) domain names. A label to the left of the root (e.g., every label to the left of the root) may comprise the name of a subdomain of the domain to the right of the subdomain name. For example, in www.fruit.com, "com" is a subdomain of the implicit "." root domain; "fruit" is a subdomain of the ".com" domain; and "www" is a subdomain of the ".fruit.com" domain.

In practice, subdomains and/or groups of successive subdomains may have (e.g., may often have) standard and/or de facto standard names that may be well-known/well-understood by persons of ordinary skill in the art. For example, a rightmost label, or rightmost subdomain name, may be called (e.g., is often called) the top-level domain (TLD) name. For example, the TLD for www.fruit.com is ".com". The next label to the left of the TLD may be called the primary domain name label (PDNL), which in the first example is "fruit". In typical practice, for an enterprise organization, the PDNL may be (e.g., will often be) the (trusted) familiar name of the (well-known/popular) enterprise or its brand to Internet users (e.g., that may be the targets/victims of MHDN-vectored threats and/or attacks). Accordingly, the PDNL may be targeted by malicious actors for creation of associated MHDNs. The next label to the left of the PDNL may be called (e.g., is often called) the subdomain name label, which in this case is "www". Thus, a syntax/schema for describing such simple domain names may be <subdomain-name>.<pdnl>.<tld>.

Some familiar well-known TLDs include ".com", ".org", ".gov", ".net", and ".edu". Any TLD may be used, for example, including any TLD listed herein and/or any other TLD. A TLD (e.g., each TLD) may be associated with a (DNS) domain name registrar. A domain name registrar may sell its services to the public. An Internet user, such as a private enterprise named "Fruit, Inc.", that may want to register a domain name "fruit.com" in the DNS may do so through the ".com" registrar. In this example, Fruit Inc. could then own the domain name fruit.com, as administered by the registrar. Fruit Inc. may then, via the registrar, create resource records, and/or entries, in the DNS that, for example, associate fruit.com with an IP address. Fruit Inc. may also create a subdomain of fruit.com, such as www.fruit.com, by creating/recording a resource record, or an entry, in the DNS, that associates www.fruit.com with an IP address. An Internet user (e.g., any Internet user), for example, who may be operating a web browser application, and/or any computing device may then use the DNS to look up the IP address of www.fruit.com and, for example, route packets containing a web session through the Internet to the web site www.fruit.com. Thus, DNS may resolve www.fruit.com to an IP address.

Historically, as the need for delegation and diversity of domain registrars increased, the number of labels to the right of a PDNL has increased beyond 1 to form a hierarchy of multi-level domain names and associated registrars. The DNS community has adopted the name "public suffix" for such domain names. Some examples of public suffixes are ".com", ".co.uk" and ".pvt.k12.ma.us". Any other public suffixes may be used. Thus, for example, Fruit Inc. may register a domain name "fruit.co.uk" with the registrar for ".co.uk", and then create a resource record/entry that may associate "www.fruit.co.uk" with an IP address. PSLs may be maintained by organizations, such as Mozilla, in order to assist browser applications and developers. Public suffixes may be called "effective top-level domains", or eTLDs. Thus, the syntax/schema for domain names that may be registered with a registrar may be <pdnl>.<eTLD>.

In some contexts, such a domain name with schema <pdnl>.<eTLD> may be called an "eTLD+1". In at least some examples described herein, however, it may be more useful and/or efficient (and/or it may be common parlance) to refer to such domain names as "base domain names", or BDNs. As described in more detail herein, malicious actors that may create malicious MHDNs may register BDNs that have PDNLs that may spoof/imitate the PDNLs of domain names that are trusted by the targets/victims of associated attacks (e.g., phishing attacks). For example, a malicious actor may register the base domain name/BDN "my-fruit.com" with the intent of tricking users/victims into perceiving it as the BDN "fruit.com" that the users may trust.

Similarly, domain names may include zero, one, or multiple subdomain name labels to the left of the PDNL in a BDN. For example, Fruit Inc. may create a DNS entry for "www.us.fruit.com", which has two subdomain name labels "us" and "www" to the left of the PDNL "fruit". In at least some examples, the (dot-separated) subdomain name labels to the left of the PDNL may be called the "prefix" of the domain name, in analogy to the (public) "suffix" to the right of the PDNL. Thus, a syntax/schema may be <prefix>.<pdnl>.<suffix>.

Note that unlike a suffix, which may be fixed/immutable and/or owned/administrated by some (legitimate, public) registrar organization, a prefix may be comprised of multiple labels (e.g., arbitrarily named labels) that may be created by the owner of the BDN. This capability may be abused by malicious actors when creating MHDNs. For example, a malicious actor that may have registered (and therefore may own) the "my-fruit.com" BDN may create a (DNS-resolvable) domain name "free.tech.support.my-fruit.com", which may be designed to trick users into thinking that the associated web site offers free technical support from Fruit Inc. In reality, any associated "free.tech.support.my-fruit.com" site may be designed to, for example, trick users into providing sensitive information (for example, such as e-mail addresses, credentials, credit card information, social security numbers, etc.) to the malicious actors that may operate the site. As another example, a malicious actor targeting Fruit Inc. and its domain name fruit.com may register "uit.com"with the".com" registrar, and then create a DNS entry/resource record for the MHDN "fr.uit.com". An unsuspecting user may, for example, mis-perceive the "fr.uit.com" MHDN to be the (trusted) "fruit.com" domain name, and then click on a URL link comprising "fr.uit.com", thereby launching some MHDN-vectored threat and/or attack.

MHDNs (and associated malicious domains, e.g., malicious web sites) may be purposefully created and/or registered in DNS by malicious actors for use in certain cyber threats and/or attacks in which the MHDN may be visually (mis-)perceived by the user/target/victim to be associated with a domain that they trust. The attack may be launched when the deceived user/target/victim unwittingly accesses the malicious domain (by, for example, clicking on a URL link comprising an MHDN that may be embedded in an e-mail).

Described herein are systems, methods, apparatuses, and computer readable media for detection of MHDNs (e.g., automated detection of MHDN). Also described herein are systems, methods, apparatuses, and computer readable media for generating (potential) MHDNs (and/or generating non-MHDNs corresponding to MHDNs). Various cyber network defense applications may be enabled by, and/or benefit from, automated detection and/or generation of MHDNs. Some examples of these applications are described herein.

FIG. 1 shows an example network for MHDN detection, domain name generation (e.g., MHDN generation and/or non-MHDN generation based on an MHDN), and/or associated protections. A network 100 may comprise one or more: private networks (PVT-NTWKs), non-private networks (NTWKs), providers, servers, and/or any other computing devices for communications. The network 100 may comprise private networks PVT-NTWK-1 (102), PVT-NTWK-2 (104), and/or any N-quantity of private networks (e.g., PVT-NTWK-N (108)). Any quantity of the private networks may be partially or entirely based on a cloud platform. Any quantity of the private networks may be in a single geographic location or may be geographically distributed. The network 100 may comprise any quantity of non-private networks, such as NTWK-B (110). At least one non-private network (e.g., NTWK-B) may comprise, for example, the Internet. The network 100 may comprise any quantity of providers and/or provider equipment, such as one or more of: a Cyber-Security-as-a-Service (CSaaS) provider that may be operating one or more private network(s) CSAAS(s) 140, and/or a cyber threat intelligence (CTI) provider (CTIP) that may be operating one or more CTIP network(s) CTIP(s) 150. The network 100 may comprise any quantity of computing devices, such as one or more of: a security policy management server SPMS(s) 160, and/or a domain name system (DNS) 170, a newly registered domains (NRD) services networks NRD(s) 180. The network 100 may comprise any quantity of computing devices and/or networks associated with malicious actors, such as malware networks MAL-NTWK-1 (130), MAL-NTWK-2 (132), and/or any N-quantity of computing devices and/or networks associated with malicious actors (e.g., MAL-NTWK-N), that may use one or more MHDNs (e.g., in one or more MHDN-vectored attacks).

The network 100 may experience one or more MHDN-vectored threats and/or attacks. As described herein, protections may be enabled to protect against MHDN-vectored threats and/or attacks. NTWK-B (110) may be the public Internet that may be used to interconnect various networks within the network 100. A private network (e.g., PVT-NTWK-1 (102), PVT-NTWK-2 (104), . . . PVT-NTWK-N (108)) may be operated by one or more enterprises without malicious intent (e.g., a legitimate enterprise). A private network (e.g., PVT-NTWK-1 and PVT-NWK-2) may subscribe to cybersecurity protections, such as protections from MHDN-vectored threats and/or attacks, offered by a Cyber-Security-as-a-Service (CSaaS) provider that may be operating one or more private network(s) CSAAS(s) 140, which may represent one or more CSaaS provider(s). A CSaaS provider CSAAS 140 may operate one or more threat intelligence gateways (TIGs) 120. TIGs 120 may be deployed at the Internet access points of PVT-NTWK-1 (102) and PVT-NTWK-2 (104). A TIG 120 may comprise MHDN detector/Inverse(INV)-MHDN functions and/or services. A TIG 120 may subscribe to an INV-MHDN service, such as INV-MHDN-SVC 141 described with respect to FIG. 2. A TIG 120 may be used to detect MHDNs. The MHDNs may be in, for example, one or more DNS requests and/or HTTP(S) sessions that the TIG 120 may filter. A private network (e.g., PVT-NTWK-N (108)) may not be a subscriber to the CSaaS provider CSAAS 140 and accordingly may not have a TIG deployed at the Internet access point. Such a private network lacking a TIG may not have cybersecurity protections offered by the CSAAS 140. A malicious network (e.g., MAL-NTWK-1 (130), MAL-NTWK-2 (132), . . . MAL-NTWK-N(138)) may be controlled, wholly or in part, by one or more malicious actors that may create one or more MHDNs and/or use MHDNs in MHDN-vectored threats and/or attacks. A malicious actor may configure one or more host computers that may be attached to one or more malicious networks (e.g., MAL-NTWK-1 (130), MAL-NTWK-2 (132), . . . MAL-NTWK-N(138)) and/or that may host malicious sites that correspond to the one or more MHDNs. Although not shown in FIG. 1, one or more networks connected to the Internet (e.g., each of the networks connected to the Internet, such as NTW-B 110) may comprise one or more DNS proxies and/or one or more network firewalls, and/or may comprise any other computing device(s) as may be used when configuring networks connected to the Internet.

One or more networks CTIP(s) 150 may be operated by cyber threat intelligence (CTI) providers (CTIPs). CTI may be supplied by CTI provider organizations. CTI may comprise network threat intelligence reports and/or associated network threat indicators. The network threat indicators may be in the form of IP addresses, 5-tuples, domain names, URLs, and/or any other form. The network threat indicators may indicate hosts and/or resources that may be associated with one or more network threats and/or attacks. A CTIP may publish its CTI in the form of CTI feeds. A CTIP may provide access (e.g., controlled and/or secure access) to associated reports and/or other information. Subscribers may use (e.g., consume) the CTI feeds, reports, and/or other information. As described herein, a CSAAS 140 may operate one or more CTIP 150 services that may comprise CTI on one or more MHDNs. Subscribers to CTIP 150 services may comprise one or more Security Policy Management Server(s) SPMS(s) 160. The SPMS(s) may use (e.g., consume) the CTI, transform the CTI into one or more rules and/or policies (e.g., sets of packet filtering rules and/or policies), and/or distribute the one or more rules and/or policies to its subscriber(s). A CSAAS 140 may operate one or more SPMS(s) 160 that may distribute the one or more rules and/or policies to one or more TIGs (e.g., subscribing TIGs) operated by the CSAAS 140, such as TIG(s) 120. A TIG may apply one or more rules and/or policies to packet traffic traversing the Internet access links. A TIG may generate one or more logs for a communication event (e.g., any communications events that match packet filtering rules in the policies). The one or more logs may be sent to a Security Operations Center (for example, SOC 144 in FIG. 2) that may be operated by the CSAAS 140. One or more cyber analysts (e.g., at the SOC) may use SIEM applications to input (e.g., ingest), process, and/or analyze the log(s). The one or more cyber analysts may determine remedial actions (e.g., based on the analyzed logs).

DNS 170 may comprise the public Internet Domain Name System (DNS), a collection of hosts and networks that provide DNS services, such as resolving domain names to IP addresses. DNS hosts may comprise DNS proxies, DNS resolvers, DNS authoritative name servers, and/or any other computing device. DNS networks may comprise one or more networks operated by DNS registrars, DNS administrators, DNS services providers, and/or any other operator(s). DNS services may comprise Newly Registered Domain Name Services networks NRDS(s) 180 that may collect and/or publish information on newly registered domains (NRDs). NRDs may comprise BDNs that may have been recently registered by DNS registrars. These NRDs may comprise MHDNs registered by, for example, malicious actors associated with one or more networks (e.g., MAL-NTWK-1 (130), MAL-NTWK-2 (132), . . . MAL-NTWK-N) for use in MHDN-vectored threats and/or attacks.

FIG. 2 shows an example CSaaS network. The CSaaS network shown in FIG. 2 may comprise CSAAS 140 described with respect to FIG. 1. CSAAS 140 network may be operated by a CSaaS provider. The CSaaS provider may operate to protect its customer(s)/subscriber(s) from one or more (e.g., particular or various) cyber threats and/or attacks, such as MHDN-vectored threats/attacks. CSAAS 140 may comprise multiple functions and/or services for protecting its subscriber(s) from one or more cyber threats and/or attacks, such as MHDN-vectored threats and attacks. For example, CSAAS 140 may comprise a CTIP 150 service that may provide one or more CTI feeds and/or other information that may comprise MHDN information to subscriber(s). CSAAS 140 may comprise a SPMS 160 service. The SPMS 160 service may: input (e.g., consume) CTI supplied by one or more CTIPs 150 (such as MHDN-based CTI that may be supplied by the CTIP 150 service operated by CSAAS 140), transform the CTI into one or more rules (e.g., sets of packet filtering rules) and/or policies, and/or distribute the one or more rules and/or policies to subscriber(s) (such as the TIGs 120).

CSAAS 140 may comprise an Inverse-MHDN service. The Inverse-MHDN service may comprise INV-MHDN-SVC 141. INV-MHDN-SVC 141 may distribute instances of an Inverse-MHDN detection process, such as that described with respect to FIG. 3A, FIG. 3B, FIG. 3C, and FIG. 3D. INV-MHDN-SVC 141 may distribute instances of the Inverse-MHDN detection process to one or more subscribers, such as the TIGs 120. INV-MHDN-SVC 141 may distribute services and/or applications operated by CSAAS 140. The services and/or applications may apply MHDN detection to domain names in order to provide protections against MHDN-vectored threats and/or attacks. Some examples of these protections may be described elsewhere in this disclosure. INV-MHDN-SVC 141 may distribute information updates to instances of an Inverse-MHDN detection service, such as described with respect to FIG. 3A, FIG. 3B, FIG. 3C, and FIG. 3D. The information updates may comprise one or more of a blacklist, CSaaS subscriber/customer domain name, known MHDN, domain popularity list, and/or any other information.

CSAAS 140 may comprise a forward MHDN service. The forward MHDN service may comprise FWD-MHDN-SVC 142. FWD-MHDN-SVC 142 may comprise a malicious aliasing by genetic mutation algorithm (MAGMA) process, such as described with respect to FIG. 4A and FIG. 4B and elsewhere in this disclosure. The CSAAS 140 may use the FWD-MHDN-SVC 142 to generate MHDNs that may be used to provide protections against MHDN-vectored threats and/or attacks. Some examples of these protections may be described elsewhere in this disclosure.

CSAAS 140 may comprise a DNS authoritative name server. The DNS authoritative name server may comprise DNS-NS 143. DNS-NS 143 may be used for recording domain names in a DNS. The recorded domain names may be domain names that, for example, CSAAS 140 may generate using its FWD-MHDN-SVC 142, and/or that CSAAS 140 may determine malicious actors may attempt to use in MHDN-vectored threats and/or attacks, and/or that a CSaaS provider may use for one or more operations (e.g., during exercises by CSAAS 140's blue teams and red teams).

CSAAS 140 may comprise a security operations center. The security operations center may comprise Security Operations Center SOC 144. SOC 144 may deliver cyber protections to the CSAAS 140's subscriber(s)/customer(s). The cyber protections may comprise cyber protections against MHDN-vectored threats and/or attacks.

Cyber security applications may benefit from MHDN detection. Additionally or alternatively, cyber security applications may benefit from MHDN performance requirements. Cyber security applications that may benefit from MHDN detection and/or performance requirements may be associated with CTI-based cyber defense systems, such as for protecting enterprise networks. Such CTI-based cyber defense systems may be described as follows with reference to FIG. 1 and FIG. 2.

One or more cyber defense systems may be used for protecting enterprise networks (e.g., PVT-NTWK-1 102 and PVT-NTWK-2 104) from Internet threats. For example, a cyber defense system may be operated by a CSaaS provider CSAAS 140 that may use cyber threat intelligence (CTI) to detect cyber threats in network traffic and/or take appropriate defensive/protective actions based on such threats. CTI Provider organizations CTIPs 150 may supply CTI in the form of networks addresses, such as IP addresses, 5-tuple information, domain names, URLs, and/or any other form, that may be associated with cyber threats and/or attacks. Such cyber threats and/or attacks may be associated with, for example, malware servers, phishing emails, ransomware, and any other type and/or source of cyber threat and/or attack. A cyber security application may comprise an SPMS 160 that may collect CTI from multiple CTIPs 150 and transform the CTI into a collection of rules, such as packet filtering rules. Packet filtering rules may have packet matching criteria corresponding to the CTI. Additionally or alternatively, packet filtering rules may have one or more dispositions (e.g., block/drop or allow/forward) and/or directives (e.g., log, capture, etc.) that may be applied to a matching packet (e.g., any matching packet). The collection of such packet filtering rules may be referred to as a network protection policy and/or a network security policy. Such a policy/policies may be distributed by an SPMS 160 to subscriber(s), such as TIGs 120. Note that at least some TIGs 120 may have a capability to compute/determine one or more dispositions (e.g., block/drop or allow/forward) at in-transit packet observation time. For example, a TIG 120 may have a capability to compute/determine a disposition at in-transit packet observation time based on additional threat context information that may not be included in a matching rule (e.g., time-of-day, if the packet is part of an active port scan attack, if a domain name that may be contained in the packet is an MHDN, and/or the like). Packet-filtering rules and/or related processes described in U.S. Pat. No. 11,159, 546, incorporated by reference herein, may be applied to one or more operations described herein.

A TIG 120 may enforce one or more rules and/or policies that may be operated by the CSAAS 140. For example, a TIG 120 may comprise a RuleGATE® TIG that may comprise a CleanINTERNET® CSaaS service provided by Centripetal Networks, Inc. A TIG 120 may be placed inline on an enterprise network's Internet access link(s), and/or on the boundary and/or interface between the enterprise network (e.g., PVT-NTWK-1 102) and the Internet (e.g., NTWK-B 110). Inline placement of the TIG 120 may enable observation of all in-transit packets crossing the boundary (e.g., in one direction or in either direction). A TIG 120 may apply one or more rules and/or policies to each in-transit packet, for example, by searching through the rule/policy for one or more rules/policies that match the packet. The rule's disposition and/or directives may be applied to the packet, for example, if a match is found. A log directive may determine/compute a log of the packet. The log of the packet may be aggregated with logs of other packets comprising the same (or similar) end-to-end communication. For example, packets with the same (or similar) (e.g., up to network address translation (NAT) mapping) 5-tuple values indicating the same (or similar) packet flow and/or end-to-end communication may be aggregated. Because the end-to-end communication may be associated with a threat (e.g., since it may correspond to some CTI), the communication may be indicated and/or referred to as a "threat event." The associated log of a threat event may be indicated and/or referred to as a "threat event log." A threat event log may be transmitted to a security operations center (e.g., SOC 144). The security operations center may implement one or more (e.g., various) cyber security/defense applications and/or threat awareness applications. The one or more cyber security/defense applications and/or threat awareness applications may comprise one or more security information and event management (SIEM) applications. The one or more SIEM applications may comprise, for example, one or more of Splunk, QRadar, LogRhythm, and/or any other SIEM application, such as any SIEM application configured to process computer-generated steps. The one or more cyber security/defense applications and/or threat awareness applications may process the threat event log for presentation to a cyber analyst (e.g., a human cyber analyst). A cyber analyst may review the threat event log, conduct an investigation, determine a severity of the threat, determine one or more remedial actions for mitigating the threat, and/or determine if the threat should be reported to an enterprise network's authority/authorities and/or administrator(s). As part of the processing of the threat event logs by the one or more cyber security/defense and/or threat awareness applications, MHDN detection technology may be used. For example, MHDN technology may be used when one or more threat event logs include(s) one or more domain names associated with a threat event. In such cases, the threat event log(s) may be augmented with the results/output information of an MHDN detector. The presence and/or indication of an MHDN (and/or a likely MHDN) in a threat event log may cause a cyber analyst to process and/or respond to the threat event log differently than if the threat event log did not indicate an MHDN (and/or a likely MHDN).

In a CTI-based cyber defense environment such as described with respect to network 100, at least some exemplary cyber security applications may benefit from MHDN solutions. For example, network 100 may advantageously comprise one or more of an MHDN detector/Inverse-MHDN solution (such as described with respect to FIGS. 3A, 3B, and/or 3C-3D); an MHDN generator/Forward-MHDN solution (such as described with respect to FIG. 7A, FIGS. 7B-7C, and/or FIGS. 7D-7E); and/or a solution combining elements of both MHDN detection and MHDN generation (such as described with respect to FIG. 15).

An example of MHDN detection is summarized as follows. MHDN detection may be automated. A problem statement for automated detection of an MHDN may be: given any DNS-resolvable domain name (e.g., a fully qualified domain name (FQDN)) that may be observed in, or comprise, an (Internet) communications session (e.g., a web/HTTP(S) session), and that is potentially an MHDN, compute/determine the "inverse homoglyph" domain name, which may be the (legitimate) DNS-registered domain name, DNS-recorded domain name, and/or the PDNL of the domain name that the potential MHDN may be imitating.

Comprehensive automated MHDN detection methods described herein provide various advantages, such as solving classes of difficult inverse problems for cyber security systems. The MHDN detection problem may be characterized as an "inverse MHDN" problem such as: given a potential MHDN as input, determine the trusted domain name that is (maliciously) being spoofed and/or imitated. For example, the inverse problem may be informally described by example as: given a (potential) MHDN, such as www.schm00gle.com (which, for exemplary purposes, is an MHDN for the (popular) web site www.schmoogle.com where the consecutive letters "oo" have been replaced by the numeric zero characters "00"), then determine the (trusted, popular) domain name that is being spoofed/imitated, i.e., determine the "inverse homoglyph." For example, for the MHDN example www.schm00gle.com, the inverse homoglyph may be "schmoogle."

The disclosed comprehensive MHDN detection methods may trade-off one or more performance objectives such as computation time, false positive rates, false negative rates, and/or any other objective, for example, depending on the values of certain parameters. Example parameters are described below (e.g., addressing tunable parameters). Example solutions described herein may be dynamically configured, and/or "tuned", to meet one or more performance requirements (e.g., of a given cyber defense application) by setting the associated parameter(s) to one or more values (e.g., certain values).

In at least some examples, MHDN detection may require human analysis. For example, often, a final determination of whether or not a domain name is an MHDN, and thus a determination of false positives and/or false negatives, may require that a human expert, (e.g., a human cyberanalyst who is knowledgeable in MHDN creation and/or construction techniques and associated attack methods) make such a determination. This may indicate that automated MHDN detection methods, such as described herein, may not necessarily be depended on to make a final, binary (Yes/No) determination, but instead may estimate a confidence value or a likelihood/probability (e.g., a value between 0 and 1, or 0% and 100%) that a given domain name is an actual MHDN. In at least some applications, for example, the MHDN likelihood and/or confidence value may be presented to a human expert who may factor in the likelihood and/or confidence value if/when making a determination. In such cases where human expertise may be used to make final determinations and/or decisions, the accuracies of likelihood estimates and/or confidence values may be improved by combining human-designed, static logic for estimating MHDN likelihoods and/or confidence values with machine-learned, dynamic logic for estimating MHDN likelihoods and/or confidence values. A machine-learned logic may be generated by using, for example, an artificial neural network for which the training data is created by human experts. For example, a human expert may create a training database for a machine learning algorithm (e.g., a neural network) for MHDN likelihood estimation by marking each element in a set of domain names as to whether or not the element/ domain name is an MHDN, for example, TRUE or "1" if a domain name is an MHDN, and FALSE or "0" if a domain name is not an MHDN. The input layer to the neural network may be comprised of a set of features derived from the domain name under test that correspond to the first layer of input nodes, and/or feature nodes, of the neural network. At least some of these features (e.g., many of these features) may be derived from subfunctions of the MHDN detectors/ Inverse-MHDN solutions and/or Forward-MHDN processes described herein. An output layer may comprise a single node configured to produce a single value between 0 and 1 inclusive, which may correspond to a likelihood estimate.

Similar to a likelihood estimate, a confidence value may be determined for a potential MHDN that may be determined/computed by an MHDN detector/Inverse-MHDN solution. A confidence value may correspond to a confusable rating. For example, each homoglyphic characteristic of a plurality of homoglyphic characteristics may have a respective confusable rating. An exemplary function for determining/computing a confidence value may be a fitness function used in a MAGMA MHDN generator algorithm described herein (e.g., with reference to FIG. 7A, FIGS. 7B-7C, and/or FIGS. 7D-7E). This fitness function may be based on statistics of actual MHDN creation methods used by one or more malicious actors. These statistics may be collected from the MHDN detection algorithms described herein. For example, the creation methods and/or techniques for a given MHDN may be included in the Metadata output of an MHDN detection algorithm (such as described with respect to FIG. 3A, FIG. 3B, FIG. 3C, and FIG. 3D).

Although a human expert may make (e.g., often makes) a final determination, real-world cases have been observed where: (1) an MHDN detector estimates a high likelihood and/or high confidence value for a potential MHDN being an actual MHDN; and (2) a human expert initially determines that the potential MHDN is a false positive (e.g., the potential MHDN is not an actual MHDN); but (3) upon further investigation, for example, an examination and/or analysis of a web site associated with the potential MHDN, a human expert changes an initial determination from false positive to true positive (e.g., the potential MHDN is an actual MHDN). In such cases, the MHDN detector may have exceeded the performance of a human expert with respect to determining true positives. In general, with respect to the rate at which MHDN detection analysis and/or determination may be performed, a machine MHDN detector may outperform a human expert (e.g., by several orders of magnitude).

The preceding paragraph above briefly describes some performance metrics for Inverse-MHDN/MHDN detectors and/or algorithms. Performance metrics may vary with one or more parameter values selected. Different cybersecurity applications may have different performance metrics. Accordingly, different cybersecurity applications may require different parameter value settings.

FIG. 3A, FIG. 3B, FIG. 3C, and FIG. 3D show example MHDN detection processes. MHDN processes may comprise an Inverse-MHDN process. MHDN processes may comprise MHDN detection and/or generation of one or more MHDNs (e.g., non-MHDNs and/or MHDNs based on domain name input(s)). MHDN detection processes may be deployed in a protected customer network to detect MHDNs in or associated with an electronic communication received by a user. An MHDN may be detected, for example, if a user receives a link comprising an MHDN or if a computing device receives a command directing it to an MHDN (e.g., via a user clicking/selecting a link comprising an MHDN). The MHDN may be detected in a webpage, email, and/or other electronic communications received by the user in the protected customer network. The MHDN detection processes may also detect an MHDN included in one or more packets of network traffic. A CSaaS system may detect the MHDN and/or replace the MHDN with a non-MHDN, such as: a domain name of a legitimate non-malicious source that the MHDN may have attempted to imitate using an MHDN similar to the non-MHDN; or, a domain name of a legitimate server/site that may, for example, have been configured by the CSaaS provider or a local network administrator to signal the user that they attempted to access a malicious site and may, for example, signal the user's associated cybersecurity administrator regarding the attempted malicious access. A CSaaS system may direct/re-direct a user to a non-MHDN after detection of the MHDN. The direction/re-direction to a non-MHDN may be with or without a user's knowledge.

FIG. 3A shows an example MHDN method 300A. The MHDN method 300A may comprise an MHDN detection method. At step 310A, one or more domain names may be received and/or determined. For example, a computing device (such as TIG 120 and/or any combination of software and/or hardware) may receive a domain name. The computing device may receive the domain name in a packet (e.g., in a threat event log comprising information derived from a packet). The domain name may comprise an MHDN. The computing device may detect the domain name and/or determine that the domain name (or a packet and/or log comprising the domain name) should be processed for MHDN detection. The computing device may be located in a private network (e.g., PVT-NTWK-1 (102)). The private network may be partially or entirely based on a cloud platform. For example, a computing device (such as TIG 120) may be an instance of software, for example, that may be operating to defend a cloud environment (e.g., which may be similar to or equivalent to a physical device such as a RuleGATE® and/or any other device). The private network may be in a single geographic location or may be geographically distributed. The computing device may be operated by a CSaaS provider (e.g., CSAAS 140). According to some aspects, the input domain name may be received by the system as part of a DNS query request (e.g., comprising an input domain name). Step 310A may be repeated for each of a plurality of domain names (e.g., a plurality of domain names in one or more packets and/or in one or more logs) in parallel, in serial, or in a combination thereof.

At step 320A, the one or more domain names may be analyzed. For example, a computing device may determine whether a domain name is an acceptable format. The process may end (e.g., exit from a routine) at step 325, for example, if the computing device determines that the domain name is not an acceptable format. A domain name may not have an acceptable format, for example, if the domain name is included in a list of known domain names (e.g., such that further analysis may not be required due to the domain name being identified as a non-MHDN or due to the domain name being identified as a known MHDN for which procedures for processing have already been determined). A domain name may not have an acceptable format, for example, if the domain name is longer than a threshold length. A domain name may not have an acceptable format, for example, if the domain name fails to satisfy one or more syntax requirements. One or more criteria, such as any criterion described herein, may be used to determine whether a domain name is an acceptable format. Step 320A may be referred to as a triage step, for example, to make an initial threshold determination as to whether a domain name should be analyzed for possible detection of an MHDN and/or for a determination of a replacement non-MHDN (e.g., an inverse homoglyph). Step 320A may be repeated for each of a plurality of domain names (e.g., a plurality of domain names in one or more packets and/or in one or more logs) in parallel, in serial, or in a combination thereof.

At step 330A, the one or more domain names may be normalized. For example, a computing device may normalize the one or more domain names. Normalization may facilitate further processing of the one or more domain names. Normalization may comprise one or more steps such as removing one or more portions of a domain name, converting one or more portions of a domain name to a different format, partitioning one or more portions of a domain name, replacing one or more portions of a domain name (e.g., from confusable text to a uniform format, such as an alpha character "а" to the letter "a"). An output from the normalization may comprise one or more domain names having a simplified and/or uniform format. The output from the normalization may more closely resemble a non-MHDN relative to an input of the normalization. Step 330A may be repeated for each of a plurality of domain names (e.g., a plurality of domain names in one or more packets and/or in one or more logs) in parallel, in serial, or in a combination thereof.

At step 340A, the one or more domain names may be segmented and/or associated costs for segments may be determined. For example, a computing device may segment the one or more domain names. Segmentation may facilitate further processing of the one or more domain names. Segmentation may comprise one or more steps such as separating an input character string into a plurality of characters (e.g., letters, numbers, etc.) and/or groups of characters, dividing words into syllables and/or letters, and/or separating words from word-combinations. A plurality of segmentation options may be determined. Each of the plurality of segmentation options may be evaluated, for example, based on one or more criteria such as iteration count, cost function, complexity, similarity with predetermined segments or previously analyzed segments, and/or any other criteria. For example, a particular cost may be associated with one or more segments (e.g., each segment). A cost associated with and/or assigned to a segmentation may be associated with (e.g., may correspond to) a searchable quality of a segmentation. An output from the segmentation may comprise one or more domain names having a plurality of segments for further analysis. The output from the segmentation may more closely resemble segments of a non-MHDN relative to an input of the segmentation of step 340A and/or relative to an input of the normalization of step 330A. Step 340A may be repeated for each of a plurality of domain names (e.g., a plurality of domain names in one or more packets and/or in one or more logs) in parallel, in serial, or in a combination thereof.

At step 350A, one or more preferred words and/or groups of text may be determined. For example, a computing device may determine one or more preferred words and/or groups of text that may be output for further analysis. Determination of one or more preferred words and/or groups of text may comprise selection of a segment (or of a plurality of segments) that match (e.g., within a threshold matching criteria such as identical text and/or text matching a threshold quantity/percentage of characters) a segment from one or more lists of segments. The one or more lists of segments may correspond to one or more customer domains, popular domains, previously analyzed domains, and/or any other domain(s). An output of step 350A may comprise one or more segments that match the one or more lists of segments. Additionally or alternatively, an output of step 350A may comprise an indication of a received/input domain name (e.g., such as described with respect to 361 in FIG. 3B and/or FIG. 3D); metadata associated with one or more inputs of steps 310A, 320A, 330A, 340A, and/or 350A; metadata associated with the one or more lists of segments and/or the one or more segments that match the one or more lists of segments; and/or one or more Inverse-MHDNs. Step 350A may be repeated for each of a plurality of domain names (e.g., a plurality of domain names in one or more packets and/or in one or more logs) in parallel, in serial, or in a combination thereof.

At step 360A, one or more outputs of step 350A may be provided. For example, a computing device may provide (e.g., send, transfer, and/or save for access) the one or more outputs of step 350A. The computing device may provide the one or more outputs of step 350A to a cybersecurity application, a cyberanalyst, and/or a computing device associated with cybersecurity. The one or more outputs of step 350A may comprise one or more Inverse-MHDNs and/or information associated with one or more Inverse-MHDNs (e.g., metadata, MHDN, and/or inputs and/or outputs of steps 310A, 320A, 330A, and/or 340A). For example, if an input at step 310A is an actual MHDN, then output results at step 360A may comprise an output of one or more operations, transformations, and/or mutators that may have been applied by a malicious actor when creating the actual MHDN from a legitimate domain name. For example, in Step 330A, normalization may comprise replacing a confusable character with a uniform format, or replacing a confusable character with a character to which the malicious actor applies one or more confusable transformations/operations (e.g., by application of one or more mutators), such that output results at step 360A may comprise the transformation(s)/operation(s) that the malicious actor may have applied when creating the MHDN and/or that may have been determined during the method 300A. Such transformation(s)/operation(s) may provide one or more advantages as input(s) to a forward MHDN/MHDN generation method/algorithm (e.g., MAGMA) such as described herein (e.g., with respect to FIG. 7A, FIGS. 7B-7C, and/or FIGS. 7D-7E). Additionally or alternatively, in step 340A, one or more operations/transformations that the malicious actor may have applied may be determined, such that the operations/transformations may be provided in the output results at step 360A. Additionally or alternatively, in step 350A, one or more operations/transformations that the malicious actor may have applied may be determined, such that the one or more operations/transformations may be provided in the output results at step 360A. One or more transformations/operations that may have been applied by a malicious actor may be determined during method 300A and may be provided as the output result(s) at step 360A (e.g., such as in data that may be included in metadata). According to some aspects, the output result(s) at step 360A may comprise a message that is in response to a DND query request (e.g., if the input domain name is received in a DNS query request).

Figure 3B:
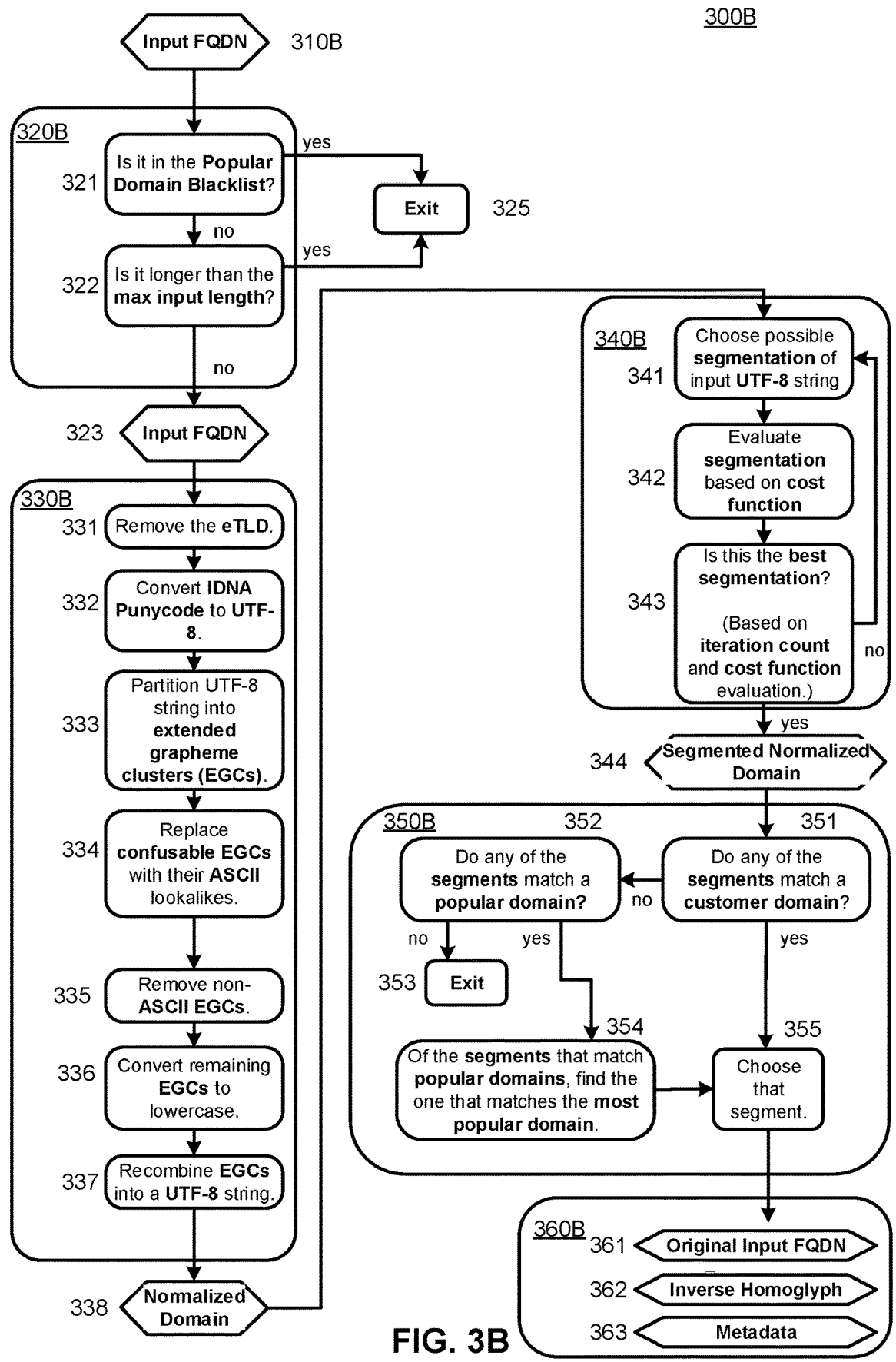
Figure 3C:
Figure 3D:
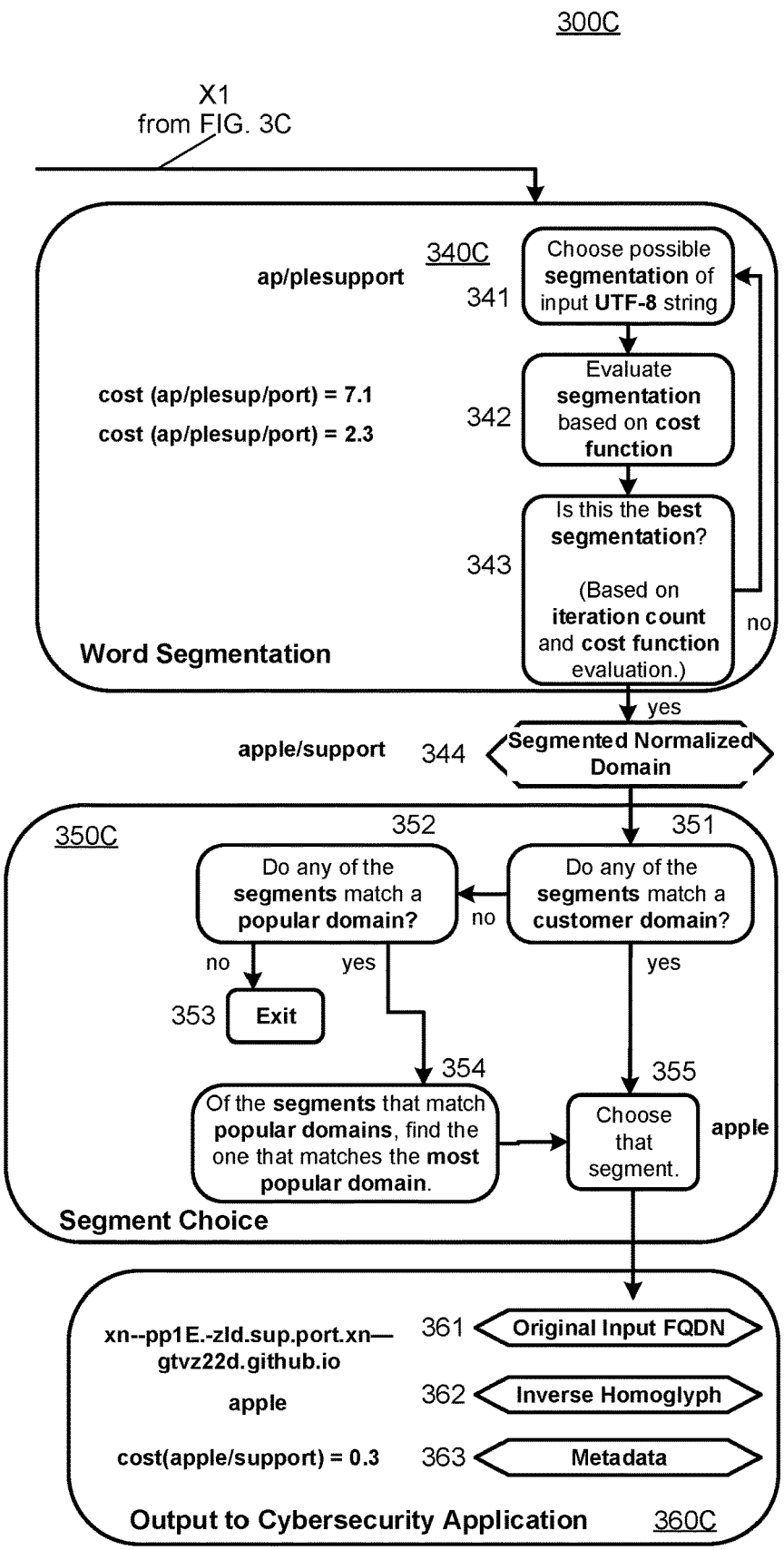

The one or more outputs of step 350A may be used by a computing device to update (e.g., train) the Inverse-MHDN generation and/or MHDN detection processes described herein, such as the process described with respect to FIG. 3A, FIG. 3B, and/or FIGS. 3C-3D. For example, by using the output of steps 350A, the method 300A may be enhanced (e.g., iteratively) to provide improved Inverse-MHDN generation and/or MHDN detection. Step 360A may be repeated for each of a plurality of domain names (e.g., a plurality of domain names in one or more packets and/or in one or more logs) in parallel, in serial, or in a combination thereof. Steps 310A, 320A, 325, 330A, 340A, 350A, and/or 360A, while shown sequentially, may be performed in any order (e.g., during, before, and/or after any of the other steps of FIG. 3A), and/or may be optionally performed (e.g., skipped) and/or repeated.

Before proceeding to describe MHDN detection methods in more detail, potentially relevant performance metrics for MHDN detection methods are first described, followed by descriptions of some representative and/or exemplary cybersecurity applications that may use MHDN detectors and/or associated performance metric requirements.

One or more performance metrics may be used for MHDN detection. Primary performance metrics for MHDN detection may comprise computational complexity (e.g., in time and/or space/memory dimensions), false positive rate, and false negative rate, true positive rate, and/or true negative rate. Before describing these metrics in more detail, examples of the following two properties/characteristics of these metrics are described: (1) MHDN determination may be made by human experts (e.g., is often made by human experts); and (2) tradeoffs may exist between various performance metrics.

As noted above, a final determination of whether or not a domain name is an MHDN, and thus any associated false positive and/or false negative rates, may require that a human expert (e.g., a human cyberanalyst who is knowledgeable in MHDN creation techniques and/or associated attack methods) make such a determination. This means that automated MHDN detection methods, such as described herein, may not be depended on by some cybersecurity applications to make a final, binary (Yes/No) determination. Instead, the automated detection methods may estimate a likelihood/probability (e.g., a value between 0 and 1, or 0% and 100%) and/or a confidence value that a given domain name is an MHDN. In at least some cybersecurity applications, for example, the MHDN likelihood and/or confidence value may be presented to a human expert who may factor in the likelihood and/or confidence value if/when making a determination. For at least some applications, an MHDN likelihood and/or confidence value may be used by one or more human cyberanalysts to triage which potential MHDNs and associated communications events they will investigate further and which they will not. For example, an MHDN likelihood and/or confidence score may be determined, used, and/or updated at one or more of steps 320A, 330A, 340A, 350A, and/or 360A of FIG. 3A to determine whether one or more domain names is in an acceptable format. An MHDN likelihood and/or confidence score may be initially determined and/or used at step 320A, for example, to determine whether an input domain name is an acceptable format, such that a likelihood/score of zero (e.g., if the domain name is included in a list of popular domain names) may indicate that the input domain name is not an MHDN and, therefore, that the method may exit/end (325). An MHDN likelihood and/or confidence score of greater than zero may indicate that the method 300A should continue to a next step for further evaluation/processing of the input domain name. For example, at step 330A, step 340A, step 350A, and/or step 360A, the MHDN likelihood and/or confidence score may be updated based on one or more results of the procedure(s) of the respective steps, such as being increased or decreased based on an extent to which a generated character string, segmentation, segment, inverse homoglyph output, etc. includes a sequence of characters that match a known domain name (e.g., a domain name in a list of popular domain names, a list of customer domain names, a list of suspected/likely/known MHDNs, and/or any other list of domain names). If an MHDN likelihood and/or confidence score that is updated at one or more steps of method 300A satisfies a threshold value (e.g., exceeds a threshold likelihood/score or falls below a threshold likelihood/score), the method 300A may produce one or more outputs indicating the likelihood/score and/or indicating a status of the input domain name as being an MHDN (e.g., likelihood/score of 100% or above a threshold) or as not being an MHDN (e.g., likelihood/score of zero or below a threshold). At step 360A, the MHDN likelihood and/or confidence score may be updated and/or provided in the output results. For example, if the MHDN likelihood and/or confidence score is zero (or below a threshold value), the output results at step 360A may comprise an indication that the input domain name is not an MHDN. As another example, if the MHDN likelihood and/or confidence score is greater than zero (or above a threshold value), the output results at step 360A may comprise an indication that the input domain is an MHDN (e.g., if the MHDN likelihood and/or confidence score is 100% or above a threshold value) or that the input domain may be an MHDN such that one or more output result(s) may be presented to a cyberanalyst for determination of whether the input domain is an MHDN (e.g., if the MHDN likelihood and/or confidence score is less than 100% or below a threshold value).

As an example of a need or desire for human expert determination of MHDNs, consider the following: enterprises with well-known names may register multiple base domain names in the DNS with the same primary name label (e.g., the label "example" in "example.com") but with different country code top-level domains (ccTLDs), in order to provide a country-/culture-centric web site experience. For example, an enterprise named "enterprise-1" may: register a base domain name "enterprise-1.com" and record the entry "www.enterprise-1.com" (for example, create an A or AAAA record in the DNS for "www.enterprise-1.com"); register the base domain name "enterprise-1.fr" and may record the entry "www.enterprise-1.fr" for a French-culture-centric version of their web site; register the base domain name "enterprise-1.cn" and may record the entry "www.enterprise-1.cn" for a Chinese-culture-centric version of their web site; and/or register domain names with many, most, or all of the ccTLDs and/or park them for later use (and/or to prevent squatters and/or malicious actors from registering them).

In contrast, another enterprise named "enterprise-2" may register a base domain name "enterprise-2.com" but may not register any of the corresponding country code versions of the domain name. Malicious actors may then exploit this opportunity by registering the country code versions "enterprise-2.fr" and "enterprise-2.cn" with the intent to use them in MHDN-vectored threats and/or attacks.

An automated MHDN detector/Inverse-MHDN solution such as disclosed herein may estimate similar non-zero likelihoods and/or confidence values that, for example, "www.enterprise-1.fr" and "www.enterprise-2.fr" may be MHDNs. A human expert, however, who is familiar with the behaviors of both enterprises and malicious actors regarding domain names with ccTLDs, may conduct an investigation before making a determination as to whether or not either of the .fr domain names are MHDNs. Such an investigation may not be readily automated and thus may not be included in the logic of an automated MHDN detector. For example, to investigate the registration provenance (e.g., ownership) of a potential MHDN, a human expert may need to check, for example, multiple domain registrar services such as the ICANN WHOIS service to determine which registrar the owner may have used. These services may use, for example, CAPTCHA technology to prevent automated queries (by, for example, automated MHDN detectors/Inverse-MHDN solutions). After determining the domain registrar, the owner of the domain may or may not be available due to privacy policies and/or privacy laws (e.g., GDPR). As an alternative to or in addition to looking up ownership, a human expert may use a "sandbox" environment for isolation to access the .fr web sites and determine if they are legitimate or malicious. In any case, such investigations may not be readily automated and/or may instead require a human expert. Note, however, such investigations may be time-consuming, and thus a large queue of such investigation tasks may be impractical for human experts to service—in which case the estimated likelihoods or confidence values of automated MHDN detectors may be used by some cybersecurity applications instead of human expert determinations.

Another example relates to the above example of "fruit.com". Suppose a legitimate (non-malicious) enterprise registers the base domain name "my-fruit.com", creates/records a record entry for "www.my-fruit.com", and/or configures an associated web site. An automated MHDN detector such as disclosed herein may estimate a non-zero likelihood and/or confidence value that "www.my-fruit.com" is an MHDN with inverse homoglyph "www.fruit.com". Similar to the ccTLD example above, a human expert may be necessary/required to do a similar investigation to determine that "www.my-fruit.com" is not an actual MHDN.

Because a final determination for an MHDN may be made (e.g., may often be made) by a human expert, then by implication the human expert may determine if an automated MHDN detector produces a result that is a false positive, true positive, false negative, or true negative. For example, suppose that if an automated MHDN detector/Inverse-MHDN solution produces a likelihood value<=0.5, then the (input) domain name may not be considered an MHDN; conversely, if the likelihood value>0.5 then the domain name may be considered an MHDN. Accordingly, suppose, for example, that the MHDN detector/Inverse-MHDN solution produces a likelihood value of 0.15 for the domain name "xxx.com"; however, the human expert may determine that "xxx.com" is an MHDN. Thus, for "xxx.com", the MHDN detector/Inverse-MHDN solution produced a false negative result. If instead the human expert may determine that "xxx.com" is not an MHDN, then the MHDN detector/Inverse-MHDN solution produced a true negative result. A similar example may be applied to false positive and true positive results.

An expert human cyberanalyst may require a time period (e.g., from several seconds to several minutes) to make a final determination for a potential MHDN. For many cybersecurity applications, the volume and/or associated rate of potential MHDNs for which an MHDN determination is to be made may far exceed (e.g., may far exceed) the rate at which human cyberanalysts can make such determinations. Thus, automated methods for accurate MHDN detection may be required for at least some (e.g., many) associated cybersecurity applications.

Tradeoffs may be made between performance metrics. As will be described in detail below, the (parameterized) MHDN detectors may make one or more tradeoffs between the performance metrics of computation time, false positive rate, and/or false negative rate. For example, setting a parameter to a value that will decrease computation time may increase the false negative rate while decreasing the false positive rate. These tradeoffs will be described in more detail in the parameter descriptions below.

Various connections between elements are discussed in the following description. These connections are general and, unless specified otherwise, may be direct or indirect, wired or wireless, physical or logically defined. In this respect, the specification is not intended to be limiting.

MHDN detection may comprise inline threat detection with dynamic network protection. MHDNs may be detected/identified "inline" as packet traffic passes through a TIG 120 device, which may protect users when they attempt to access the associated malicious sites. This application/TIG device logic may utilize a specially tuned variant of the MHDN detector/Inverse-MHDN solution to match the performance requirements of, for example, soft-real-time detection (e.g., small average detection time such as <1 ms, and low time complexity such as constant time or logarithmic time complexity). Note, however, that the detection time requirements may be relaxed to, for example, <10 ms (e.g., if the domain name under test is contained in a packet comprising a DNS query request, as DNS lookups generally require between 20 ms and 120 ms). In this position, an MHDN detector may be able to find one or more MHDNs contained inside in-transit packets as they cross the boundary between the enterprise network and the Internet. A TIG 120 may dynamically decide to allow/forward or block/drop such packets. For example, a TIG 120 may drop a packet comprising a DNS request but then spoof a DNS reply with an NXDOMAIN response (e.g., in the case of an application-level "block", such as when a DNS request may be blocked from accessing the DNS). A TIG 120 may dynamically decide which directives to apply to a packet, for example, based on MHDN likelihood estimates and/or confidence values and/or possibly in combination with other threat-contextual information. For example, packet-filtering rules and/or related processes described in U.S. Pat. No. 11,159,546, incorporated by reference herein, may be applied as other threat-contextual information. Such dynamic decisions may enable preemptive and/or proactive measures against one or more malicious actors, which may not only alert users to potential compromise, but may also prevent it altogether.

Note that although in some applications a human expert may be required to make a final MHDN determination, for multiple reasons, it may be impractical for a human expert to make an MHDN determination because of the small computation time and/or low time complexity requirements. Additionally of alternatively, MHDN detection performed by computer processing logic may comprise greater complexity such that involvement of a human expert may render detection too slow and/or less reliable. Thus, in practice, the TIG logic may be configured to determine that a domain name is an MHDN, for example, only if the estimated likelihood is close to 1.0 or within a threshold of 1.0 (vs. >0.5, as described in another example above) and/or has a high confidence value and the MHDN detector has been configured and/or parameterized such that the estimated and/or expected false positive rate is low (e.g., below a threshold value). In order to meet a small computation time, low false positive rate, and/or low false negative rate requirements, it may be necessary to machine-learn the associated MHDN logic where the time and/or space requirements may be weighted input objectives to evolutionary algorithms, such as genetic algorithms and genetic programming algorithms, which may machine-learn the necessary computer processing logic.

A packet may (or may not) match a packet filtering rule. For example, a packet does not necessarily need to match a packet filtering rule in order for a TIG 120 to apply MHDN detector logic to a domain name that may be contained in the packet and then possibly take protective action against any MHDN-vectored threat and/or attack associated with a detected MHDN. For example, suppose a TIG 120's MHDN detector detects a potential MHDN in a DNS query request, but (a) the MHDN likelihood value and/or confidence value may not be sufficiently high for the TIG 120 to (application-level) block the DNS request, and/or (b) the domain name may not be in CTI and thus there may not be a matching packet filtering rule in the policy being enforced by the TIG. Then the application (e.g., a web browser) that issued the DNS query request may subsequently execute, for example, a web session with the associated domain's web site (which may be malicious) without the TIG detecting/filtering the (malicious) web session.

A "security gap" (such as described above) may be filled if, for example, a TIG 120 located in PVT-NTWK-1 102 and/or operated by CSaaS provider CSAAS 140 has additional logic that may function as follows. Upon detecting a potential MHDN, for example "www.may-be-malicious-site.net" in a DNS request that may have been issued by a web browser hosted within PVT-NTWK-1 102 for resolution by the DNS 170, the TIG 120 may insert the domain name (e.g., "www.may-be-malicious-site.net") and/or possibly the resolved IP address in a cache and/or in an (efficient) set data structure (e.g., a Bloom filter) that may comprise the matching criteria for an associated packet filtering rule that, for example, may allow, flow-log, and/or flow-capture any packet and/or flow of packets that matches the criteria. When the packets comprising the subsequent web session between the web browser and the web site (e.g., named "www.may-be-malicious-site.net"), which may be located in MAL-NTWK-1 130, transit through the TIG 120, the TIG 120 may apply the packet filtering rule to the packets, which may cause the TIG 120 to allow the packets (e.g., forward them towards "www.may-be-malicious-site.net") but log and capture the packets. The log may comprise MHDN information about the domain name (e.g., "www.may-be-malicious-site.net"). The TIG 120 may send the threat event log and packet capture file to the SOC 144 operated by the CSaaS provider CSAAS 140.

A cyberanalyst may analyze a threat event log. For example, a cyberanalyst may analyze a threat event log at the SOC 144. The cyberanalyst may investigate a web site (e.g., "www.may-be-malicious-site.net") and determine that it is malicious. The cyberanalyst may notify/report a threat event to one or more authorities and/or administrators (e.g., of PVT-NTWK-1 102). The cyberanalyst may recommend one or more remedial actions. The cyberanalyst may create a threat intelligence report that comprises a threat indicator (e.g., indicating a website such as "www.may-be-malicious-site.net") and/or a high-confidence "block" recommendation. The cyberanalyst may publish/send a CTI report. The CSaaS provider CSAAS 140 may include a CTI report in its CTIP 150 system. The CSaaS provider CSAAS 140's SPMS 160 system may collect the CTI report from CTIP 150. The CSaaS provider CSAAS 140's SPMS 160 may create a packet filtering rule comprising a "block" disposition and/or a matching criterion (e.g., indicating a website such as "www.may-be-malicious-site.net"). The CSaaS provider 140's SPMS 160 may include a rule in one or more policies. The CSaaS provider 140's SPMS 160 may distribute the one or more policies to one or more subscribers (e.g., which may comprise the subscriber TIG 120 protecting PVT-NTWK-1 102). Subsequently, if any application hosted within a network (e.g., PVT-NTWK-1 102) attempts to initiate a web session with an indicated malicious web site (e.g., "www.may-be-malicious-site.net") in a network associated with the indicated malicious web site (e.g., MAL-NTWK-1 130), a TIG 120 may block packets (and/or any other communications) associated with the attempt.

DNS sessions may be encrypted. For example, it may be the case that DNS sessions may be encrypted using, for example, DoH and/or DoT protocols, in which case the DNS query request and/or reply messages may be encrypted. In this case, the encrypted DNS sessions may be decrypted, for example, using a man-in-the-middle (MI™) TLS decryption and re-encryption proxy, which for example may be integrated with a TIG 120. The decrypted DNS sessions may be filtered by a TIG 120, which may include applying MHDN detector logic to the (decrypted) domain name in the DNS query requests. One or more web sessions may be encrypted using HTTPS, and similarly the encrypted web sessions may be decrypted using a TLS proxy, with the decrypted web session being filtered by a TIG 120, and with MHDN detector logic being applied to the (decrypted) domain name in the HTTP method request. Additionally or alternatively, for TLS-secured communications, such as DoH, DoT, and HTTPS sessions, a TIG 120 may filter the (unencrypted) TLS handshake ClientHello message and/or apply MHDN detector logic to the (unencrypted) domain name contained in the SNI field.

MHDN detection may be used in cyberanalyst workflow acceleration. MHDN detection technology may be applied retroactively and/or in near real-time or soft real-time to domain names that may appear in logs of threat communications events. This application of MHDN detection technology may increase a level of risk associated with a threat event log, as perceived by a human or machine cyberanalyst, thereby enabling the cyberanalyst to make better decisions about which threat events to investigate. Because cyberanalysts may be tasked with handling a large quantity (e.g., thousands or even millions or more) of threat event logs per time duration (e.g., per day, week, month, or any other duration), but may only be able to investigate a small quantity of them (e.g., a few, <10, or some other quantity) in such a time duration, selecting the best threat event log(s) for investigation and possible reporting to authorities for remediation and/or mitigation may increase the efficiency and/or effectiveness of the cyberanalyst in protecting networks (e.g., it may accelerate the cyberanalyst).

Figure 4:
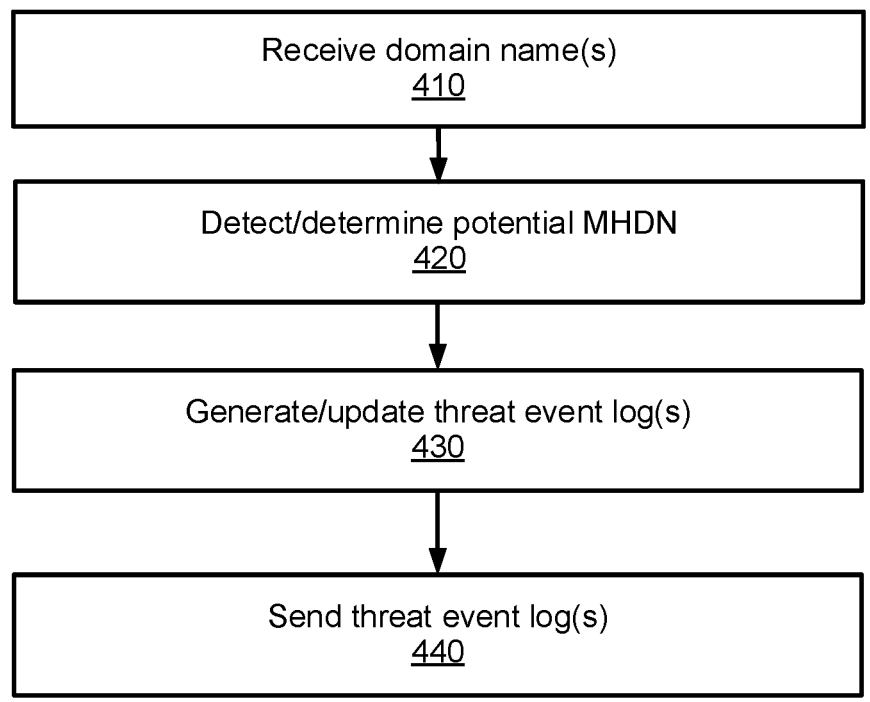
FIG. 4 shows an example method for MHDN detection and/or cyberanalysis workflow acceleration.

FIG. 4 shows an example method 400 for MHDN detection and cyberanalysis workflow acceleration. At Step 410, a computing device may receive one or more domain names. For example, a user may be connected to and/or in communication with a network PVT-NTWK-2 104 protected by a TIG 120 appliance (e.g., a Centipetal RuleGATE®). The TIG 120 appliance may be operated by a CSaaS provider CSAAS 140. The TIG 120 appliance may filter packets that comprise a communication with a malicious domain, such as a malicious web site (e.g., named "www.my.friut.net") connected to and/or in communication with a network (e.g., MAL-NTWK-2 132). The domain name (e.g., "www.my.friut.net") may be an MHDN that may be imitating the domain name of a popular and/or trusted site (e.g., "fruit.com"). At step 420, the computing device may detect and/or determine the one or more domain names comprise one or more potential MHDNs. For example, packets associated with a domain name may match one or more CTI-derived packet filtering rules applied by the TIG 120. At step 430, the computing device may generate and/or update one or more threat event logs. For example, the TIG 120 may create a threat event log, which may include the domain name of the malicious site (e.g., "www.my.friut.net") and/or one or more indicators indicating the domain name may comprise a potential MHDN. At step 440, the computing device may send the one or more threat event logs. The computing device may send the one or more threat event logs for further processing, such as by a human cyberanalyst and/or by a cyberanalysis workflow acceleration system. For example, the TIG 120 may send a threat event log to a SOC 144 operated by CSAAS 140. The one or more threat event logs may comprise one or more potential MHDNs and one or more indicators associated with the potential MHDN(s) that may indicate domain name(s) that are potential MHDN(s). The threat event logs may be sent to a human cyberanalyst and/or to a cyberanalysis workflow acceleration system for a determination of whether the threat event log(s) comprises one or more MHDNs.

Figure 5:
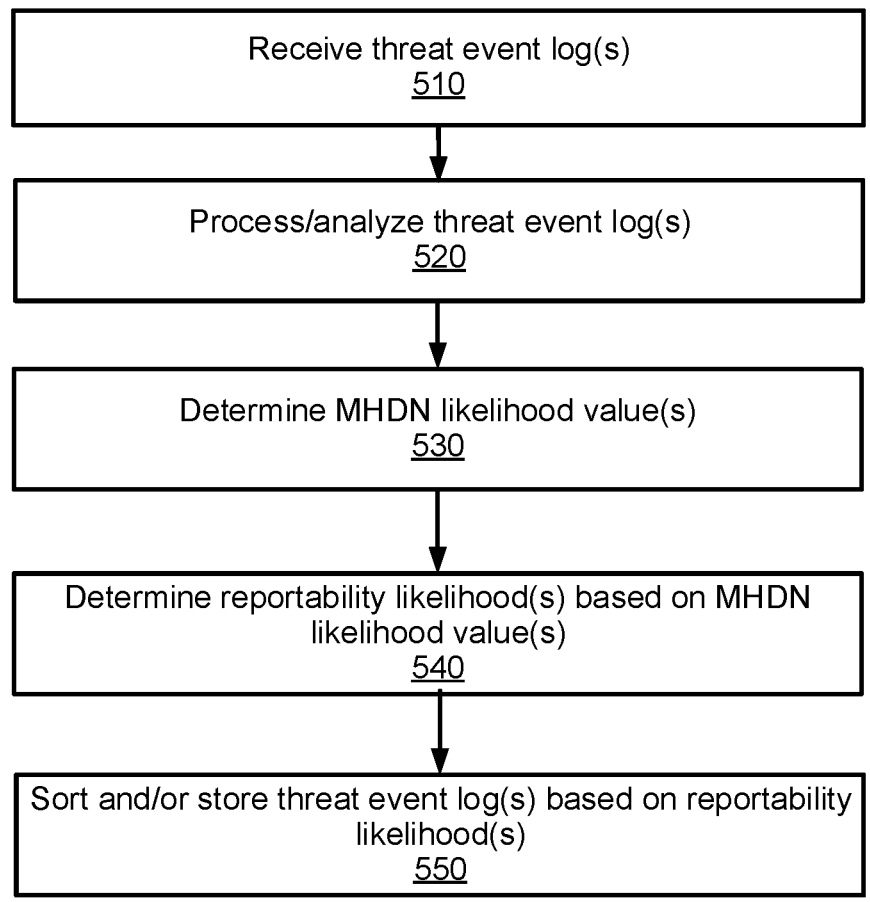
FIG. 5 shows an example method for MHDN detection and/or cyberanalysis workflow acceleration.

FIG. 5 shows an example method 500 for MHDN detection and/or cyberanalysis workflow acceleration. The method of FIG. 5 may be performed by a computing device or network, such as a SOC 144 operated by CSAAS 140. At step 510, a computing device may receive one or more threat event logs. The one or more threat event logs may comprise the one or more threat event logs sent at step 440 described with respect to FIG. 4. At step 520, a computing device and/or one or more cyberanalysts may process and/or analyze the one or more threat event logs. The one or more threat event logs may be processed and/or analyzed using one or more SIEM applications (e.g., at the SOC 144 operated by CSAAS 140), such as cyber threat analysis and/or awareness applications. Because the communications event may have already matched on CTI—for example, an IP address and/or domain name and/or URL associated with the malicious domain that may be contained in the packets comprising the threat communications event—there may be some baseline non-zero level of threat risk associated with the event. Upon receiving the threat event log, log processing system(s) at the SOC 144 may apply an MHDN detector/Inverse-MHDN solution to the domain name (e.g., "www.my.friut.net") in the log. At step 530, a computing device may determine an MHDN likelihood value for one or more potential MHDNs in the one or more threat event logs. A resultant MHDN determination and/or MHDN likelihood value (e.g., between 0 and 1, inclusive), confidence value, inverse homoglyph domain name (e.g., "fruit.com"), and/or the PDNL (e.g., "fruit") may be included/inserted into a threat event log comprising the potential MHDN. This process may be performed for each threat event log of the one or more threat event logs. At step 540, the computing device may determine a reportability likelihood (e.g., for each threat event log of the one or more threat event logs) based on the MHDN likelihood value. For example, the threat event log may be processed by a combination of static, human-designed heuristic algorithms and machine-learned algorithms (e.g., such as in Centripetal's AI-Analyst®) that may factor in the MHDN likelihood value and/or confidence value when computing an overall "reportability" likelihood that the threat communications event may be reportable to a network's (e.g., PVT-NTWK-2 104's) cyber administrators and thus should be investigated further by a cyberanalyst for verification and identification of (potential) remedial actions. At step 550, the computing device may sort each of the one or more threat event logs based on its reportability likelihood and/or the computing device may store each of the one or more threat event logs based on its reportability likelihood (e.g., store threat event log(s) in a sorted order, such as in a sorted event queue and/or sorted work queue). For example, the threat event log(s) may then be sent to and/or placed on a cyberanalyst's work/task queue that may be prioritized/ordered by the reportability likelihood(s) of each threat event log, which has factored in or otherwise may comprise the MHDN likelihood and/or confidence value. Thus, a high (e.g., close to 1.0) MHDN likelihood and high confidence value, in combination with heuristic algorithms' reportability likelihoods, may cause a reportability likelihood (e.g., a combined reportability likelihood) for the event to be high. Because the cyberanalyst's workflow process/cycle may begin by selecting a next task/threat event log at the top/front of the queue, which is the task/threat event log with the highest reportability likelihood among the tasks/threat event logs remaining in the queue, the MHDN likelihood and/or confidence value of the MHDN (e.g., "www.my.friut.net") may directly accelerate the cyberanalyst's workflow, which may provide advantages such as improved productivity, quality, and/or efficiency of the cyberanalyst's work (e.g., as may be measured by the rate of true positive threat events reported to the customer with remedial actions that strengthen the customer network's security posture). The cyberanalysis workflow acceleration described herein may comprise one or more processes of the cyberanalysis workflow acceleration described in U.S. Pat. No. 10,503,899 ("the '899 patent"), incorporated by reference herein. For example, the cyberanalysis workflow acceleration process described with respect to FIG. 3 of the '899 patent may be enhanced by including an MHDN determination (e.g., a binary indication such as yes/no and/or I/O) and/or MHDN likelihood value (e.g., between 0 and 1, inclusive) as a factor (e.g., as an input of at least one algorithm, such as a human-designed algorithm and/or a machine-learned algorithm) for determining an overall reportability likelihood. The method of FIG. 4 may be combined with the method of FIG. 5 in a cyberanalysis workflow system using MHDN detection. For example, one or more computing devices in a cyberanalysis workflow system may perform the method 400 of FIG. 4 and/or the method 500 of FIG. 5.

MHDN detection described herein may require an upper-bound on computation time and/or computational time complexity. For example, an MHDN detector's performance requirements may include a small/low computation time (e.g., near real-time or soft real-time). A target environment for cyberanalyst workflow acceleration may comprise a CSaaS provider (e.g., CSAAS 140) with a centralized security operations center (e.g., SOC 144) that may be servicing multiple CSaaS subscribers/customers where the typical rate at which threat event logs may be received (e.g., by the SOC 144) may be high (e.g., multiple thousands per second, and/or any other high rate), and where a significant portion of the threat event logs may include domain names that may have an MHDN detector/Inverse-MHDN solution applied to them. In this environment, an automated MHDN detector/Inverse-MHDN solution may be required and/or may be particularly advantageous, for example, because a human cyberanalyst may not be able to inspect and/or process the threat event logs for MHDNs at such a high rate. And, for example, although low false positive rates and/or low false negative rates are always desirable, a primary requirement for small/low computation time may cause an MHDN detector, which may be parameterized/tuned for low computation time, to produce higher-than-desired false negative rates.

Figure 6:
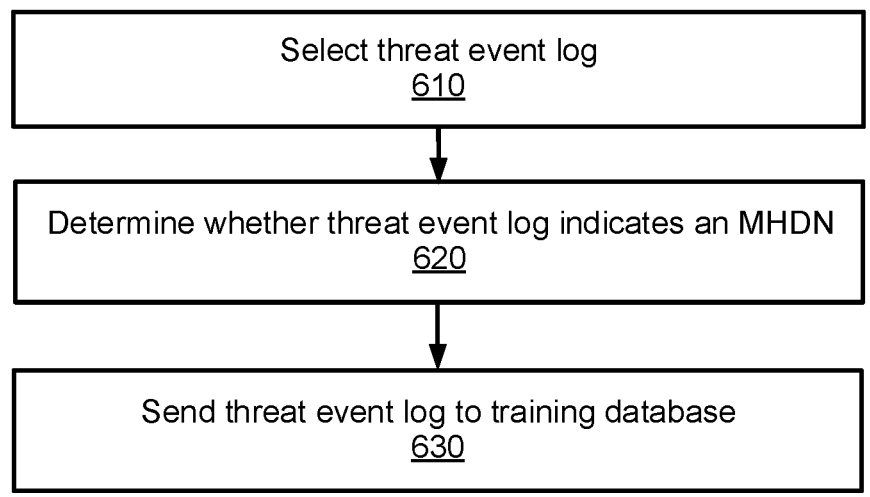
FIG. 6 shows an example method for MHDN detection and/or cyberanalysis workflow acceleration.

FIG. 6 shows an example method 600 for MHDN detection and/or cyberanalysis workflow acceleration. The method of FIG. 6 may be performed by a human cyberanalyst and/or by one or more computing devices. At step 610, a computing device and/or a human cyberanalyst may select a threat event log. For example, to initiate a workflow process cycle, a human cyberanalyst may select a next threat event (e.g., at the beginning/front of a work/event queue comprising a plurality of threat event logs) to investigate based on the threat event's reportability likelihood (e.g., each threat event log may be sorted by its respective reportability likelihood, from high to low, within a work/event queue). At step 620, a computing device and/or a human analyst may determine whether the selected threat event log indicates an MHDN. For example, assuming that the selected next threat event log includes an MHDN (e.g., "www.my.friut.net") with a high reportability likelihood estimate, then the reportability likelihood may have factored in the MHDN likelihood and/or confidence value. After completing an investigation of the threat event, the human cyberanalyst may make a final and/or actual determination whether or not to report the threat event to the customer (or any other entity and/or computing device). The cyberanalyst may apply to the threat event log an indication (e.g., TRUE or FALSE, or 1 or 0) of whether or not a domain name associated with a threat event log is an MHDN and may also apply to the threat event log an indication (e.g., TRUE or FALSE, or 1 or 0) of whether or not the threat event is reportable. At step 630, a computing device and/or a human analyst may send the threat event log to a training database. For example, after the reportability determination has been made by the human cyberanalyst, the threat event log may be removed from the work/event queue and/or added to a training database for a machine learning system that may produce a threat event reportability likelihood estimator in the form of, for example, a neural network. The neural network may comprise an "MHDN" input node that may correspond to an indication (e.g., TRUE or FALSE, or 1 or 0) of whether or not a domain name associated with a threat event log is an MHDN. By training the neural network with the "MHDN" input node on threat event logs that are labeled with actual, human-determined reportability values (e.g., "1" for reportable threat events, and "0" for non-reportable threat events), then the neural network may be trained to capture the human cyberanalyst's decision-making for determining reportability. The decision-making for determining reportability may comprise consideration of whether or not a domain name is an MHDN. As more training data is added to the training database, the neural network may produce improved reportability likelihood estimates, which may then further accelerate (and improve) the cyberanalyst's work flow processes.

MHDN detection may comprise a human cyberanalyst making a final determination of a domain name being an actual MHDN. For example, a final determination of the actual reportability of a threat event may be made by a human cyberanalyst and/or a final determination that a domain name is an actual MHDN may be made by a human cyberanalyst. Accordingly and similarly, after completing an investigation of a threat event that includes an MHDN likelihood estimate and/or confidence value, the human cyberanalyst may make a final and/or actual determination whether or not the associated domain name is an MHDN (e.g., at step 620). After the domain name's MHDN determination has been made by the human cyberanalyst, the domain name (and/or possibly other information, such as information extracted from the threat event log and/or features extracted from and/or derived from the domain name) may be added to a training database for a machine learning system (e.g., at step 630). The machine learning system may produce an MHDN likelihood estimator in the form of, for example, a neural network classifier. By training on domain names (and/or associated information and/or features that may be derived from the MHDN detector's output and/or metadata) that are labeled with actual, human-determined MHDN values (e.g., "1" for MHDNs, and "0" for non-MHDNs), then the neural network may be trained to capture a human cyberanalyst's decision-making process for determining whether or not a domain name is an MHDN. As more training data is added to the training database, the neural network may produce improved MHDN likelihood estimates. The improved MHDN likelihood estimates may be factored in to the reportability likelihood of an associated threat event, which may then further accelerate (and/or improve) a cyberanalyst's workflow processes.

MHDN detection may comprise detecting one or more MHDNs in one or more DNS query requests. Networked applications, such as web browsers, may use an Internet DNS, such as DNS 170, to translate domain names into IP addresses. Domain names may be translated into IP addresses, for example, so that IP packets comprising a web/HTTP(S) communication may be routed through the Internet between a web/HTTP(S) client (e.g., comprising a web browser) and a web/HTTP(S) server with a particular domain name. To obtain an IP address of the web/HTTP(S) server, a web browser may issue a DNS query request comprising the domain name of the web/HTTP(S) server. The DNS may respond with a DNS query reply containing the IP address for the domain.

A network may use a DNS proxy to handle a DNS query request. For example, often, enterprise networks (such as PVT-NTWK-1 (102) and/or PVT-NTWK-2 (104)) may use DNS proxies (not shown in FIG. 1) to handle DNS query requests that may be issued to a DNS (e.g., DNS 170) by host computers connected to the enterprise networks. A DNS proxy may intercept DNS query requests. A DNS may resolve the domain name to its IP address by forwarding the DNS query requests toward DNS name servers and/or other DNS proxies comprising the DNS (e.g., DNS 170). An enterprise network's DNS proxy may be configured with an MHDN detector, which may be configured as a service or process that the DNS proxy host executes. Upon receiving a DNS query request, the DNS proxy may extract the domain name. The DNS proxy may input the domain name into the MHDN detector. If the MHDN detector determines or estimates that the domain name is not (or is unlikely to be) an MHDN, then the DNS proxy may forward the request towards the Internet DNS for resolution. If instead the MHDN detector determines or estimates that the domain name may be (or is likely to be) an MHDN, then the DNS proxy may be configured to take some protective action(s), such as not forwarding the DNS query request towards the DNS 170 but spoofing a DNS query reply with a message (e.g., a NXDOMAIN message) and sending it back to the originating host/client, which may prevent the application that originated the DNS query request from communicating with a potentially malicious domain. The DNS proxy may also log the DNS query request comprising the MHDN and the (spoofed) reply, and log/record such information as the originating host's IP address, as this host may be, for example, infected with malware or, for example, the user may have been tricked (by the MHDN) into clicking a URL link comprising the MHDN that is embedded in an e-mail. The log may be sent to the SOC 144 where it may be processed by, for example, a threat awareness application. The SOC 144 also may include the MHDN in a threat intelligence report, may include the MHDN in its CTIP 150 service, and/or may include the MHDN in one or more packet filtering rules and/or policies that may be distributed by its SPMS 160 service to subscribers (such as one or more TIGs 120 that may be protecting the networks of subscribers to the CSAAS 140 services).

As an alternative to the protective action that spoofs the DNS query reply to prevent the application from communicating with the malicious domain, a DNS proxy may instead, for example, forward the DNS query request to a DNS (e.g., DNS 170) for resolution, but log the request and reply (and/or other information) and send the log to the SOC 144 where it may be processed, for example, by a threat awareness application.

MHDN detection may comprise one or more tuning parameters. For example, DNS queries/lookups may be expected to use 20-120 milliseconds or some other time duration that may be determined to be relatively large. Processing time requirements for an MHDN detection may be significantly less than that of DNS queries/lookups. For example, MHDN detection may take up to 10 milliseconds or some other time duration, which may be added to the expected DNS query/lookup time without affecting the quality of applications' performance and of users' experiences. However, in at least some examples, the time duration for MHDN detection may be relatively large and/or undesirable (e.g., a time duration of 10 milliseconds may be relatively large and/or undesirable). Tuning parameter configurations may provide for broadly scoped searches, which may lead to advantages such as increasing distance measures and metrics, such as Levenshtein distance upper bounds/ maximums, in MHDN detection algorithms/processes and/ or increasing the domain popularity bound, which may affect false positive rates and/or false negative rates.

MHDN detection may comprise identifying MHDNs in NRD feeds. Both legitimate and malicious actors may register new domain names with DNS registrar services, which may publish newly registered domain names (e.g., in practice, this may occur daily). Globally, each day there may be a large quantity (e.g., many thousands) of NRDs. NRDs and associated registration information (e.g., registrar, registrant (domain name owner), domain name, creation date, name server, etc.) may be collected by various third-party organizations, such as by using the WHOIS protocol (RFC 3912) to query DNS registrars and registries. For example, the shell command "whois centripetal.ai" may return the following: Domain Name: centripetal.ai; Registry Domain ID: 862131_nic_ai; Registry WHOIS Server:: whois.nic.ai; Creation Date: 2019 Dec. 12T20:04:33.819Z; Registrar: 1api.net; Registrar Abuse Contact Email: abuse@1api.net; Registry Registrant ID: KFxch-kgnLI; Registrant Name: Redacted| EU Registrar; Registrant Organization: Centripetal Networks, Inc.; Registrant Street: 99 Bow St., Suite 300 West; Registrant City: Portsmouth; Registrant State/Province: New Hampshire; Registrant Postal Code: 03801; Registrant Country: US; Registrant Phone: Redacted| EU Registrar; Registrant Email: Redacted| EU Registrar; Name Server: George.ns.cloudflare.com; Name Server: ligia.ns.cloudflare.com; DNSSEC: unsigned. Other information, such as more details about the registrar organization, may also be included, such as: refer: whois.nic.ai; domain: AI; organisation: Government of Anguilla.

Third parties may publish (e.g., daily) a list of NRDs and associated information. At least some third parties, such as a CSaaS provider (e.g., CSAAS 140), may subscribe to one or more of these lists (e.g., daily-published lists). A CSaaS provider (e.g., CSAAS 140) may then apply its MHDN detector/Inverse-MHDN logic to the NRDs to identify a list of potential MHDNs. These potential MHDNs may comprise both imitations of well-known popular domain names as well as imitations of domain names of the CSaaS provider's subscribers/customers, which may not be well-known popular domain names but nevertheless may be targeted for MHDN-vectored threats and/or attacks (e.g., spear phishing attacks) by one or more malicious actors. Because of the relatively low volume and rate of the NRDs compared to the real-time, soft real-time, or near real-time requirements of some other applications such as described herein, the MHDN detector's tunable parameters may be tuned, for example, to search more broadly (e.g., increase Levenshtein distance upper bound/maximum to 3 or more) and therefore may use more time when estimating MHDN likelihood for each NRD, which may, for example, reduce false negatives.

One or more parameters described herein may be a tunable parameter. By using one or more parameters that are tunable, one or more characteristics and/or performance measures may be improved, such as improvement of computation time, false positive rate (FPR), false negative rate (FNR), and/or any other characteristic/performance measure. For example, using one or more tunable parameters may provide for dynamic configuration of parameters, such that performance may be "tuned" based on adjustments to the one or more tunable parameters. For example, tuning for faster performance may cause an increase in FPR and/or an increase in FNR. However, an increase in FPR and/or an increase in FNR may be acceptable in some scenarios, for example, if it leads to a desired increase in performance speed (e.g., decrease in processing time). Similarly, tuning for low FNR may result in an increase in computation time and/or an increase in FPR. Various tradeoffs may be possible based on tuning one or more tunable parameters. The one or more tunable parameters may be applied to Inverse-MHDN and/or Forward-MHDN procedures described herein. The following parameters, while not exhaustive of all tunable parameters, are described herein and may each be a tunable parameter: maximum number of paths, maximum input length, maximum Levenshtein distance, weight of customer type, weight of popular type, weight of English type, weight of TLD type, weight of number of slices, weight of Levenshtein distance, Tranco cutoff.

The list of potential MHDNs may then be reviewed and/or investigated by one or more human cyberanalysts (e.g., at the SOC 144), who may make a determination as to whether each potential MHDN is an actual MHDN (e.g., a true positive) or not (e.g., a false positive). Next, the human cyber analysts' output/results/determinations (e.g., especially the true positive MHDNs) may be used, for example, to improve cyber protections, such as in connection with a CTI feed, distribution of MHDNs to MHDN detectors, notification of CSaaS subscribers/customers of targeted MHDNs, machine-learning training databases, and/or any other applications described herein.

Information relating to MHDNs may be added to a CTI feed. In addition to being a provider of a CSaaS service for network protection, CSAAS 140 also may be a CTI provider organization CTIP 150 that publishes feeds of CTI that it generates to subscribers. As each actual MHDN may be determined (e.g., by the human cyberanalysts), it may be augmented with MHDN threat metadata (that may be, for example, comprised of whois information, inverse homoglyph information, and/or any other information), added to a CTI feed for MHDNs, and/or published to subscribers (e.g., SPMSs 160).

MHDNs may be distributed to MHDN detectors. For example, true positive MHDNs may be provided to an Inverse-MHDN service (e.g., INV-MHDN-SVC 141) that may then distribute the MHDNs to subscribing MHDN detector instances. MHDN detectors may insert the MHDNs into caches and/or data structures that may be used, for example, to efficiently/quickly detect/determine if an input domain name is an MHDN without requiring a full MHDN detection computation.

CSaaS subscribers/customers may be notified of targeted MHDNs. For example, MHDNs may be effective in part because they spoof/imitate domain names that people trust. Such domain names are often associated with the names of generally well-known, popular organizations. However, less well-known organizations may also be targeted for MHDN-vectored threat and/or attack by, for example, spear-phishing e-mails to the organizations' customers that may be requesting payments. As part of a comprehensive cyber protection service, a CSaaS provider such as a CSaaS (e.g., CSAAS 140) may search NRD feeds/databases for MHDNs that spoof/imitate its subscribers/customers (e.g., well-known and/or less well-known), and then notify its subscribers/ customers about the MHDNs. The customers may then work with CSAAS 140 to remediate the threat by, for example, contacting the registrars of the MHDNs about the threat and/or configuring their TIGs 120 to protect against any associated MHDN-vectored threats/attacks.

Information related to MHDNs may be used with machine-learning training databases. In at least some examples, it may be necessary for a human cyberanalyst to make the determination of whether or not a domain name or potential MHDN is an actual MHDN. In such examples, machine learning systems (e.g., an artificial neural network (ANN) operated by CSAAS 140) may be used to capture and/or emulate a human cyberanalysts' MHDN determination decision-making process. Accordingly, if a human cyberanalyst determines/decides whether a potential MHDN is an actual MHDN (e.g., true positive) or not (e.g., false positive), then the determination/decision, the (potential) MHDN, and/or associated information may be added to training data for the ANN. Subsequently, the associated ANN classifier may be integrated with an associated MHDN detector/Inverse-MHDN solution.

MHDN detection may be applied to CTI feeds. For example, there may be a large ecosystem of CTI providers that supply CTI in the form of network threat indicators (e.g., IP addresses, domain names, URLs, and the like) associated with malicious activity on the Internet. CTIPs may deliver their CTI as lists, or (streaming) feeds, of indicators, where each feed may be characterized by indicator type (e.g., IP addresses, domain names, URLs, and/or any other indicator), associated threat type (e.g., phishing, command & control, scanning, and/or any other threat type), confidence level, severity, and/or any other characteristic.

CTIPs 150 may publish lists, or feeds, of domain name threat indicators. CTIPs may publish lists, or feeds, of domain threat indicators in a manner similar to the sources of NRDs as described herein with respect to identifying MHDNs in NRD feeds. Organizations such as CSaaS providers (e.g., CSAAS 140) may subscribe to these feeds and may, for example, use the information in a cyber defense system. In some examples (e.g., often), the CTIPs may not identify which domain names in their feeds may be MHDNs, which may be because the CTIPs' human cyberanalysts need tools like the MHDN detector/Inverse-MHDN solution disclosed herein, for example, in order to handle the volume of new domain name CTI that their automated CTI creation systems may be generating. As the domain name CTI feeds are received, a subscriber such as CSAAS 140 may then apply its MHDN detector/Inverse-MHDN solution logic to the domain names in the feeds. If the MHDN detector/Inverse-MHDN solution determines that a domain name may be an MHDN, then the domain name may be associated with MHDN information (e.g., inverse homoglyph, likelihood score, confidence value, creation methods, and/or any other information related to an MHDN) as metadata. Such metadata may then be used to improve the effectiveness of the CSaaS service. Furthermore, the organization being spoofed/imitated by the potential MHDN may be alerted to its existence and/or may take action to mitigate its effects.

Analysis (e.g., further analysis) by a human expert may confirm (or not) that the domain name is an actual MHDN. The human expert's determination may be used to (further) augment the metadata (e.g., the likelihood may be set to 1 or 0 accordingly and the confidence value may be set to "High" or "Low" accordingly). The domain name and associated MHDN metadata may be used by a machine learning system as training data. The actual MHDNs may be included in domain name CTI feeds that may be published by the CSAAS 140. One or more parameters of MHDN detection logic may be tuned. The one or more parameter of MHDN detection logic may be tuned, for example, to minimize false positives but process a large quantity of domain names (e.g., up to a few million domain names per day, which may be a typical volume of domain name threat indicators produced each day by an ecosystem of CTI providers).

Data mining of historical databases of potential threat communication events may be used with MHDN detection. Cyber defense system providers (such as CSAAS 140) and users/subscribers (such as PVT-NTWK-1 102) may (often) store historical data of (potential) threat communications events observed by their cyber protection systems. Such systems may generate a large quantity of threat events (e.g., millions of threat events per day) that may contain domain names. Historical data may be stored for a long time duration (e.g., months or even years). One or more databases may be mined for instances of potential MHDNs. A human expert may not be able to practically search through one or more (large) databases for potential MHDNs. A machine MHDN detector may be used to more readily search through such database(s). Tuning parameters may be adjusted such that a database may be searched in a practical amount of time, with associated tradeoffs on false positive and false negative rates.

Data mining may lead to discovery of threat events associated with MHDNs that were not recognized as significant threats or reportable findings at the time of occurrence. Discovered MHDNs may be included in training databases for machine learning systems and/or may be published in CTI feeds as described herein. One or more parameters of MHDN detection logic may be tuned, for example, to minimize false positives and/or false negatives. Search times may be increased, although the massive volume of historical data may constrain time parameters to complete a search in a practical amount of time.

FIG. 3B shows an example MHDN method 300B. Method 300B may comprise method 300A described herein, wherein like numerals 310B, 320B, 330B, 340B, 350B, and 360B may comprise the steps described herein with respect to steps 310A, 320A, 330A, 340A, 350A, and 360A, respectively. Method 300B may comprise a process by which one or more MHDNs may be detected, such as by an Inverse-MHDN solution or MHDN detector.

FIGS. 3C-3D shows an example MHDN method 300C. Method 300C is an example of the method 300B of FIG. 3B in which a particular MHDN (e.g., "αpp1E.sup.port.[ ].github.io") may be detected and/or a particular non-MHDN and/or inverse-homoglyph (e.g., "apple" or "apple-support") may be determined. Method 300C may comprise method 300B described herein, wherein like numerals 310C, 320C, 330C, 340C, 350C, and 360C may comprise the steps described herein with respect to steps 310B, 320B, 330B, 340B, 350B, and 360B, respectively. The remaining steps shown in FIGS. 3C-3D may correspond to the same numbered steps shown in FIG. 3B.

At step 310B, one or more domain names may be received and/or determined, such as described with respect to step 310A. The one or more domain names may be received in the form of an input domain name, which may be a fully qualified domain name (FQDN). The FQDN may serve as an input to an MHDN detector. At step 310C, a domain name may be received that may be presented to a user of a computing device in the form of "αpp1E.sup.port.[ ].github.io" (noting alpha character "α" in a place where letter "a" may be anticipated, number "1" in a place where letter "1" may be anticipated, and capital "E" in a place where lowercase "e" may be anticipated).

At step 320B, the one or more domain names may be analyzed, such as described with respect to step 310A. Before, during, and/or after step 320A, step 320B, and/or step 320C, an input domain name may be compared with frequently imitated websites. For example, some companies, such as Mastercard™ (and their brands, domain names, websites, etc.) may be imitated in MHDN-vectored threats and/or attacks more frequently than some other companies (and their brands, domain names, websites, etc.) that may be less well-known. A relatively high frequency and/or reoccurrence of certain website imitation may provide an opportunity, for example, to pre-load such frequently imitated websites into small, fast lookup tables (and/or any other type of data/memory). This pre-loading may be beneficial in resource-constrained environments, for example, in which processing power and/or memory required for an application should/must be kept to a minimum. A list of frequently imitated websites may be determined/generated/updated, and then, for example, "finite state machines" (FSMs) may be determined/generated/updated from strings (e.g., finite state machines are the method used to do string matching in the presence of errors) which may be matched against potential MHDNs. Additionally or alternatively, a system/device/method may create FSMs out of potential MHDNs and then use those FSMs to match against fixed popular and/or customer domains. Creating FSMs out of frequently imitated domains may be advantageous, for example, because they may be created ahead of time and cached. Creating FSMs may be the most expensive part of the algorithm, so caching these may lead to significant (e.g., potentially huge) resource savings.

Step 320B may comprise determining whether one or more domain names are in a popular domain blacklist (at step 321) and/or determining whether one or more domain names is longer than a maximum input length (at step 322). At step 320C, a domain name may be received by and/or arrive into a system in a form of a (punycoded) domain name (e.g., "xn-pp1E-zld.sup.port.xn-gtvz22d.github.io") which may include some of the techniques that malicious actors may use when constructing MHDNs.

A popular domain may be (among) one of the most popular domain names in the world/on the Internet. Popular domain names may be selected from, for example, the Tranco list of the one million most popular domain names, and/or any other list of popular domain names. Popular domain names may be used (e.g., are often used) by malicious actors to derive MHDNs. A popular domain blacklist may be a list of (among) the most frequently accessed domain names in the world. For example, if the "Input FQDN" is on the popular domain blacklist, then the Input FQDN is most likely a legitimate FQDN and not an MHDN. For example, if Fruit.com may be a popular domain, support.fruit.com likely is not trying to imitate Fruit. Rather, support.fruit.com may actually be a Fruit-owned domain name. If the one of more domain names are determined to be in a popular domain black list (e.g., at step 321), the MHDN method 300B may end (e.g., at step 325). One or more popular domain filters (e.g., one or more Tranco list domains) may be used. For example, it may be unlikely that a domain name in a top-ranked domains list (e.g., in a Tranco data set) may be an MHDN. Thus, filtering out any domain name in that subset (e.g., of Tranco) before running it through an engine/algorithm/process may be advantageous. A cutoff to make it into this (and/or other) filter subset(s) (e.g., of Tranco) may be a tunable parameter. For example, a Tranco cutoff may be a tunable parameter, as described herein. Raising such a parameter may, for example, reduce a false positives rate but may increase a false negatives rate. One or more CSaaS customer domains may be included in the popular domain blacklist. For example, if a domain name is received that is determined to be a CSaaS customer domain name, it may be determined that the domain name is not an MHDN without further analysis.

Identification of some words and or phrases, such as "authoritative phrases", may be used to improve accuracy and/or efficiency of MHDN detection (e.g., by turning false negatives into true positives). For example, malicious actors sometimes use authoritative words and/or phrases (e.g., "support", "IT", "admin", etc.) in domain names to gain an appearance of legitimacy in the mind of their target(s). For example, a bad actor trying to imitate "Fruit.com" may register the domain name "Fruit-tech-support.com". Compiling a list of legitimacy-effecting words and/or phrases may help to identify potential MHDNs and may help turn false negatives into true positives. For example, step 320A, step 320B, and/or step 320C may include a determination of whether a domain name comprises a word and/or a phrase in a list of legitimacy-effecting words and/or phrases, and if so, it may override one or more other determinations (e.g., step 321 and/or step 322) and/or it may be applied in one or more others steps relating to indicating a potential likelihood of the domain name being an MHDN (e.g., step 340A, step 340B, step 340C, and/or any sub-steps such as step 341, step 342, and/or step 343).

Some common words may be used as a blacklist (e.g., blacklisting common words). Additionally or alternatively, a popular domain blacklist may be modified based on a likelihood of one or more MHDNs using a word and/or phrase. For example, some company names may be extremely common English words that may not be widely recognized as the name of a company. Such companies may be unattractive targets for MHDN-vectored attacks, for example, if the company name is simply a common English word and therefore carries little authority. An example of this kind of name may be "mail.com". The word "mail" naturally occurs in subdomains because it is often used as a label to indicate that a domain name points to an email server. By finding/determining that every subdomain with "mail" in it is an MHDN of mail.com, a system/device may be inundated with false positives. For this reason, a list of the intersection between common English words and a "primary domain name label" (PDNL, the "+1" of an eTLD+1) of popular domains may be used/determined. The most common labels from this intersection that are unlikely to be part of an MHDN-vectored attack may be determined and may be filtered out from a search set of popular websites.

A maximum input length (or "max input length") may be an arbitrary limit to the length (e.g., in bytes) of input domains. For example, a maximum input length may be the maximum number of bytes in an input string, past which the input string may be dropped and no match may be returned. A maximum input length may be a tunable parameter, as described herein. Using a maximum input length may be beneficial to maintain soft-real-time performance. If this value is increased, then the engine may take longer on average to process a domain name. An MHDN detection process may be O(N) in the size N of the input string, which may indicate that its execution time may be proportional to the length of the input FQDN. This size may be efficient for the task it accomplishes, but it may still be necessary to restrict the length of an input string for performance reasons and/or for heuristic reasons. For example, real-world MHDNs tend to have a (statistically) minimum length and a maximum length. In some instances, 64 bytes may be, for example, a good tradeoff between "too slow" and "too strict" and "too long". The maximum input length may be predetermined (e.g., at 64 bytes or any other length) or variable (e.g., based on user input). If the one or more domain names are determined to be longer than the maximum input length (e.g., at step 322), the MHDN method 300B may end (e.g., at step 325). Step 321 and/or step 322 may be optional. Step 321 and/or step 322 may be performed in any order (e.g., step 321 may be performed after, before, or in parallel with step 322).

At step 323, the one or more domain names (e.g., Input FQDN) received at steps 310B and 310C may be input to a normalization process at steps 330B and 330C, respectively. The normalization process may comprise one or more of steps 331-337.

At step 331, a computing device may remove an eTLD from the one or more domain names. TLD may stand for "top-level domain". TLDs may be the rightmost labels in a domain name, such as "com" and "net". The Internet Governance Forum (IGF) may manage at least some TLDs (e.g., most TLDs). eTLD may stand for "effective top-level domain", and it may refer to the rightmost portion of a domain name that matches an entry in Mozilla's Public Suffix List (https://publicsuffix.org/). For example, the eTLD of example.Fruit.com is "com". The eTLD of "example.github.io" is "github.io". As shown in step 331 of step 330C, a result of removing the eTLD (e.g., "github.io") of the Input FQDN (e.g., "xn-pp1E-zld.sup.port.xn-gtvz22d.github.io") is "xn-pp1E-zld.sup.port.xn-gtvz22d".

At step 332, a computing device may convert an IDNA punycode to UTF-8. IDNA may stand for "internationalizing domain names in applications," and may be (frequently) used to refer to domain names with non-ASCII characters in them, such as A. Punycode may be the method by which these non-ASCII characters may be encoded into ASCII-compatible text, which may be what a DNS may require. For example, A may be encoded as xn-swa. UTF-8 may be a standard way of representing text in bytes. This may be an alternative encoding to ASCII and punycode. A text processing facility may require (e.g., most text processing facilities require) the use of UTF-8, which may be why it may be advantageous to convert to it early in the MHDN detector process pipeline. As shown in step 332 of step 330C, a result of converting an input of "xn-pp1E-zld.sup-.port.xn-gtvz22d" from IDNA punycode to UTF-8 yields an output of "αpp1E.sup.port.[ ]".

At step 333, a computing device may partition a UTF-8 string into extended grapheme clusters (EGCs). EGC may be a sequence of bytes within a UTF-8-encoded string that represents a single, visually distinct character. This may differ from UTF-8 bytes or code points, both of which may only be part of what a human being would label as a single character. As shown in step 333 of step 330C, a result of partitioning a UTF-8 string input (e.g., "αpp1E.sup.port.[ ]") yields an output of "a/p/p/1/E/./s/u/p/./p/o/r/t/./[/]".

At step 334, a computing device may replace confusable EGCs with their ASCII lookalikes. Confusable EGCs may be a confusable extended grapheme cluster, which may be one that is visually similar to one of the ASCII letters, for example, "a"-"z", "A"-"Z", and "0"-"9". ASCII may be a one-byte encoding for English characters consisting mostly of the ten digits and the English alphabet in lowercase and uppercase. As shown in step 334 of step 330C, a result of replacing confusable EGCs (e.g., "α/p/p/1/E/./s/u/p/./p/o/r/t/./[/]") with their ASCII lookalikes yields an output of "a/p/p/1/E/./s/u/p/./p/o/r/t/./[/]", wherein the character alpha "α" is replaced with the letter "a" and the number "1" is replaced with the letter "l". In another example, the number "1" may not be replaced with the letter "l", and/or any number may not be replaced with one or more letters, and/or any uppercase letter may not be replaced with a lowercase character, for example, if a replacement criteria excludes replacing ASCII characters. However, in the example described with respect to step 334 of step 330C, and in other examples, a number may be replaced with a letter (and/or an uppercase letter may be replaced with a lowercase letter), for example, to improve detection of a homoglyph. For example, criteria for replacing confusable ECGs with this ASCII lookalikes may comprise identification of any one or more characters that may look like one or more lowercase ASCII letters (e.g., such as the number "1" or the uppercase letter "L"), and replacement of the one or more characters into the corresponding one or more lowercase ASCII letters (e.g., such as the lowercase letter "l").

At step 335, a computing device may remove non-ASCII EGCs. As shown in step 335 of step 330C, a result of removing non-ASCII EGCs (e.g., from "a/p/p/1/E/./s/u/p/./p/o/r/t/./[/]") may yield an output of "a/p/p/1/E/s/u/p/p/o/r/t", wherein each "." and non-native language character is removed.

At step 336, a computing device may convert remaining EGCs to lowercase. As shown in step 336 of step 330C, a result of converting remaining EGCs to lowercase (e.g., from "a/p/p/1/E/s/u/p/p/o/r/t") may yield an output of "a/p/p/1/e/s/u/p/p/o/r/t", wherein the capital "E" is replaced with a lowercase "e".

At step 337, a computing device may recombine EGCs into a UTF-8 string. As shown in step 337 of step 330C, a result of recombining an EGC (e.g., "a/p/p/1/e/s/u/p/p/o/r/t") into a UTF-8 string may yield an output of "applesupport". This output may be provided as a normalized domain at step 338. A normalized domain may be a given input domain name, lowercased, with confusables converted to their ASCII counterparts, non-ASCII EGCs removed, and without domain label separators (e.g., "no dots").

The output of the normalization process (e.g., at step 338) may be provided as an input to a word segmentation process at steps 340B and 340C. The word segmentation process may comprise one or more of steps 341-343. Segmentation may correspond to a set of locations at which to separate a string into words. For example, a reasonable segmentation of the string "helloworld" may be "hello/world," where the/character may represent the decision to split a string at a given location (e.g., in between words of a string).

At step 341, a computing device may determine/select/choose possible segmentation of an input (e.g., an input UTF-8 string). Possible segmentation of an input may be based on a maximum number of paths. A maximum number of paths may be a tunable parameter, as described herein. For example, a maximum number of paths may be a number of segmentations that may be stored in a dynamic programming search queue. Dynamic programming may comprise a form of optimization that may be used to find a segmentation with a lowest cost. In the context of dynamic programming, "path" may be (frequently) used and may refer to a particular segmentation in the context of an optimization algorithm (such as described herein). MHDN creation methods and/or techniques may be used to determine possible segmentation. MHDN creation methods and/or techniques may comprise information on MHDN creation methods and/or techniques that may be used by malicious actors to create actual MHDNs. Such information may be provided by and provided to Forward-MHDN processes, such as MAGMA (described herein), which may learn and exploit such information during an evolutionary process. Such information may be used by the Inverse-MHDN process, for example, during the word segmentation described with respect to steps 340A, 340B, and/or 340C, and more specifically, with respect to step 341. Word segmentation may be based on TLDs. For example, attackers may (frequently) use common TLDs in sublabels of a domain name to confuse victims. For example, an attacker might register "example.com.badguy.co". For this reason, a word segmentation engine may be configured to know about such popular TLDs to be able to pick them out of a string such as "examplecombadguyco".

As shown in step 341 of step 340C, a result of determining/selecting/choosing possible segmentation of an input (e.g., "applesupport") may yield an output of "ap/plesupport" and/or any other segmented string(s) (e.g., "a/pplesupport", "app/lesupport", "appl/support", "apple/support", . . . , "applesuppor/t").

At step 342, a computing device may analyze/evaluate segmentation based on a cost function. For example, the computing device may determine a cost function for each of a plurality of segmentations. A cost function may be an arbitrary function used to evaluate a "quality" of a given segmentation, where a lower cost may be preferred. For example, a good cost function may output that "hel/loworld" is a higher-cost segmentation than "hello/world". The cost function may be where domain knowledge is encoded into the algorithm that finds words in strings (e.g., the process of segmentation). For example, domain knowledge may indicate that popular websites may be more likely to be imitated than unpopular websites. Therefore, this may indicate that finding the name of a popular website in a string may "cost" less (e.g., may take less time, computing power, quantity of searches, and/or complexity/scope of searches) than finding the name of an unpopular website. The cost function may correspond to a scoring criteria that is configured to indicate a measure of search preference for a respective segmentation. As shown at step 342 of step 340C, a result of analyzing/evaluating segmentation based on a cost function may yield an indication of a cost of 7.1 for a segmentation of "ap/plesup/port" and/or a cost of 2.3 for a segmentation of "ap/ple/support". A segmentation of "apple/support" may be indicated by a low (e.g., lowest) cost function, such as 1.0, 0.3, or 0.0.

At step 343, a computing device may determine a segmentation (e.g., a preferred segmentation, a best segmentation, etc.) based on one or more cost functions (e.g., one or more cost algorithms). For example, a determined/best segmentation of an input "applesupport" may be "apple/support" which may have a lowest associated cost function. Determining a segmentation may comprise determining/selecting a segmentation that is associated with a lowest cost among the costs of each of a plurality of segmentations. If a segmentation having an acceptably low cost is not determined, the computing device may return to step 341, for example, to determine (additional) possible segmentations.

A cost algorithm may be used to determine a cost of a segmentation. A cost algorithm may be based on one or more domains. For example, a cost algorithm may be based on one or more of a customer domain, a popular domain (e.g., a Tranco popular domain), and/or an English word set.

A cost algorithm may use one or more customer domains by checking to see if one or more segments is a customer domain. A segment may receive a particular value for a cost (e.g., $C_C$), for example, if the segment is a customer domain. A cost algorithm may use one or more popular domains (e.g., one or more Tranco popular domains) by checking to see if a segment is a popular domain. A cost algorithm may use one or more domains on a watchlist by checking to see if a segment is a segment of a domain on a watchlist. The watchlist may comprise one or more categories of domain names, such as domain names suspected of originating from a malicious source, domain names similar to confirmed domain names of malicious sources, etc. A cost algorithm may use one or more customer domains by checking to see if a segment is a segment of a customer domain name. A segment may receive a particular value for a cost (e.g., $C_P$), for example, if the segment is a popular domain. It may be advantageous to consider how popular a domain name is during segmentation optimization (e.g., one or more of steps 341, 342, and/or 343). Factoring popularity into cost of segments may allow for preference to find more popular domains over less popular domains, which may be advantageous because more popular domains may be more likely to be the target of an MHDN-vectored attack. For example, assume that "mail.com" and "mails.com" are both popular domains. Assume also that "mail.com" is significantly more popular than "mails.com". Given the potential MHDN "mail3.com", both "mail.com" and "mails.com" may have, for example, a Levenshtein distance of 1 from the potential MHDN "mail3.com". In order to determine which should be the "best" match for the MHDN, a system/device may use a domain popularity to give "mail" a different cost (e.g., a lower cost) from "mails". A number of popular domains that may be considered may be changed (e.g., top popular domain names may change based on changing popularity, additions of new popular domain names, etc.).

A cost algorithm may use one or more English word sets by checking to see if one or more segments is an English word. A segment may receive a particular value for a cost (e.g., $C_E$), for example, if the segment is an English word. The number of English words in this set may be changed. For example, if fuzzy matching (e.g., allowance of nonzero Levenshtein distances) is used along with a large English dictionary for word segmentation, the quality of segmentation results may worsen. This worsening may be due to the fact that in a large English dictionary, especially with allowed fuzzy matching, there may be a somewhat-close match between some English word in the dictionary and any arbitrary substring of the string being segmented. This may lead to poor segmentation because a segmentation algorithm may rely on a high cost associated with segmentation decisions that result in a split in the middle of what may be intuitively known to be a "word". Additionally, attackers may be unlikely to use uncommon English words in malicious homoglyphic domain names because that could confuse the intended victim. Accordingly, a set of English words may be restricted to common words which may provide improved segmentation and/or efficiency. In the examples described herein, the costs associated with various domains may have the following relationship: $C_C < C_P < C_E$.

A cost algorithm may use semantic similarity. For example, leveraging similarity in the meaning of words may catch some types of domain name imitating that do not rely on visual similarity but instead rely on semantic similarity. Consider, for example, the two domains "steves-memegenerator.com" and the semantically similar "steves-memecreator.com". These two domains differ in an entire word: "generator" versus "creator". However, attackers could realistically leverage the similarity in meaning between these two words to confuse Internet users and trick them into believing that one is the other. Datasets such as Princeton's WordNet that document semantic similarity between words may be used to create one or more graphs (and/or correlations) of word similarity and grade the "semantic distance" between two words based on the shortest distance between two words in this graph. Finding such a distance exactly may be computationally expensive, but approximate methods may be used to compute the near-shortest distance. These approximate methods may support soft-real-time computation.

At step 344, a segmented normalized domain may be output/provided from the word segmentation. As shown in the example of FIG. 3D, the segmented normalized domain may be "apple/support".

The output of the word segmentation process (e.g., at step 344) may be provided as an input to a segment choice process at steps 350B and 350C. The segment choice process may comprise one or more of steps 351-355. At step 351, a computing device may determine whether any segments of an input (e.g., a segmented normalized domain, such as "apple/support") match a customer domain. A customer domain may be a domain name owned by one of a CSaaS provider's customers/subscribers. For example, if Fruit Inc. were a customer, then fruit.com may be one of its customer domains. If an input (e.g., a segmented normalized domain) comprises a segment that matches a customer domain (such as "apple" in step 350C, for example, if apple were a customer), then the computing device may select/choose that segment (e.g., at step 355). At step 352, a computing device may determine whether any of the segments (e.g., of the segmented normalized domain) match a popular domain. If none of the segments match a popular domain, the segment choice process may end (e.g., at step 353). If at least one of the segments match a popular domain, then a computing device may determine which segment (of the segment(s) that match popular domain(s)) matches a popular domain that is most popular of all popular domains matching at least one of the segments (e.g., the most popular domain). The most popular domain determined at step 354 may determine a selected/chosen segment (e.g., at step 355). A segment choice may be indicated in an output of the segment choice process of step 350B and step 350C.

At step 360B and at step 360C, one or more results and/or one or more outputs from the segment choice process of step 350B and step 350C, respectively, may be processed. For example, the segment choice (e.g., indicated by step 350B and/or step 350C) may be compared with a list of known domain names, and a result of that comparison may indicate whether the received/input domain name is (or is likely to be) a homoglyph. For example, as shown in FIGS. 7D-7E, if the segment (e.g., "apple/support") comprises an altered portion (e.g., inverse homoglyph) of the received/input domain name (e.g., "αpp1E.sup.port") that matches a known domain name (e.g., "apple"), the received/input domain name may be indicated as a homoglyph (and/or as likely to be a homoglyph). An MHDN likelihood and/or confidence score may be updated based on the comparison. For example, a cyberanalyst may use the MHDN likelihood and/or confidence score to prioritize and/or determine which received/input domain names should be analyzed and/or included in a CTI feed. Additionally or alternatively, criteria may be used to determine maliciousness of a homoglyph domain name, for example, based on one or more of an MHDN likelihood and/or confidence score, presence (or absence) of one or more homoglyphic characteristics most often associated with malicious actors, fitness values, and/or any other criteria. As used herein, one or more homoglyphic characteristics may comprise one or more characters (e.g., letters, numbers, symbols, etc.) that may comprise a homoglyphic character and/or one or more words that may or may not include a homoglyphic character (e.g., a misspelled word imitating a correctly spelled word of an imitated domain name).

Step 360B and step 360C may produce one or more results and/or one or more outputs. The one or more results and/or one or more outputs from step 360B and/or step 360C may comprise one or more of an original input FQDN (361) (e.g., "xn-pp1E-zld.sup.port.xn-gtvz22d.github.io"), an inverse homoglyph (362) (e.g., "apple"), metadata (363) (e.g., segments and/or cost information, such as "cost (apple/support)=0.3"), and/or any other information, such as information relating to the one or more domain names received at steps 310A, 310B, and/or 310C and/or MHDN detection of the one or more domain names. An inverse homoglyph (362) may be a legitimate, popular, and/or trusted domain name or company name that an MHDN is trying to imitate. Metadata (363) may refer to information associated with a process that could be interesting and/or useful to a cybersecurity application using it. For example, "cost" could be of interest, since it may be used as a proxy for determining "confidence" of an engine that a result is a "true positive" (e.g., an actual MHDN) and not a "false positive" (e.g., a domain name detected as potentially an MHDN but which is not actually an MHDN). A confidence value may be determined/computed, for example, by a fitness function that may be used by a MAGMA process to score candidate potential MHDNs. Metadata may comprise information on the MHDN creation method(s), technique(s), and/or operation(s) that may have been used to transform an input potential MHDN into an output inverse homoglyph (such information may be useful as input to Forward-MHDN algorithms, as may be described below). The output to one or more cybersecurity applications may be provided as an input to any of the processes described herein, for example, to provide improved MHDN detection and/or MHDN generation.

At least some results at steps 360A, 360B, and/or 360C may be stored (e.g., saved, cached, etc.). For example, it may be advantageous to save and/or cache results of determinations/calculations of at least some results (e.g., high-confidence results and/or important results) so that, if/when the same input FQDN is detected/determined by an MHDN detector, it can use saved and/or cached results instead of executing/repeating an entire process again. This may speed up computation and/or allow for better, more expensive methods to be used. For example, referencing FIG. 3A, FIG. 3B, FIG. 3C, and FIG. 3D, such as immediately after accepting an FQDN as input (e.g., after step 310A, step 310B, and/or step 310C), an MHDN detector may efficiently test, for example in O(1) time, if the input FQDN is in a cache/memory (not shown in FIG. 3A, FIG. 3B, FIG. 3C, or FIG. 3D). If the input FQDN is in the cache/memory, then the cache/memory entry for the FQDN may be (immediately) used as the output of the MHDN detector (e.g., the methods 300A, 300B, and/or 300C may proceed from step 310A, step 310B, and/or step 310C directly to step 360A, step 360B, and/or step 360C, respectively). Thus, the MHDN detector process may bypass some or all computational steps between accepting the FQDN as input (e.g., step 310A, step 310B, and/or step 310C) and producing the output (e.g., step 360A, step 360B, and/or step 360C), which may be a highly efficient with respect to computational time and/or computer resource usage. The cache or caches (e.g., memory) may be populated with MHDNs and/or associated information (for example, a target domain name (361), inverse homoglyph (362), and metadata (363) as shown in FIG. 3B and in FIGS. 3C-3D) that may have been supplied by one or more sources, including any instances of Inverse-MHDN detectors (for example, as described herein), instances of Forward-MHDN generators (for example, as described herein), one or more CTI feeds that may include MHDNs, and/or any other source. A centralized and/or global MHDN collection and/or distribution service (such as INV-MHDN-SVC 141 in FIG. 2) may collect, aggregate, and/or process all known MHDNs, and then distribute lists of these known MHDNs to instances of the exemplary Inverse-MHDN process described herein. After (e.g., upon) receiving lists of known MHDNs and/or associated information, an Inverse-MHDN instance may insert the MHDNs and/or associated information in a cache. However, because there may be a large quantity (e.g., several million) MHDNs in existence (for example, registered or recorded in the DNS), implementing such caches may result in large memory requirements. Thus, it may be beneficial to be selective about which MHDNs to cache/save. For example, a system/device/method may only save those results that have a low cost, which indicates it was a "good" match for the inverse homoglyph it found. For example, a system/device/method may (also) limit caching to very high-popularity domain names, such as the top one hundred most popular domain names. For example, a system/device/method may (also) cache MHDNs that match frequently imitated websites, such as determined by a tracker of frequently imitated websites (e.g., described herein). For example, because MHDNs may "age out" (e.g., lose their effectiveness as an attack vector over time), and/or because the popularity of trusted domain names may change over time, a system/device/method may (also) cache relatively new MHDNs. For example, an Inverse-MHDN process may be applied to newly registered domains (e.g., as reported by ICANN or by other providers of such information). Any MHDNs that may comprise a newly registered domains list may (also) be cached.

At least some results at steps 360A, 360B, and/or 360C may be added to CTI. For example, a system/device/method may find and/or cache homoglyphs in CTI. A precomputed/predetermined list of homoglyphs from a database of CTI may be used, for example, if sufficient memory is available (and/or if memory is not very constrained). Finding and/or caching homoglyphs in CTI may save considerable processing time and/or may allow the use of more expensive and/or higher quality methods. For example, if a system/device/method finds that an MHDN "Fruit-support-badguy.com" is in a CTI database, the system/device/method may save that result in a special list of known MHDNs. Then, the system may load this list as an O(1) lookup table (e.g., a cache that may be used by an Inverse-MHDN process), and, if a detector determines/detects that the same potential MHDN is received (e.g., comes up again), which may be relatively likely because these MHDNs were cached based on their frequency of occurrence, then this subsequent lookup of the potential MHDN may be extremely fast.

While FIG. 3D shows an example of an input domain name (e.g., "xn--pp1E-zld.sup.port.xn--gtvz22d.github.io") for processing by an MHDN detector, any other domain name may be provided as an input. The following Table 1, Table 2, and Table 3 provide additional examples, showing respective inputs and outputs for various steps of FIG. 3B, although such steps and outputs may additionally or alternatively apply to similarly numbered steps of FIG. 3A and/or FIGS. 3C-3D.

TABLE 1

An input going through the entire engine.

| Step | Output |
| --- | --- |
| (310B) Ingest/Input FQDN | badactor.example.com |
| (320B) Initial Triage | badactor.example.com |
| (330B) Pre-Processing & Normalization | badactorexample |
| (340B) Word Segmentation | bad/actor/example |
| (350B) Choose "Best" Segment | example |
| (360B) Output | Example.com (popular) |

TABLE 2

An input being dropped because the domain is legitimate.

| Step | Output |
| --- | --- |
| (310B) Ingest/Input FQDN | suspicious.example.com |
| (320B) Initial Triage | (dropped because domain is legitimate) |
| (330B) Pre-Processing & Normalization | |
| (340B) Word Segmentation | |
| (350B) Choose "Best" Segment | |
| (360B) Output | |

TABLE 3

The engine handling a special character.

| Step | Output |
| --- | --- |
| (310B) Ingest/Input FQDN | xn--frut-n9d.com (fruit.com) |
| (320B) Initial Triage | xn--frut-n9d.com |
| (330B) Pre-Processing & (340) Normalization | Fruit |
| (340B) Word Segmentation | Fruit (no segmentation [slice, split]) |
| (350B) Choose "Best" Segment | Fruit |
| (360B) Output | Fruit.com (popular) |

It may be advantageous for one or more parameters to be "tuned" in order to meet the needs/requirements/performance metrics of a particular cybersecurity application. For example, there may be an interest in detecting MHDNs as they apply to certain cybersecurity applications. One or more parameters that may be tuned may be described herein. Often, these tunable parameters may impact the values/measures of one or more performance characteristics such that there may be "tradeoffs" across different performance characteristics. For example, consider the performance characteristics of computational time efficiency (e.g., time needed to detect an MHDN), false positive rate (e.g., rate of detections that are not actual MHDNs), and/or false negative rate (e.g., rate of missed detections/non-detections of actual MHDNs). It may be the case that, for example, adjusting/tuning a parameter to improve computational time efficiency may result in an increase in the false negative rate. Additionally or alternatively, adjusting a parameter to reduce a false positive rate may adversely affect the time efficiency and/or the false negative rate. Accordingly, parameters may be adjusted to alter the values of certain performance characteristics. One or more other considerations may be taken into account in effecting the disclosed systems, apparatus, methods, and computer readable media. For example, one or more parameters for MHDN detection may be "tuned" or adjusted to achieve different values and/or objectives for various performance metrics (e.g., computation time, false positive rate, false negative rate, etc.). One or more parameters for MHDN detection may be tuned/adjusted to better suit one or more requirements of a cyber security application such as example applications described herein. Because of the number of tunable parameters and the many potential correlations between the effects of tuning multiple parameters, machine learning algorithms (e.g., genetic algorithms) may be used to find sets of tunable parameter values that best meet different sets of (global) objectives (for example, such as minimizing computation time, minimizing false positive rate, and/or minimizing false negative rates).

A "final" determination of whether (or not) a domain name is an MHDN may be made or confirmed by a human cyberanalyst. For example, during early research, prototyping, and/or testing of an MHDN solution, homoglyphic matches between a domain name X and a (popular) domain name Y may be detected, but it may be clear to a human cyberanalyst that domain name X was not constructed with malicious intent in which case, the detection of X may be considered a "false positive". For at least some cybersecurity applications, (e.g., cyberanalysis workflow acceleration) a determination of false positives and false negatives may be determined by a human cyberanalyst. A role of a human cyberanalyst may be supplemented by, or at least partially replicated by, MHDN detection and/or associated cyberanalysis workflow acceleration applications that may benefit from the use of machine learning algorithms that may be trained to learn human behaviors, such as in the '899 patent referenced further herein. For example, machine learning may be used to learn/estimate which threat events may be considered "reportable" or "non-reportable" and/or humans may generate training data. Thus, systems, apparatus, methods, and/or computer readable media may capture that humans may determine false positives and true positives, and/or false negatives and true negatives. These determinations may be used to generate training data for further machine learning algorithms for detecting MHDNs.

One or more systems, apparatuses, methods and/or computer readable media herein may be used for a Forward-MHDN solution. A Forward-MHDN solution may generate various types of MHDNs that may be derived from a trusted domain name. A Forward-MHDN solution may comprise one or more inputs of a trusted domain name (e.g., example-.com), and/or may comprise one or more outputs of potential MHDNs (e.g., example.com) that may be registered or recorded in a DNS by one or more malicious actors and/or that may be likely to be registered or recorded in the DNS in the future by one or more malicious actors. A Forward-MHDN solution may accept, as input, information about MHDN creation techniques that may be used by one or more malicious actors. A Forward-MHDN solution may use this information to improve its performance. Such information may be provided by Inverse-MHDN solutions (described here, for example, with respect to FIG. 3A, FIG. 3B, FIG. 3C, FIG. 3D, FIG. 4, FIG. 5, and FIG. 6). A Forward-MHDN solution may discover MHDN creation techniques that may be used by one or more malicious actors. A Forward-MHDN solution may provide this information to one or more Inverse-MHDN solutions which may, for example, improve performance of the one or more Inverse-MHDN solutions.

An example of MHDN generation is summarized as follows. As described herein, MHDN generation, and associated cybersecurity applications, may provide advantages such as improved efficiency and/or accuracy of detection of MHDNs and/or of protection against MHDNs. For example, an approach to protecting networks from MHDN-vectored threats and/or attacks may be to anticipate the MHDNs for a given legitimate domain name that (human) malicious actors may have created (and/or may create in the future) and construct protections (e.g., proactive protections) that may defend against the associated MHDN-vectored threats and/or attacks (e.g., if/when they may actually occur in the future). However, because there may be an exponentially large number of possible MHDNs for a single legitimate domain name if some MHDN creation methods are (naively) applied to generate MHDNs (e.g., letter substitutions, letter transpositions/swaps, confusables, fragmenting subdomain labels by inserting "dot" characters, and/or TLD substitutions, individually and/or in any combination thereof), deploying associated protections for at least some MHDN creation methods may be impractical and/or intractable. Conversely, if a small quantity (e.g., only one or two) of MHDN creation techniques are applied (e.g., in order to control/limit the number of generated MHDNs), then coverage of actual MHDNs may be low and thus any associated protections may have large security gaps.

Problems that may have characteristics similar to the MHDN generation problem described herein may be attempted to be solved using machine learning methods, for example, in combination with expert knowledge, statistics, heuristics, and/or other information about the problem to be solved. Described herein is an exemplary machine learning system, referred to herein as MAGMA (for Malicious Aliasing by Genetic Mutation Algorithm), that may solve one or more MHDN generation problems sufficiently well such that effective, efficient, and/or strong protections may be derived from machine-generated MHDNs.

FIG. 7A, FIGS. 7B-7C, and FIGS. 7D-7E show example MHDN processes. MHDN processes may comprise a Forward-MHDN process. MHDN processes may comprise MHDN generation (e.g., generation of one or more MHDNs and/or non-MHDNs based on domain name input(s)), for example, such that generation of MHDNs may be improved using training data comprising MHDN creation methods used by malicious actors to create MHDNs that may be derived from Inverse-MHDN processes described herein. MHDN processes may comprise an Inverse-MHDN process and/or an MHDN detection process, for example, such that detection and/or replacement of an MHDN may be improved using training data comprising previously generated domain names (e.g., MHDNs) derived from a Forward-MHDN process and/or an MHDN generation process described herein.

Figure 7A:
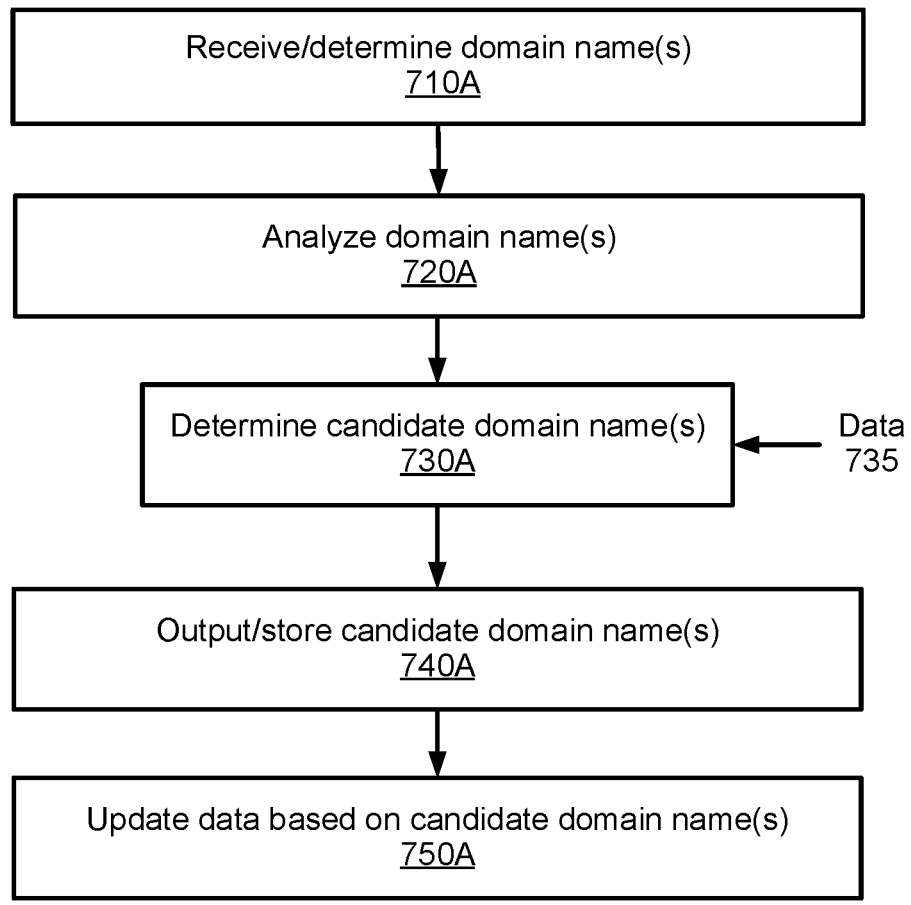
FIGS. 7A-7E show example methods for MHDN generation and/or Forward-MHDN.

FIG. 7A shows an example MHDN generation method 700A. At step 710A, one or more domain names may be received and/or determined. For example, an MHDN generation service or process (such as FWD-MHDN-SVC 142 of FIG. 2) may receive a domain name. The service/process may receive a domain name through an application interface. The domain name may comprise a non-MHDN (e.g., a customer domain name, a popular domain named, and/or any other domain name that may not be an MHDN). The service/process may determine that the domain name should be processed for MHDN generation. The service/process may be located in a CSaaS provider network (e.g., CSAAS 140) and may be operated by the CSaaS provider. Step 710A may be repeated for each of a plurality of domain names (e.g., a plurality of domain names associated with the CSaaS provider's subscribers/customers) in parallel, in serial, or in a combination thereof.

At step 720A, the one or more domain names may be analyzed and/or one or more assets associated with the one or more domain names may be determined/generated. For example, a service/process may determine whether a domain name should be processed further for MHDN generation. The process may end (e.g., exit from a routine), for example, if the service/process determines that the domain name should not be processed for MHDNs generation. A domain name may not be processed for MHDN generation, for example, if the domain name is longer than a threshold length and/or if the domain name fails to satisfy one or more syntax requirements. Additionally or alternatively, step 322 may be modified to determine whether the domain name is shorter than a threshold length and/or within a range of lengths (e.g., comprising a minimum input length and a maximum input length). For example, domain names that are short (e.g., abc.ai) may be determined to be too short to be effectively analyzed/processed for MHDN generation. One or more criteria, such as any criterion described herein, may be used to determine whether a domain name should be processed. If a domain name is determined to be processed for MHDN generation, then at step 720A, one or more assets associated with a plurality of real/actual MHDNs may be generated, for example, by dividing/segmenting/breaking up each of the plurality of real/actual MHDNs into constituent pieces. For example, pieces of an MHDN may be separated from the MHDN and one or more sample probabilities may be generated for respective pieces of the MHDN. Step 720A may be repeated for each of a plurality of domain names (e.g., a plurality of domain names received through an application interface) in parallel, in serial, or in a combination thereof.

At step 730A, one or more candidate domain names may be determined/generated. The one or more candidate domain names may be determined/generated using an MHDN mutator comprising a set of operations. For example, a computing device may determine/generate one or more candidate domain names based on information determined/generated from step 720A (e.g., applying operations generated in Step 723 to domain names). Additionally or alternatively, the one or more candidate domain names may be determined/generated based on data (e.g., from 735), such as training data relating to MHDNs (e.g., previously identified/determined MHDNs and their associated inverse homoglyphs, example characteristics of MHDNs, transformations for generating MHDNs, DNA strands associated with MHDNs, and/or any other information relating to MHDNs). Each of the one or more candidate domain names may comprise at least a portion of a domain name received at step 710A and/or at least a modified portion of a domain name received at step 710A (e.g., the received domain name modified to include one or more additional characters and/or one or more character replacements that may be common in MHDNs, such as replacement of a letter "a" with an alpha character "a" and/or replacement of a letter "l" with a number "1"). Any of the techniques described herein for MHDN detection may be used (e.g., in an inverse manner, such as to render a non-MHDN more like an actual MHDN) to determine the one or more candidate domain names. Step 730A may be repeated for each of a plurality of domain names (e.g., a plurality of domain names received through an application interface) in parallel, in serial, or in a combination thereof.

At step 740A, the one or more candidate domain names may be provided (e.g., as an output), stored, and/or used to generate MHDNs and/or DNA strands (e.g., candidate domain names and/or DNA strands that more accurately reflect MHDNs). An output at step 740A (e.g., one or more candidate domain names, such as a set of candidate domain names) may more closely resemble an MHDN relative to an input of step 730A. The one or more candidate domain names may be stored in memory, such as in a queue (e.g., work queue). Step 740A may be repeated for each of a plurality of domain names (e.g., a plurality of domain names received through an application interface) in parallel, in serial, or in a combination thereof.

At step 750A, data (e.g., training data, stored data, and/or any other data) may be updated based on the one or more candidate domain names. For example, the one or more candidate domain names may be compared with other domain names (e.g., MHDNs) to identify any new domain names from the one or more candidate domain names to include with the other domain names, and/or to identify any candidate domain names that may have a low probability (e.g., below a threshold probability) of being created by a malicious actor as an MHDN (e.g., relative to the other domain names) such that it should not be included with the other domain names. The domain names resulting from this updating procedure may be stored and/or provided for one or more processes of MHDN generation (e.g., such as data provided at step 735) and/or for one or more processes of MHDN detection (e.g., such as at steps 320B and 325 of FIG. 3B, which may avoid unnecessary analysis of a domain name already determined to be an MHDN and/or already determined to have an identified Inverse-MHDN). Step 750A may be repeated for each of a plurality of domain names (e.g., a plurality of domain names received through an application interface) in parallel, in serial, or in a combination thereof. Steps 710A, 720A, 730A, 740A, and/or 750A, while shown sequentially, may be performed in a different order (e.g., during, before, and/or after any of the other steps of FIG. 7A), and/or may be optionally performed (e.g., skipped) and/or repeated.

FIGS. 7B-7C and FIGS. 7D-7E show examples of MHDN generation processes. Method 700B and method 700D may provide efficient MHDN generation using an exemplary MAGMA process. A genetic algorithm may learn how to improve its performance. For example, performance may be improved during runs (e.g., via execution of, for example, a mass DNS query tool that may check if potential MHDNs are registered or recorded in a DNS or otherwise via searches in a database of domain names that may be registered or recorded in the DNS) and/or from run-to-run (e.g., via importing data on the most successful MHDN creation techniques from previous evolutionary cycles). A fitness function (e.g., 724) that may comprise (a) knowledge of actual MHDN creation techniques discovered by MHDN detection processes (such as by the exemplary MHDN detection/Inverse-MHDN processes described herein), and/or (b) statistical information on usage frequency of those techniques, may evaluate which of MAGMA's candidate MHDNs may deserve a DNS query/lookup and/or domain name database query during evolution.

Figure 7B:
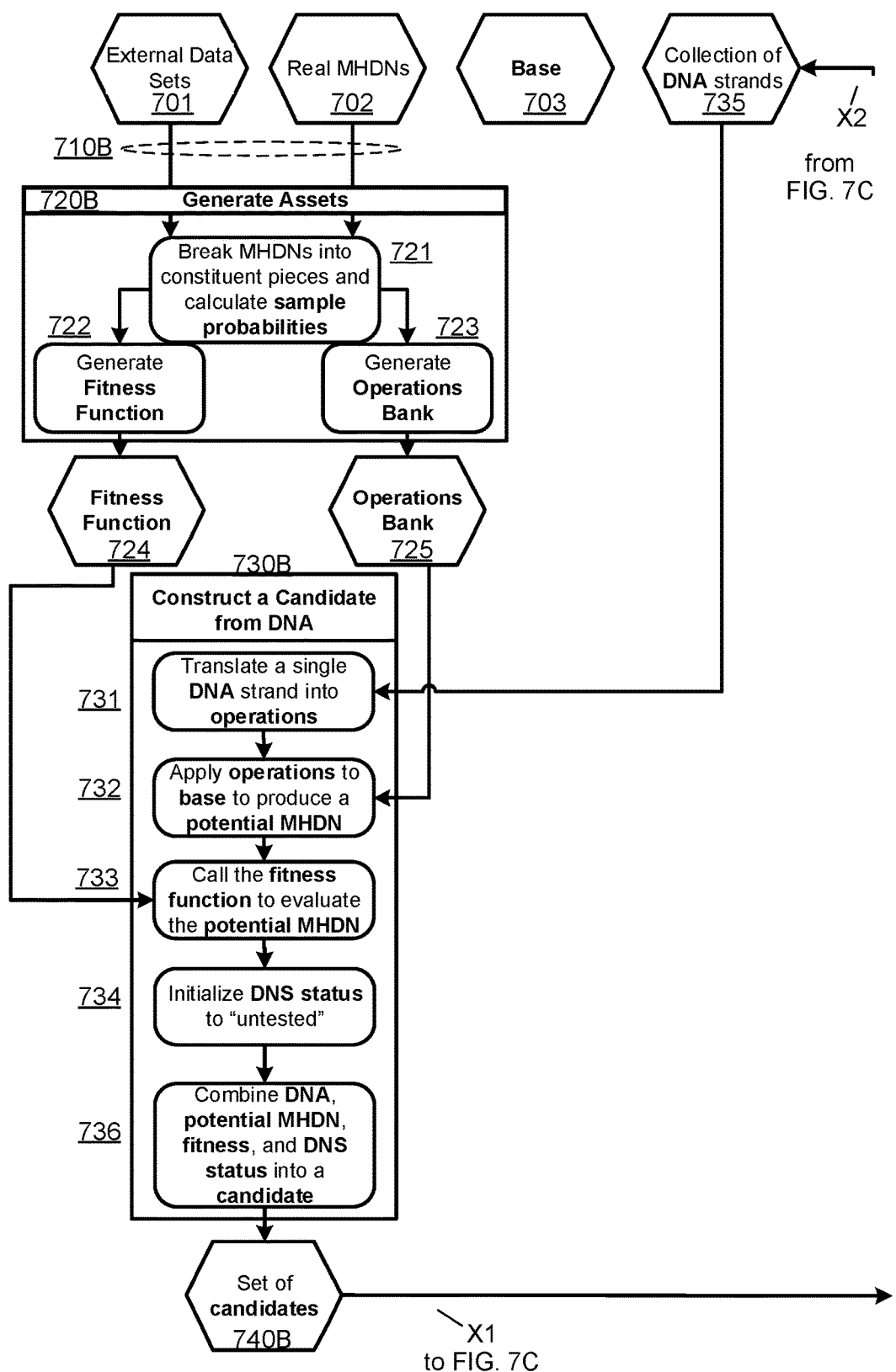
Figure 7C:
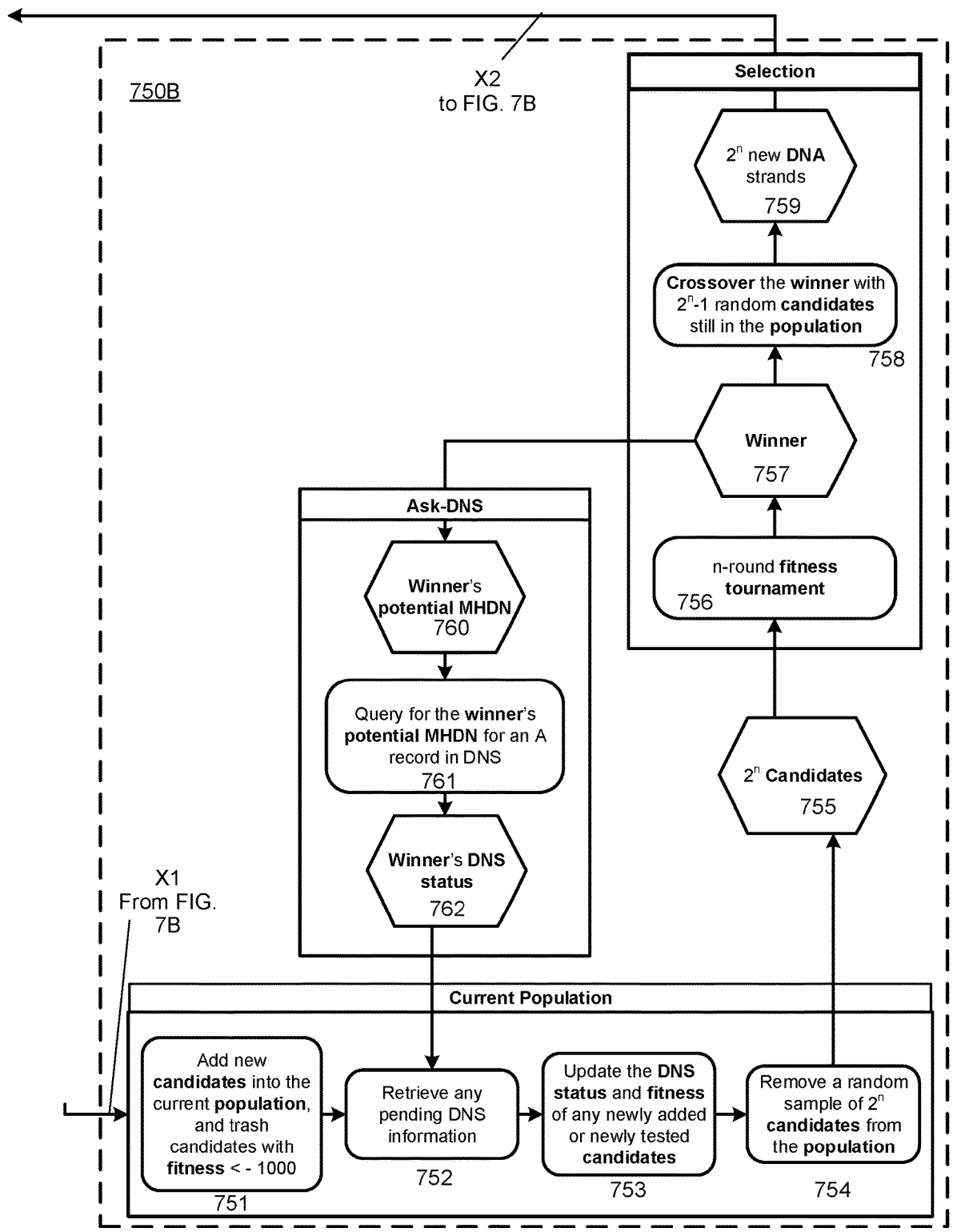
Figure 7D:
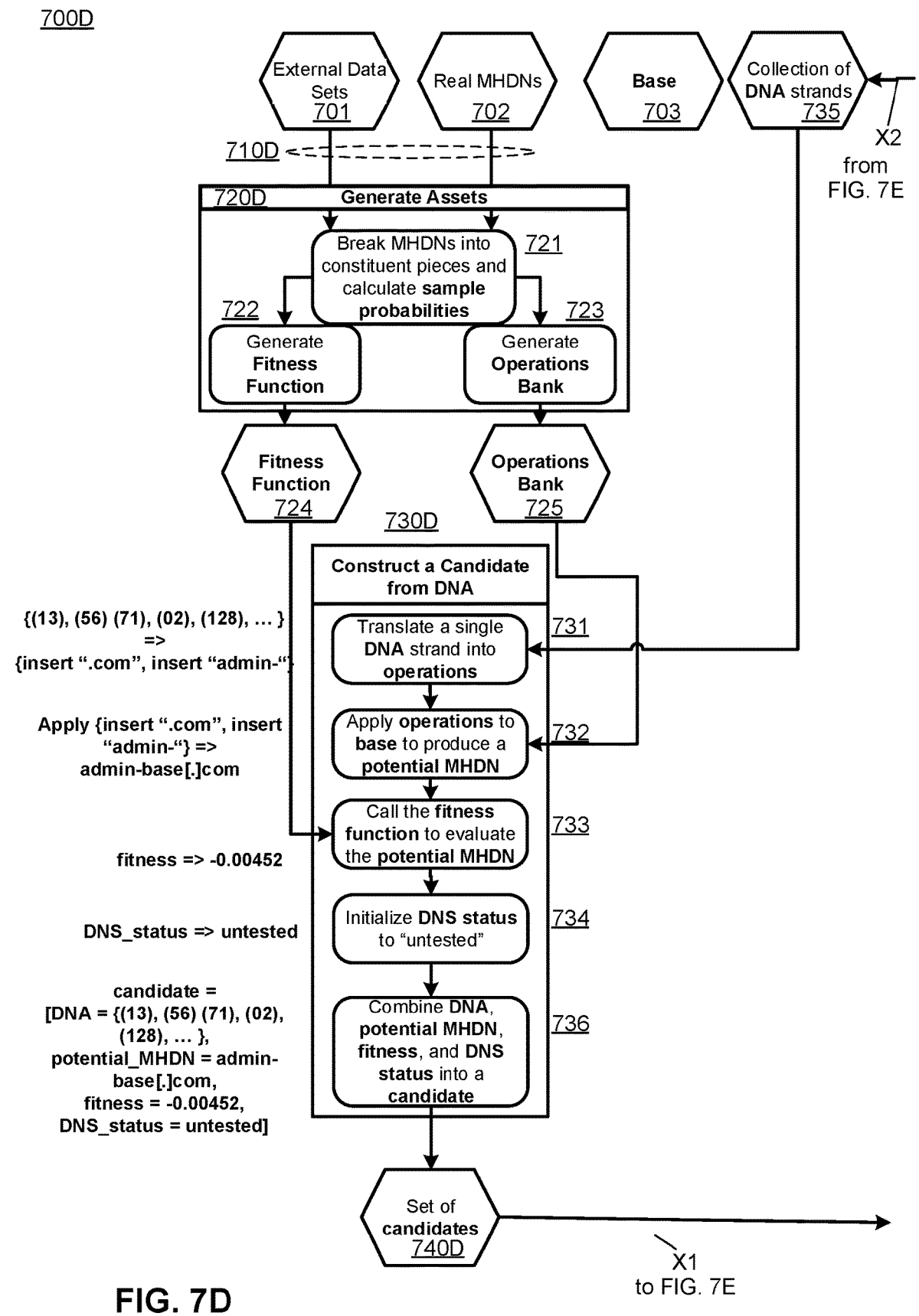
Figure 7E:
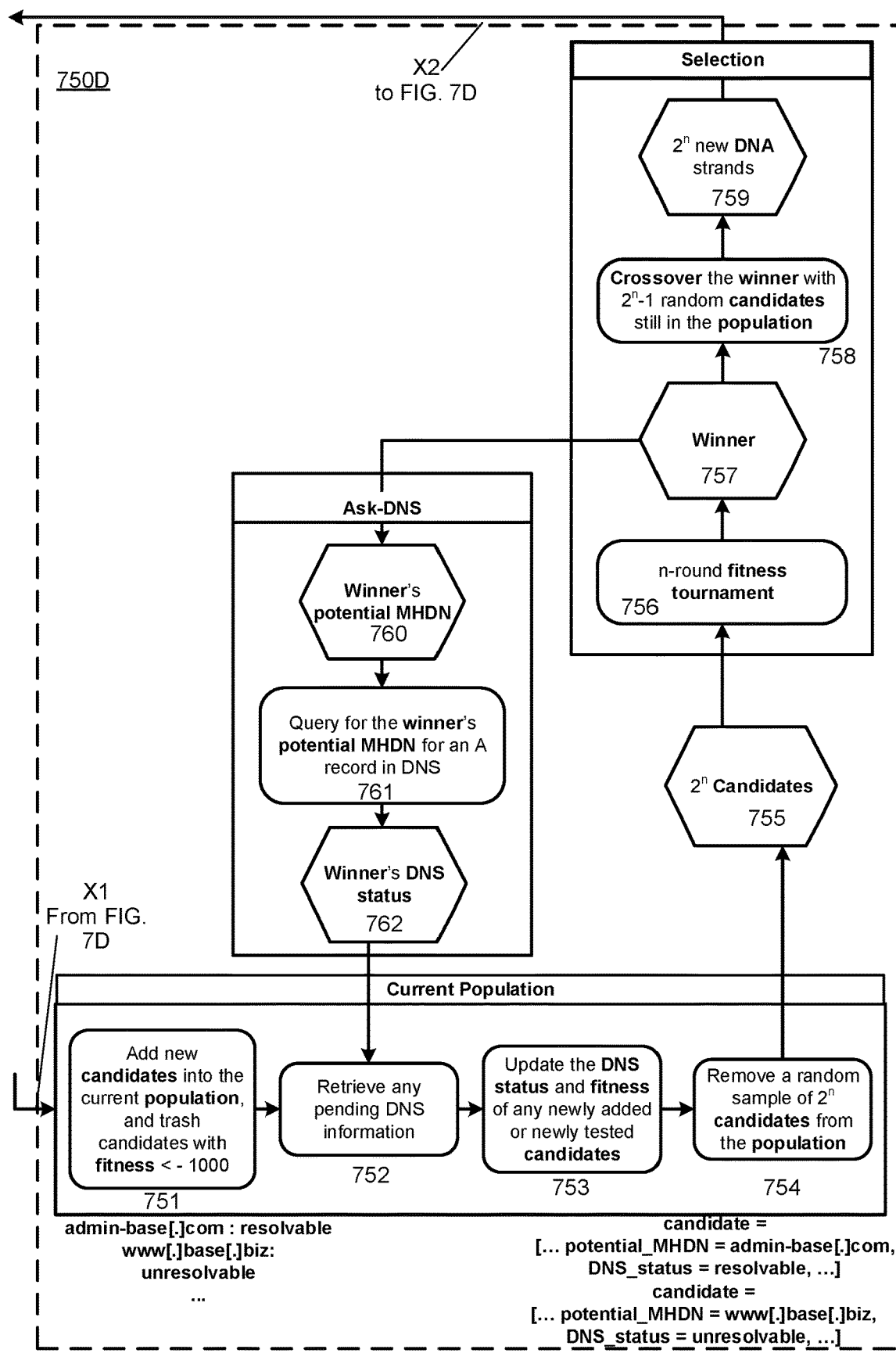

FIGS. 7B-7C shows an example MHDN generation method 700B. Method 700B may comprise method 700A described herein, wherein like numerals 710B, 720B, 730B, 740B, and 750B may comprise the steps described herein with respect to steps 710A, 720A, 730A, 740A, and 750A, respectively. Method 700B may comprise a process by which one or more MHDNs may be generated, such as by a Forward-MHDN solution or MHDN generator.

FIGS. 7D-7E shows an example MHDN generation method 700D. Method 700D is an example of the method 700B of FIGS. 7B-7C in which example output(s) are provided, for example, at steps 730D and 750D. Method 700D may comprise method 700B described herein, wherein like numerals 710D, 720D, 730D, 740D, and 750D may comprise the steps described herein with respect to steps 710B, 720B, 730B, 740B, and 750B, respectively. The remaining steps shown in FIGS. 7D-7E may correspond to the same numbered steps shown in FIGS. 7B-7C. FIGS. 7B-7C and FIGS. 7D-7E show examples of MAGMA's process of generating potential MHDNs and training itself to improve performance with each execution and with updates from MHDN detection processes and/or from other external sources.

At step 710B, one or more domain names and/or related information may be received and/or determined. For example, external data sets (701) and/or real MHDNs (702) may be provided at step 710B as input(s) to step 720B. Base 703 may comprise one or more base domain names that may be the one or more domains for which MHDNs may be generated by the method 700B. Base (703) may comprise one or more domain names and/or one or more bases of respective one or more domain names. For example, Base (703) may comprise a group of base domain names, such as base domain names having one or more characteristics in common (e.g., such as base domain names for news organizations, base domain names for educational institutions, base domain names from well-known technology companies, etc.). As another example, Base (703) may comprise a domain name of a customer (e.g., which may be unique and/or not representative of a group of domain names such that it may not be processed with other base domain names). As another example, Base (703) may comprise a combination of one or more groups of base domain names and/or one or more domain names that are not a member of a base domain name group. Additionally or alternatively, Base (703) may comprise one or more base domain names that may be included in the external data sets (701) (e.g., such as included in a list of popular domain names and/or in a list of customer domain names). Each of (or some of) the base domain names (e.g., Base 703) may correspond to at least one of a real MHDN (702). For example, a base domain name may comprise an inverse homoglyph of at least one real MHDN (702) or an inverse homoglyph of a segment of at least one real MHDN (702). External data sets (701) may comprise one or more of: customer names, customer domains, popular domains (e.g., Tranco popular domains), English word sets, TLDs and eTLDs from the PSL, filter domains (e.g., Tranco filter domains), blacklists, confusable characters lists, and/or any other information. Real MHDNs (702) may comprise known MHDNs and associated inverse homoglyphs, MHDN creation operations, segmentations, etc., such as information that may be the output 360B of an Inverse MHDN process. For example, Real MHDNs (702) may comprise MHDNs that have been determined to be real MHDNs, such as originating with one or more malicious actors. Step 710B may be repeated for each of a plurality of domain names (e.g., a plurality of domain names in one or more packets and/or in one or more logs) in parallel, in serial, or in a combination thereof.

At step 720B, the plurality of real MHDNs (e.g., 702) may be analyzed and/or one or more assets associated with the plurality of real MHDNs may be generated. For example, at step 721, the real MHDNs 702 may be divided/segmented/broken up into constituent pieces. For example, pieces of an MHDN may be separated from the MHDN according to segmentation information and one or more sample probabilities may be generated for a respective piece of the MHDN. At step 722, a fitness function may be generated. At step 723, an operations bank may be generated. An operations bank may comprise a set of available operations that may be applied (e.g., by MAGMA) to a Base 703 (e.g., a domain name or PDNL) (e.g., to produce a potential MHDN). A fitness function may generate a fitness value (e.g., "F"). Fitness (F) may be the score (e.g., computed/determined by the fitness function), ranging from $(-\infty, 0)$, of a potential MHDN's quality (e.g., based on sample probabilities, heuristics, DNS information, etc.). A score of zero may be reserved for DNA that may produce an MHDN resolvable in DNS, and a score of negative infinity may be reserved for malformed domain names (e.g., not ending in a valid TLD). Everything in between may be a logarithm of base b (e.g., $\log_b$; common values of b may be 2, e (Euler's number), 10, etc.) of the probability of the potential MHDN (e.g., assuming the results of operations are independent events). For example, F may be:

$$F=\log_b(\Pi_i \text{ Prob}(i))=\Sigma_i \log_b(\text{Prob}(i)),$$

where i indexes the techniques that may characterize the potential MHDN. For example, www.exampl.es may be created from the base 703 "examples". If the "www" word may have a sample probability of 0.30, "2 dots in the domain name" may have a sample probability of 0.20, "length between 8 and 16" may have a sample probability of 0.30, and the "es" TLD may have a sample probability of 0.02, then the fitness score of www.exampl.es may be:

$$F=\log(0.30)+\log(0.20)+\log(0.30)+\log(0.02)=-7.92941$$

Heuristics may modify a fitness score to negative infinity, for example, if the resulting domain name is malformed. A fitness function may be configured to indicate a likelihood of a candidate MHDN being an actual MHDN based on homoglyphic characteristics (e.g., which may be indicated by a training data set). For example, the fitness function may comprise any value, wherein the value may have some relationship to (e.g., may indicate and/or may have a correlation with) a likelihood of a candidate MHDN being an actual MHDN, such as a high value generated by the fitness function may indicate a high likelihood of a candidate MHDN being an actual MHDN and a low value generated by the fitness function may indicate a low likelihood of a candidate MHDN being an actual MHDN. A likelihood may be represented as a value from 0 and 1 and/or as a percentage from 0% to 100%.

Step 722 may be performed in parallel or in series with step 723. Step 722 may be performed before or after Step 723. Any portion (or all) of step 720B may be repeated for each of a plurality of domain names (e.g., a plurality of domain names in one or more packets and/or in one or more logs) in parallel, in serial, or in a combination thereof.

At step 730B, one or more candidate domain names may be determined. The one or more candidate domain names may be determined/generated using an MHDN mutator comprising a set of operations. For example, one or more candidate domain names may be determined based on information determined/provided from step 720B, such as from a generated fitness function (724) and/or an operations bank (725). Additionally or alternatively, the one or more candidate domain names may be determined based on a base (703) and/or a collection of DNA strands (735). A base (e.g., 703) may be a word or string (e.g., a portion of a domain name) that may be a primary input to MAGMA and to which MAGMA may apply MHDN creation techniques. A base may comprise a PDNL (e.g., the "+1" of an "eTLD+1") of a popular, trusted domain name, such as "apple", "google", etc., and/or a base may comprise a PDNL of a CSaaS subscriber/customer's domain name. As used herein, DNA (and/or a DNA strand) may comprise a run of bytes that MAGMA may deterministically translate into one or more operations to apply to a given base, but is itself independent of the base. For example, DNA that transforms the base "example" into "www.example-admin.xyz" also may transform "sample" into "www.sample-admin.xyz". DNA may come from a previous MAGMA run and/or may be (randomly) generated for first use. At step 730B, one or more candidate domain names may be constructed/determined from DNA. Any portion (or all) of step 730B (e.g., steps 731, 732, 733, 734, and/or 736) may be repeated for each of a plurality of domain names (e.g., a plurality of domain names received through an application interface) in parallel, in serial, or in a combination thereof. For example, step 730B may be performed any quantity of times. For example, step 730B may be performed once (e.g., such as in an application procedure/mode) or may be repeated (e.g., such as in a training procedure/mode), for example, based on one or more conditions. The one or more conditions may comprise, for example, a determination that a candidate has a fitness value greater than a threshold, a maximum quantity of iterations being reached, a maximum processing time being reached, and/or any other condition.

At step 731, one or more DNA strands may be translated into one or more operations. The one or more DNA strands may correspond to a DNA strand (and/or a collection of DNA strands) provided as an input (e.g., 735). A collection of DNA strands (e.g., 735) may be populated, for example, by one or more of a random generation of DNA strands and/or by one or more outputs from one or more procedures described herein (e.g., such as one or more outputs from a training procedure/mode from step 750B and/or step 750D (and/or by sub-steps therein, such as step 752, step 757, step 762, and/or step 759) described further herein. For example, as shown in step 730D of FIG. 7D, a DNA strand such as "{(13), (56), (71), (02), (128), . . . }" may be translated at step 731 to one or more operations (e.g., indicated by "=>") such as "{insert ".com", insert "admin-" }". A DNA strand may be translated to any one or more operations. At step 732, the one or more operations may comprise one or more methods and/or techniques that may be applied to a base (e.g., 703). The one or more operations may be applied to a base to transform the base into a domain name (such as adding a TLD, inserting a word, inserting a separator, exchanging for a confusable, and/or any other operation). For example, as shown in step 730D of FIG. 7D, the one or more operations, such as "{insert ".com", "insert "admin-"}", may be applied to a base (e.g., "base") to produce a potential MHDN (e.g., "admin-base.com"). The application of one or more operations to a base may be performed based on receiving as input(s) (and/or using) one or more bases (703) and/or one or more operations banks (725). Applying the one or more operations to a base (or a plurality of bases) may produce a potential MHDN (or a plurality of MHDNs). A potential MHDN may be indicated by (e.g., may be the result of) applying one or more operations to a base.

At step 733, the potential MHDN(s) may be evaluated/analyzed by using one or more fitness functions, such as the fitness function(s) (724) generated at step 720B. For example, as shown in step 730D of FIG. 7D, a fitness function may be called (e.g., "fitness") to evaluate and ultimately generate (e.g., indicated by "=>") a value (e.g., "-0.00452") associated with a potential MHDN (e.g., a likelihood that the potential MHDN is an MHDN and/or a score showing a comparative value for the potential MHDN relative to other potential MHDNs and/or in relation to known MHDNs).

At step 734, a DNS status may be initialized to a particular DNS status (e.g., "untested" status). For example, as shown in step 730D of FIG. 7D, a DNS status (e.g., "DNS_status") may be initialized as "untested." A DNS status may comprise a flag that may list/indicate a potential MHDN as "untested", "resolvable" (e.g., has a non-empty A, AAAA, and/or MX record in DNS), "unresolvable" (e.g., has no A record in DNS), and/or any other status.

At step 736, one or more of DNA, potential MHDN, fitness, and/or DNS status may be combined into a candidate (e.g., for each base, and/or for each domain name). For example, as shown in step 730D of FIG. 7D, a candidate ("candidate") may comprise (e.g., shown within the brackets "[ ]") DNA (e.g., "DNA={(13), (56) (71), (02), (128), . . . }"), potential MHDN (e.g., "potential_MHDN=admin-base.com"), fitness (e.g., "fitness=-0.00452"), and/or DNS status (e.g., "DNS_status=untested"). One or more outputs of step 736 may be provided for further processing at step 740B. Additionally or alternatively, one or more outputs of step 736 may be output from the method 700B. For example, step 736 may provide one or more candidates, and/or information corresponding to one or more candidates (e.g., DNA strand(s), potential MHDN(s), fitness, DNS status, etc.), as one or more outputs of a MAGMA training procedure/mode (e.g., which may comprise multiple iterations of steps 731-734 and step 736, such as by using updated DNA strands 735 from step 750B and/or from step 750D) and/or as one or more outputs of a MAGMA application procedure/mode (e.g., which may comprise a single instance of each of steps 731-734 and step 736). The one or more outputs of step 736 may be provided, for example, in a CTI feed, to a collection of DNA strands (735) and/or for a cybersecurity application.

At step 740B, one or more candidates (e.g., a set of candidates) may be provided (e.g., as an output) and/or stored. The one or more candidates may comprise one or more candidate domain names. Step 740B may be repeated for each of a plurality of domain names (e.g., a plurality of domain names in one or more packets and/or in one or more logs) in parallel, in serial, or in a combination thereof. The output of step 740B is shown at "X1" in FIG. 7B that may be provided for further processing in step 750B at "X1" in FIG. 7C. Similarly, the output of step 740D is shown at "X1" in FIG. 7D that may be provided for further processing in step 750D at "X1" in FIG. 7E. One or more outputs of step 740B may be provided for further processing at step 750B. Additionally or alternatively, one or more outputs of step 740B may be output from the method 700B. For example, step 740B may provide one or more candidates, and/or information corresponding to one or more candidates (e.g., DNA strand(s), potential MHDN(s), fitness, DNS status, etc.), as one or more outputs of a MAGMA training procedure/mode (e.g., which may comprise multiple iterations of steps 731-734 and step 736, such as by using updated DNA strands 735 from step 750B and/or from step 750D) and/or as one or more outputs of a MAGMA application procedure/mode (e.g., which may comprise a single instance of each of steps 731-734 and step 736). The one or more outputs of step 740B may be provided, for example, in a CTI feed, to a collection of DNA strands (735), and/or for a cybersecurity application.

At step 750B, data (e.g., training data, stored data, DNS information, DNA strands, and/or any other data) may be updated based on the one or more candidate domain names. For example, at step 751, one or more candidates (e.g., from step 740B) may be added as new candidates into a current population (of candidates). Candidates that may have a fitness value below a threshold (e.g., below −1000, or below any other value) may be removed (e.g., deleted, trashed, erased from memory, relocated from a storage location, etc.) from the one or more candidates and/or from a current population (of candidates). A population and/or a current population may comprise a current group of all candidates (for example, potential MHDNs) in MAGMA.

At step 752, DNS information (e.g., any pending DNS information) may be retrieved. For example, a DNS process (such as described with respect to one or more of steps 760-762) may be performed to provide the DNS information. Additionally or alternatively, at step 752, a candidate received from step 751 may be tested for DNS resolvability. DNS resolvability may comprise one or more of a DNS query/lookup or searching through one or more DNS databases (e.g., local database(s)) that may comprise DNS names that are already known to have been recorded in DNS). For example, one or more DNS databases may be checked (e.g., at step 752) instead of performing a DNS query/lookup. Checking one or more DNS databases may be faster and/or less complex than performing a DNS query/lookup. A candidate may have its DNS status as one of a plurality of categories, such as: untested, unresolvable, or resolvable. A candidate received at step 752 may initially have its DNS status as untested. During or after step 752, a candidate may have its DNS status set to resolvable or unresolvable, for example, based on the DNS resolvability results of step 752. For example, if the candidate is identified in DNS and/or in one or more DNS databases, the DNS status of the candidate may be set to resolvable. As another example, if the candidate is not identified in DNS and/or in one or more DNS databases after testing for DNS resolvability, the DNS status of the candidate may be set to unresolvable. As shown in step 750D of FIG. 7E, retrieved DNS information may comprise, for example, "admin-base.com: resolvable" and/or "www.base.biz: unresolvable". The DNS process may comprise an ask-DNS process. An ask-DNS process may comprise a DNS query/lookup tool that determines if a domain name is resolvable in the DNS and/or a search tool for a DNS database that comprises domain names that are resolvable in the DNS that may run concurrently to MAGMA's main loop. An ask-DNS process may check if/whether specific candidate(s) are resolvable (e.g., have A records) in DNS. Step 752 may be optional. For example, a first iteration of step 750B and/or step 750B may skip step 752 and/or a subsequent iteration of step 750B and/or step 750B may perform step 752. Similarly, a first iteration of step 750D and/or step 750D may skip step 752 and/or a subsequent iteration of step 750D and/or step 750D may perform step 752. One or more outputs of step 752 may be provided for further processing at step 753. Additionally or alternatively, one or more outputs of step 752 may be output from the method 700B. For example, step 752 may provide one or more candidates, and/or information corresponding to one or more candidates (e.g., DNA strand(s), potential MHDN(s), fitness, DNS status, etc.), as one or more outputs based on a determination that the candidate is resolvable (e.g., based on a determination that a candidate domain name is included in DNS). The one or more outputs of step 752 may be provided, for example, in a CTI feed, to a collection of DNA strands (735), and/or for a cybersecurity application.

At step 753, a DNS status and/or a fitness of any newly added and/or newly tested candidate(s) may be updated. For example, as shown in step 750D of FIG. 7E, the newly added and/or newly tested candidates may be added, such as "candidate=[ . . . potential_MHDN=admin-base.com, DNS_status=resolvable, . . . " ] and/or "candidate=[ . . . potential_MHDN=www.base.biz, DNS_status=unresolvable, . . . ]". At step 754, a sample (e.g., a random sample of $2^n$ candidates) may be removed from the population (of candidates).

At step 755, the sample (e.g., a random sample of $2^n$ candidates removed from the population at step 754) may be stored and/or provided for further analysis. For example, at step 756 one or more processes, such as a fitness tournament (e.g., n-round fitness tournament) may be performed on the sample. A fitness tournament may comprise a single-elimination, pairwise tournament where candidates may be compared (e.g., based on respective fitness values of the candidates). For example, candidates may directly compete against each other until only one candidate (e.g., the "winner") remains. A direct competition between a pair of candidates A and B may result in B defeating A if $$\log(r) \leq F(B) - F(A),$$

where r may be a random float in the range (0, 1], and A defeating B otherwise. This may be a natural logarithm (i.e., base b is e) version of the Metropolis-Hastings acceptance condition $$r \leq \frac{Prob(B)}{Prob(A)}.$$

This equation may be modified to achieve different behaviors and performances, for example, combining it with a time function to simulate annealing behavior may improve overall search performance through the possible state space. A fitness tournament may comprise any other comparison of one or more candidates with one or more other candidates, for example, to reduce a total quantity of candidates.

At step 757, one or more results of a fitness tournament may be determined and/or provided for further analysis. For example, one or more results (e.g., "winner(s)") may be provided for a DNS procedure (e.g., steps 760) and/or for at least a portion of a selection procedure (e.g., steps 758-759). For example, information associated with a "winner" (or a plurality of winners) may be provided to an Ask-DNS procedure. For example, a field such as "potential MHDN" may be provided to an Ask-DNS procedure. Additionally or alternatively, a "winner" (or a plurality of winners) may be provided as an output (e.g., included in a CTI feed and/or added to the collection of DNA strands 735) to include a latest (e.g., best) candidate(s) for potential MHDN(s). One or more outputs of step 757 may be provided for further processing at step 760 and/or at step 758. Additionally or alternatively, one or more outputs of step 760 may be output from the method 700B. For example, step 760 may provide one or more candidates, and/or information corresponding to one or more candidates (e.g., DNA strand(s), potential MHDN(s), fitness, DNS status, etc.), as one or more outputs based on a determination that the candidate is a winner and/or based on a determination that a winner candidate has a fitness value above a threshold. The one or more outputs of step 757 may be provided, for example, in a CTI feed, to a collection of DNA strands (735), and/or for a cybersecurity application. Step 757 may be performed any quantity of times. For example, step 757 may be repeated based on one or more conditions. The one or more conditions may comprise, for example, a maximum quantity of iterations being reached, a maximum processing time being reached, a threshold fitness value being reached with respect to a candidate (e.g., "winner"), and/or any other condition.

At step 760, one or more results (e.g., information associated with a "winner(s)" from step 757) may be analyzed to determine potential MHDN(s). For example, information regarding one or more potential MHDNs may be received. Step 760 (and/or the Ask-DNS procedure of steps 760-762) may be performed any quantity of times. For example, step 760 and/or Ask-DNS may be performed once or may be repeated, for example, based on one or more conditions. The one or more conditions may comprise, for example, a determination that a candidate is included in DNS, a maximum quantity of iterations being reached, a maximum processing time being reached, a threshold fitness value being reached with respect to a candidate, and/or any other condition.

At step 761, a DNS may be queried or a DNS database may be searched to determine if/whether a potential MHDN associated with the one or more results is registered or recorded (e.g., has an A record in a DNS). If a potential MHDN is determined to be included in DNS, the candidate associated with the potential MHDN (e.g., comprising a field indicating the potential MHDN) may be updated, such as by updating one or more fields (e.g., fitness, DNS status, etc.) of the candidate.

At step 762, a status for each of the one or more results may be determined. For example, a DNS status (such as described herein) may be determined and/or provided for each of the one or more results. The DNS status may be provided for a current population (of candidates). One or more outputs of step 762 may be provided for further processing at step 752. Additionally or alternatively, one or more outputs of step 762 may be output from the method 700B. For example, step 762 may provide one or more candidates, and/or information corresponding to one or more candidates (e.g., DNA strand(s), potential MHDN(s), fitness, DNS status, etc.), as one or more outputs based on a determination that the candidate is resolvable (e.g., based on a determination that a candidate domain name is included in DNS). The one or more outputs of step 762 may be provided, for example, in a CTI feed, to a collection of DNA strands (735), and/or for a cybersecurity application. The DNS status may be provided for a current population (of candidates) on an iterative basis (e.g., at step 752) such that DNS status for the current population may be maintained/updated. For example, steps 752-757 and/or steps 760-762 may be repeated any number of times, such as a finite number and/or a based on a condition such as stopping the steps after no changes occur between an output of a latest fitness tournament process and an output of a prior fitness tournament process, or after such changes are determined to be less than a threshold). Additionally or alternatively, one or more of steps 731-734, 736, 751-754, and/or 756-759 may be repeated (e.g., one or more times) during an Ask-DNS procedure (e.g., during steps 760-762), wherein MAGMA may ingest/input/process Ask-DNS result information after (e.g., as soon as) the Ask-DNS result information becomes available.

At step 758, a crossover process may be performed/determined. A crossover (e.g., noun-form) may comprise a structure containing a potential MHDN, its DNA (e.g., DNA strand), its fitness, and/or its DNS status. DNS status may be "untested" by default. Additionally or alternatively, a crossover (e.g., verb-form) may comprise an operation that combines two (or more) candidates to make a new candidate. For example, a crossover between candidate A and candidate B may comprise a (randomly selected) sub-run of A DNA, combined (e.g., stitched together) with a (randomly selected) sub-run of B DNA, and then have applied to it one or more (e.g., a random number of) mutations. For example, if DNA(A)={(121), (31), (61), (11)} and DNA(B)={(122), (32), (62), (12)}, their crossover's DNA might look like DNA(A×B)={(121), (31), (43), (62), (53)}: the first half of DNA(A), the second half of DNA(B), and mutations adding the new byte (43) and replacing the last byte (12) with a new random byte (53). Note that this is an illustrative example, and that actual MAGMA DNA may be on the order of 100 bytes long (or any other length). The fitness score of a crossover may comprise an average of a calculated fitness score (e.g., a crossover's own calculated fitness score) and one or more other fitness scores (e.g., the crossover's parents' fitness score(s)). The process at step 758 may comprise a crossover of a winner (e.g., from step 756 and/or step 757) with $2^n-1$ random candidates that may still remain in a population. Step 758 may be optional. For example, a first iteration of step 750B and/or step 750B may skip step 758 and/or one or more subsequent iteration(s) of step 750B and/or step 750B may skip or perform step 758. For example, step 758 may be skipped after a determination that the collection of DNA strands 735 has sufficient (and/or sufficiently good) DNA strands for generation of mutators resulting in potential MHDNs that are determined to have sufficiently high fitness values.

At step 759, one or more new DNA strands (or transformations) may be determined/generated/provided. For example, $2^n$ new DNA strands may be provided based on a selection winner with $2^n-1$ random candidates in a population. The one or more new DNA strands may be provided (e.g., stored with and/or added) to a collection of DNA strands (e.g., 735) that may ultimately be provided to a process for determining one or more candidate domain names (e.g., step 730B). For example, the one or more DNA strands (or transformations) may be provided for translation into one or more operations that may be used in an iterative process, such as one or more repetitions of determination of one or more candidates from the one or more DNA strands (e.g., step 730B and/or portions/sub-steps thereof, such as step 731). The output of step 750B is shown at "X2" in FIG. 7C that may be provided for updating the collection of DNA strands 735 at "X2" in FIG. 7B. Similarly, the output of step 750D is shown at "X2" in FIG. 7E that may be provided for updating the collection of DNA strands 735 at "X2" in FIG. 7D.

One or more steps of 730B, 740B, and/or 750B may be performed, for example, if one or more new DNA strands are provided (e.g., from step 750B via an input to step 730B), if a particular quantity (e.g., exceeding/satisfying a threshold quantity) of new DNA strands are provided, and/or if one or more conditions relating to the one or more new DNA strands are satisfied (e.g., if a comparison between one or more new DNA strands and DNA previously provided indicates a difference satisfying a threshold difference). The collection of DNA strands (735) may evolve to comprise a best/improved set of DNA strands (or transformations) for generating domain names most likely to be MHDNs. For example, with subsequent iterations of steps 730B, 740B, and/or 750B, the collection of DNA strands (735) may improve such that subsequent candidate domain names generated at step 730B and/or provided at 740B are based on transformations (e.g., DNA strands) that are most likely to generate MHDNs. Any portion (or all) of step 750B (e.g., one or more of steps 751-762) may be performed and/or repeated, such as for each of a plurality of domain names (e.g., a plurality of domain names in one or more packets and/or in one or more logs), in parallel, in serial, or in a combination thereof.

While FIGS. 7D-7E shows example values, fields, operations, and/or domain names for processing by an MHDN generator, any other values, fields, operations, domain names, and/or other data and/or information may be used/processed.

MHDN generation described herein may be performed with a relatively high efficiency. For example, many different malicious actors may create many different MHDNs that may imitate many different legitimate domain names. It may be the case, however, that the different malicious actors that create different MHDNs may use (e.g., may often use) the same or similar MHDN generation methods/techniques, and that these methods/techniques may be only a (relatively small) subset of the possible ways to generate MHDNs. As an example, a technique for generating MHDNs may comprise transposing, or "swapping", any two letters in a PDNL. Because a number of possible two-letter transpositions for a PDNL may be quadratic (i.e., $O(N^2)$) in the number of letters N, it may be unlikely that malicious actors will register all of the possible associated MHDNs and/or that all of the possible MHDNs will actually trick users. Instead, however, malicious actors may tend to use, for example, one or more of the following MHDN creation heuristics: (a) transpose only consecutive letters in a PDNL; (b) only transpose consecutive vowels; and/or (c) not transpose the $1^{st}$ letter with the last letter. For example, for the PDNL "fruit" of the domain name "fruit.com", there are ten (10) unique potential MHDNs that may be generated using two-letter swaps/transpositions, but applying the (a), (b), and (c) heuristics referenced above may yield only one potential MHDN, "friut.com", that malicious actors may determine may be likely (and/or considerably more likely than other potential MHDNs) to trick users.

An MHDN generator, "Forward-MHDN" solution, and/or MAGMA, may use genetic algorithms to efficiently machine-learn MHDNs. For example, genetic algorithms may be used to efficiently machine-learn MHDNs where the genetic operators and fitness functions may be based on MHDN creation methods/techniques used by actual (human-expert) malicious actors. A source of these MHDN creation methods/techniques may be the Inverse-MHDN solution described with respect to FIG. 3A, FIG. 3B, and/or FIGS. 3C-3D and elsewhere herein. An Inverse-MHDN solution may include in output metadata (e.g., 363) the operations used to transform an input (e.g., a potential MHDN) to an output (legitimate, trusted) domain name that the input MHDN may be imitating. As such, MAGMA may improve its performance as the Inverse-MHDN solution may improve its performance and/or detects new methods/techniques used by malicious actors to generate actual MHDNs. An input to MAGMA may be a legitimate, trusted domain name (or a PDNL of a legitimate, trusted domain name). An output of MAGMA may be multiple potential MHDNs that may be registered and may be recorded (e.g., have an A record) in DNS or highly likely to be registered/recorded in DNS by malicious actors (e.g., in the future) for use in MHDN-vectored threat(s) and/or attack(s). An output of an efficient MAGMA implementation may be a subset of the set of potential MHDNs that may be generated using one or more arbitrary methods (e.g., naïve methods) that may not necessarily be based on actual MHDN creation methods. This subset may comprise all or most (e.g., substantially all) MHDNs that may have been or potentially will be registered/recorded in the DNS by malicious actors (e.g., in the future).

Figure 8:
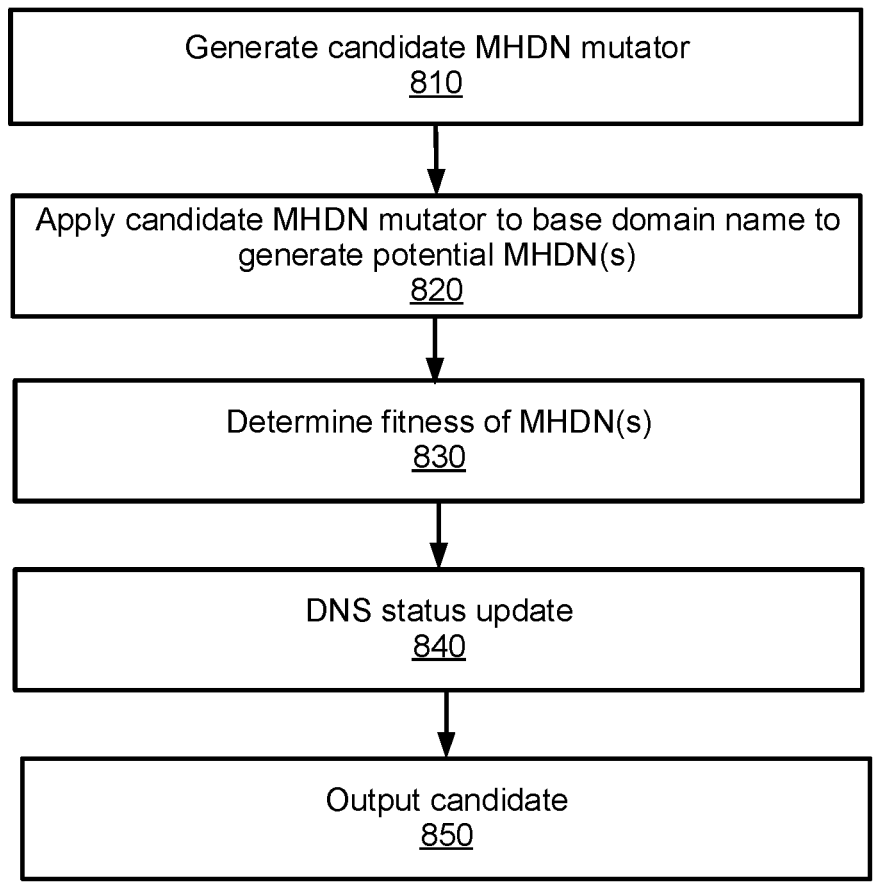
FIG. 8 shows an example method for MHDN generation and/or Forward-MHDN.

FIG. 8 shows an example method for MHDN generation and/or Forward-MHDN. For example, an MHDN generator, "Forward-MIDN" solution, and/or MAGMA may comprise an application procedure/mode. Method 800 may comprise an application procedure/mode. Method 800 may comprise one or more portions of step 730A, step 730B, and/or step 730D. Method 800 may comprise a method for generating a candidate and/or a candidate MHDN mutator. For example, at step 810, a candidate MHDN mutator may be generated. The candidate mutator may be generated by applying at least one DNA strand to a set of operations (e.g., such as may be generated by step 731 of FIG. 7B). The DNA strand may be received from a collection of DNA strands (e.g., 735 in FIG. 7B) and/or may be randomly generated. Additionally or alternatively, the candidate mutator may be provided by a previous MAGMA procedure (e.g., such as a previous iteration of method 800 and/or a previous performance of one or more of methods 700A, 700B, and/or 700D). The set of operations may be from an operations bank (e.g., such as may be determined by step 723 of FIG. 7B). At step 820, the candidate MHDN mutator may be applied to a base domain to generate one or more potential MHDNs (e.g., such as may be determined by step 732 of FIG. 7B). At step 830, a fitness function may be called to determine the fitness of one or more potential MHDNs (e.g., such as may be determined by step 733 of FIG. 7B). At step 840, a DNS status update may be performed. The DNS status update may be optional. For example, a DNS status of one or more candidate MHDNs may be set to "untested" (e.g., such as may be performed by step 734 of FIG. 7B). The DNS status update may comprise a checking one or more DNS databases and/or performing a DNS query/lookup (e.g., such as described with respect to step 752 and/or such as described with respect to one or more steps 760-762 in an Ask-DNS procedure). At step 850, one or more candidates and/or may be output and/or the candidate MHDN mutator may be output. For example, the output at step 850 may comprise the output described with respect to step 736 and/or step 740B. The method 800 may end with the output from step 850 being provided, for example, in a CTI feed, to a collection of DNA strands (e.g., 735), and/or for a cybersecurity application. Method 800 may be performed on one or more base domain names, for example, in an application procedure/mode of MAGMA.

An efficient MAGMA implementation may be used by a CSaaS Provider (such as CSAAS 140) to (proactively) protect its subscribers/customers from at least some MHDN-vectored threat(s) and/or attack(s). The following example protections are described with reference to elements from network 100 of FIG. 1.

For an input domain name "X" (wherein "X" may comprise any domain name) that may be owned and/or administrated/controlled by a CSaaS subscriber/customer, a MAGMA output may comprise MHDNs of "X" that may be registered or recorded in a DNS (e.g., DNS 170). A CSaaS (e.g., CSAAS 140) may include these MHDNs in one or more CTI feeds that may be published by the CSaaS's CTIP (e.g., CTIP 150) service. For example, outputs of one or more of step 730B, step 730D, 740B, step 740D, step 752, step 757, step 762, step 759, step 750B, and/or step 750D may be included in one or more CTI feeds that may be published by a CSaaS's CTIP service. Subscribers to the CTIP service (such as SPMS 160) may ingest the CTI feed(s), may transform the CTI into packet filtering rules and may include the rules in one or more policies, and may publish the one or more policies to subscribers. Subscribers to the SPMS (e.g., SPMS 160), such as TIGs (e.g., TIGs 120) may receive the one or more policies, may configure their packet filtering logic with the one or more policies, and may enforce the one or more policies (e.g., by applying them to in-transit packet traffic).

For an input domain name "X" (wherein "X" may comprise any domain name) that may be owned and/or administrated/controlled by a CSaaS subscriber/customer, a MAGMA output may comprise potential MHDNs of "X" that may not be registered or recorded in a DNS (e.g., DNS 170) but that may be likely to be registered or recorded in the DNS in the (near) future by one or more malicious actors for use in MHDN-vectored threat(s) and/or attack(s). A CSaaS (e.g., CSAAS 140) may collect some or all of such potential MHDNs and compare them to databases/streams of newly registered domain names (NRDs) that may be provided by one or more NRD services (e.g., NRDS 180). For example, outputs of one or more of step 730B, step 730D, 740B, step 740D, step 752, step 757, step 762, step 759, step 750B, and/or step 750D may be provided to a CSaaS that may compare one or more MHDNs with one or more databases/streams (e.g., of NRDs) that may be provided by one or more services (e.g., NRD services). The one or more databases/streams may be from any location and/or source. For example, the one or more databases may comprise all domains that may have been previously identified as being registered, and such one or more databases may be checked rather than performing a DNS query/lookup. The one or more databases may be populated, for example, by extracting domain names in the DNS from TLS certificate databases (for example Certificate Transparency logs (RFC 9162). If/when any matches are detected, then the CSaaS may include these NRD-matching MHDNs in one or more CTI feeds that may be published by the CSaaS's CTIP (e.g., CTIP 150) service. Subscribers to the CTIP service (such as SPMS 160) may ingest the CTI feed(s), may transform the CTI into packet filtering rules and may include them in one or more policies, and may publish the one or more policies to subscribers. Subscribers to the SPMS (e.g., SPMS 160), such as TIGs (e.g., TIGs 120) may receive the one or more policies, may configure their packet filtering logic with the one or more policies, and may enforce the one or more policies (e.g., by applying them to in-transit packet traffic). Additionally, a CSaaS (e.g., CSAAS 140) may have an Inverse-MHDN solution examining newly registered domain names, such as described herein, such that the associated protections may be coordinated.

For an input domain name "X" (wherein "X" may comprise any domain name) that may be owned and/or administrated/controlled by a CSaaS subscriber/customer, a MAGMA output may comprise potential MHDNs of "X" that may not be registered or recorded in a DNS (e.g., DNS 170) but that may be likely to be registered or recorded in a DNS in the (near) future by one or more malicious actors for use in MHDN-vectored threat(s) and/or attack(s). But instead of comparing such MHDNs to NRDs as in some examples, a CSaaS (e.g., CSAAS 140) and/or a CSaaS subscriber/customer (such as PVT-NTWK-1 102) may register the base domain name (BDN) portion of the MHDNs in the DNS and/or may add records (for example, A, AAAA, and/or CNAME records) for the BDNs and/or for subdomains (e.g., the "www" subdomains) for the BDNs (some of which may have been generated by MAGMA). By registering and/or recording these domain names, the CSaaS (e.g., CSAAS 140) and/or the CSaaS subscriber/customer may make them unavailable for registration and/or recordation by malicious actors and therefore unavailable for use in MHDN-vectored threat(s) and/or attack(s). Furthermore, the CSaaS (e.g., CSAAS 140) and/or the CSaaS subscriber/customer may add the domain names to an authoritative name server DNS-NS 143 that may be operated/administrated/controlled by the CSaaS (e.g., CSAAS 140) and/or the CSaaS subscriber/customer. Because the CSaaS (e.g., CSAAS 140) and/or the CSaaS subscriber/customer may operate the authoritative name servers for the likely potential MHDNs that it registered or recorded, the CSaaS (e.g., CSAAS 140) and/or the CSaaS subscriber/customer may detect and/or record the source IP addresses of the IP packets containing the DNS query requests for resolving the likely potential MHDNs. The IP addresses may be indicative of the originators of the DNS query requests. The originators may be malicious actors who may be trying to determine if any MHDNs they created are already registered or recorded in the DNS. Thus, the IP addresses may be treated as threat indicators associated with the malicious actors and may be included in some cyber threat intelligence.

However, for at least some Internet and DNS infrastructure configurations, it may be likely that by the time that one or more packets containing the DNS query requests may be received by an authoritative name server, the source IP addresses may not be the IP addresses of the originators (e.g., the malicious actors) of the DNS query requests but instead may be IP addresses of (non-transparent and non-malicious) DNS proxies in the paths between the originators and/or the authoritative name server. Therefore, the IP addresses of DNS query request packets received by the authoritative name server may not be effective threat indicators. A method for determining one or more originators/malicious actors may be performed as described with respect to FIG. 9.

Figure 9:
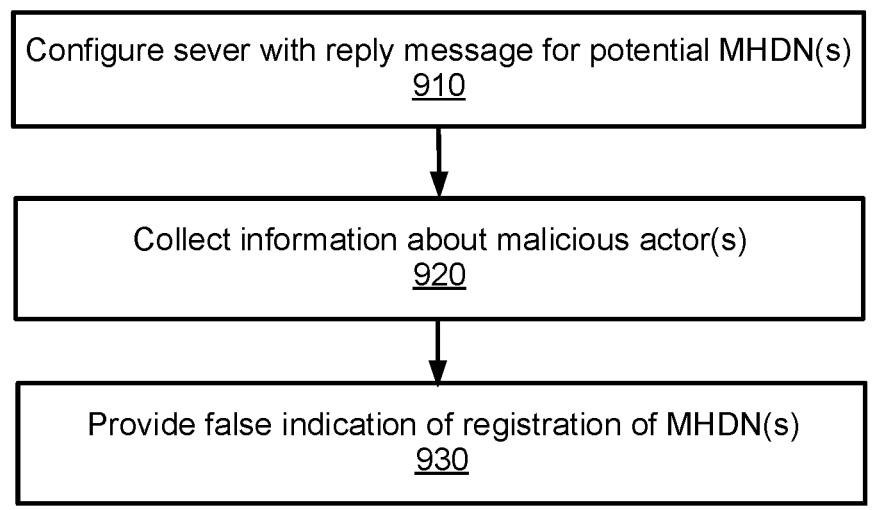
FIG. 9 shows an example method for MHDN source identification.

FIG. 9 shows an example method 900 for MHDN source identification. At step 910, an authoritative name server (e.g., DNS-NS 143) may be configured with a reply message that may be a response to requests for resolution for potential MHDN(s). For example, an authoritative name server may be configured to reply with a DNS NXDOMAIN message to any requests for a likely potential MHDN. The NXDOMAIN message may indicate that the domain name may not exist in the DNS. The NXDOMAIN response may trick the malicious actors into believing that the MHDN may not be registered or recorded in the DNS.

At step 920, information about one or more malicious actors may be collected. For example, if/when the malicious actors then attempt to register the potential MHDN, a registrar (which may be a CSaaS (e.g., CSAAS 140) and/or the CSaaS's subscriber/customer, and/or an obfuscating and/or anonymizing "front" for a CSaaS (e.g., CSAAS 140) and/or the CSaaS's subscriber/customer, and/or a DNS-registrar organization that may have an agreement with a CSaaS (e.g., CSAAS 140) and/or the CSaaS' susbcriber/customer) may collect (valuable) intelligence information about one or more malicious actors. This intelligence information, for example, may be included in cyber threat intelligence associated with the malicious actor(s).

At step 930, one or more false indications of registration of (potential) MHDN(s) may be provided. For example, a registrar may trick one or more malicious actors into believing that they have registered one or more (potential) MHDN in a DNS. A registrar may trick the malicious actor(s) into believing, for example, that they have created A, AAAA, MX, and/or CNAME resource records for the MHDN(s). One or more resource records may comprise additional threat intelligence on the malicious actors. The malicious actor(s) may then use the MHDN in some malicious campaign, such as a mass phishing e-mail attack and/or spear-phishing e-mail attack. However, the attack(s) may be defeated because any DNS query requests to resolve the MHDN to an IP address may be unsuccessful. It may be some time before the malicious actor(s) determine(s) that they may have been spoofed.

For an input domain name "X" (wherein "X" may comprise any domain name) that may be owned and/or administrated/controlled by a CSaaS subscriber/customer, a MAGMA output may comprise potential MHDNs of "X" that may not appear to be registered or recorded in a DNS (e.g., DNS 170) but that may have been recently registered or recorded (or may be likely to be registered or recorded in a DNS in the (near) future) by one or more malicious actors for use in MHDN-vectored threat(s) and/or attack(s). But instead of (or in addition to) comparing such MHDNs to NRDs as in some examples and/or registering the BDN portion of the MHDNs in the DNS and/or adding records for the BDNs and/or for subdomains for the BDNs, one or more elements of these potential MHDNs may be added to one or more CTI feeds that may be published by the CSaaS's CTIP (e.g., CTIP 150) service. Subscribers to the CTIP service (such as SPMS 160) may ingest the CTI feed(s), may transform the CTI into packet filtering rules and may include the rules in one or more policies, and/or may publish the one or more policies to subscribers. Subscribers to the SPMS (e.g., SPMS 160), such as TIGs (e.g., TIGs 120, which may be a RuleGATE® device or any other device configured as a CTI gateway that may be protecting a CSaaS subscriber's network such as PVT-NTWK-1 120) may receive the one or more policies, may configure their packet filtering logic with the one or more policies, and/or may enforce the one or more policies (e.g., by applying them to in-transit packet traffic). Thus, for example, if a newly registered MHDN is not identified in an NRD source (e.g., even if the newly registered MHDN was actually registered or recorded), CSaaS subscribers may be able to be prepared and/or actively protect against the potential MHDN based on being informed about the potential MHDN via the CTI feed. For example, by receiving an indication of a potential MHDN in a CTI feed, CSaaS subscribers may implement any of the operations described herein to protect against a malicious threat and/or attack.

Example protections described herein, or similar protections, may not be constrained to a CSaaS's (e.g., CSAAS 140's) subscribers/customers. Organizations that may not be subscribers/customers of a CSaaS (e.g., CSAAS 140) may request that the CSaaS provide these protections. Such organizations may supply to the CSaaS (e.g., CSAAS 140) their domain names that they want to protect from MHDN-vectored threats and/or attacks. The CSaaS (e.g., CSAAS 140) may create similar exemplary protections.

Forward-MHDN solutions such as the MHDN generation described herein may improve cyber protections. For example, to determine a high-quality Forward-MHDN solution that produces outputs that may be used to improve cyber protections, one or more aspects may be considered, such as: when an input comprises one or more domain names of CSaaS customers; when an input comprises one or more legitimate domain names of popular brands; and/or when an input comprises one or more domain names having one or more particular characteristics (e.g., a previously analyzed domain name, a previously detected MHDN, and/or a domain name on one or more lists of domain names having one or more characteristics in common), as described further herein.

Figure 10:
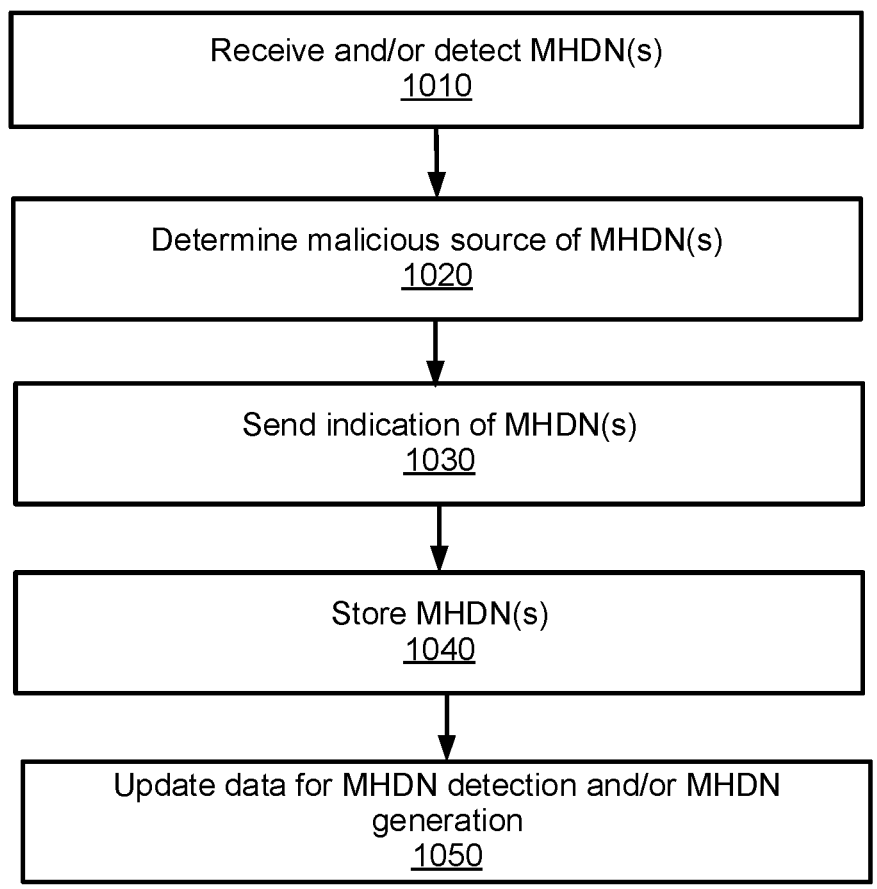
FIG. 10 shows an example method for MHDN remediation.

FIG. 10 shows an example method 1000 for MHDN remediation. A forward-MHDN solution's output may be determined based on an input comprising one or more domain names of CSaaS customers. A desired output of a Forward-MHDN solution may be one or more domain names that may be recorded in the DNS and that are potentially MHDNs. For example, at step 1010, a computing device may receive and/or detect (e.g., discovery) one or more potential MHDNs. The computing device may perform one or more remedial steps, for example, based on (e.g., after or in response to) receiving and/or detecting one or more potential MHDNs. For example, at step 1020, a computing device may investigate the one or more potential MHDNs and/or determine one or more sources of the MHDNs. The computing device may determine whether a source of an MHDN is a malicious source (e.g., if the domain name is an MHDN recorded by one or more malicious actors). At step 1030, the computing device may send an indication of one or more MHDNs. For example, the computing device may notify one or more CSaaS subscribers and/or customers of the MHDN(s); provide assistance with remediation associated with the MHDN(s) (e.g., customer(s) may negotiate with registrar(s) to mitigate the MHDNs that are designed to mimic their legitimate domain name); work with ICANN or any organization/authority to enforce the UDRP and/or any other rule/policy; and/or provide any other notification to protect against malicious actor(s). At step 1040, the computing device may store the one or more MHDNs. Additionally or alternatively, the computing device may add the MHDN(s) to a CTI feed comprising MHDN threat indicators. At step 1050, the computing device may update data for MHDN detection (such as in steps 360A, 360B, and/or 360C described with respect to FIGS. 3A, 3B, and/or 3D respectively; and/or such as in steps 750A, 750B, and/or 750D described with respect to FIGS. 7A, 7B, and/or 7E, respectively). For example, the computing device may add the MHDN(s) to one or more caches (e.g., any caches) that may be accessed by any MHDN detectors and/or Inverse-MHDN solutions, such as to avoid re-computing and re-detecting an MHDN that has already been identified.

Figure 11:
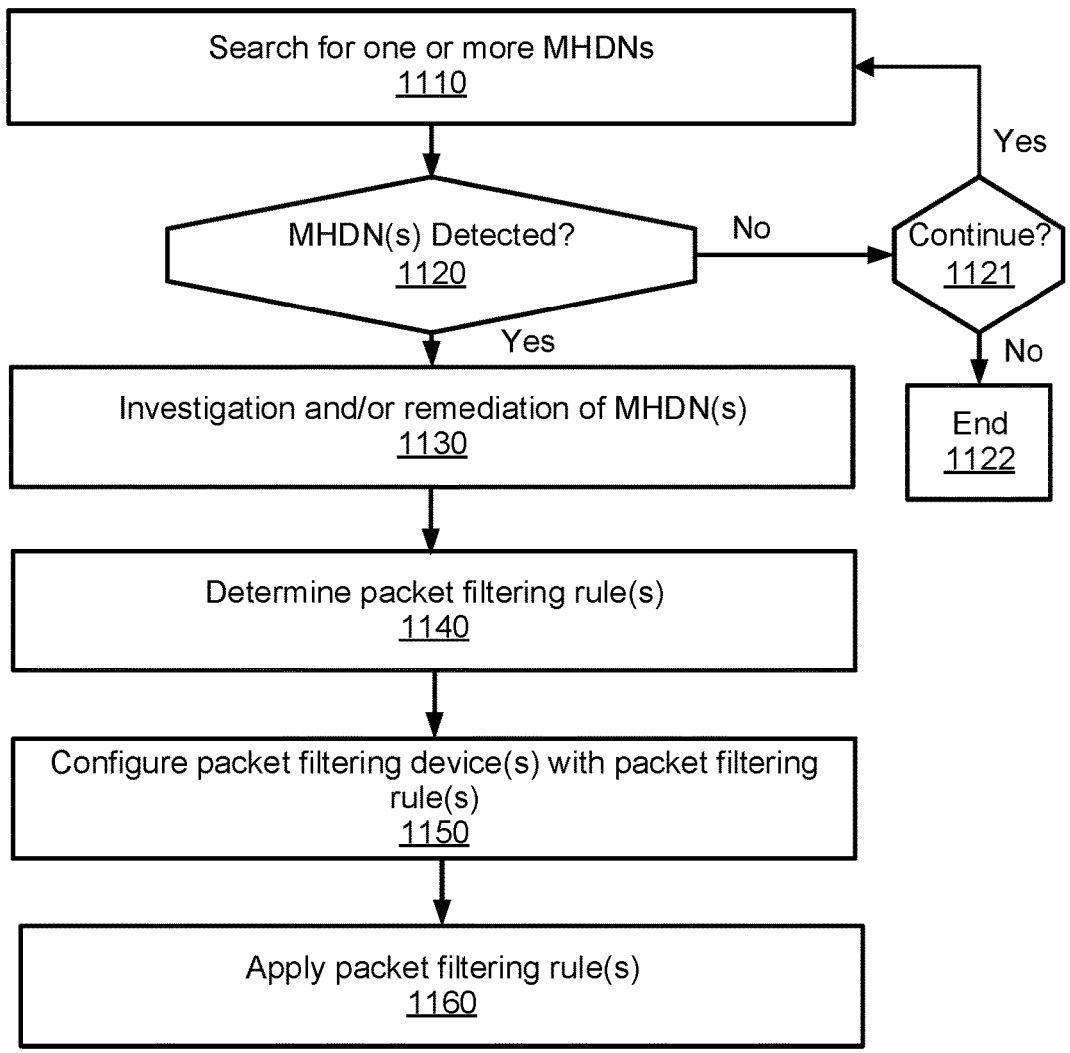
FIG. 11 shows an example method for MHDN remediation.

FIG. 11 shows an example method 1100 for MHDN remediation. The method 1100 may be performed by, for example, one or more subscribers to a CTI feed (e.g., provided by a CTI provider). A CTI provider may create one or more CTI reports. The one or more reports may indicate/detail threat information associated with one or more MHDN threat indicators, such as which organization registered an MHDN's BDN and/or eTLD+1, one or more types of attacks the MHDN threat indicator may be associated with, and/or any other information. At step 1110, one or more MHDNs may be searched. The one or more MHDNs may be searched in one or more logs. For example, the one or more logs may comprise one or more network communications logs. MHDNs may be searched in the one or more logs generated by a computing device on a subscriber's protected network. At step 1120, a determination may be made as to whether one or more MHDNs have been detected. If a determination is made that no MHDNs have been detected, a determination may be made (e.g., at step 1121) whether to return to step 1110 or end the process (e.g., at step 1122). At step 1130, investigation and/or remedial action may be performed on one or more MHDNs (e.g., that may have been detected based on the search at step 1110). For example, domain names identified from the search that are determined to be MHDNs may be investigated. One or more remedial actions may be taken on any domain name(s)

determined to be an MHDN (e.g., removal, replacement, sending for further processing, and/or any other remedial action such as any remedial action described herein). At step 1140, one or more packet filtering rules may be determined/generated. The one or more packet filtering rules may comprise the potential MHDNs (e.g., MHDNs) included in the CTI feed as matching criteria. At step 1150, one or more (inline) packet filtering devices may be configured with the one or more packet filtering rules. At step 1160, the one or more rules may be applied (e.g., to packet traffic). For example, if a packet filtering device detects a match between an MHDN and a packet, then the device may act on a packet to protect the network. For example, a packet filtering device may block and drop the packet, allow the packet but log it and send the log to a network threat awareness application operated by the cybersecurity administrators (such as an SOC), capture the packet, and/or send the packet to an inspection system (such as an IDS/IPS, and/or any other inspection system). Any of steps 1110, 1120, 1130, 1140, 1150, and/or 1160, while shown sequentially, may be performed in a different order (e.g., during, before, and/or after any of the other steps of FIG. 11), and/or may be optionally performed (e.g., skipped) and/or repeated.

In at least some examples, it may be beneficial for a Forward-MHDN solution to not only discover potential MHDNs that are registered or recorded in the DNS but also to identify and/or predict potential MHDNs that are not yet registered or recorded in DNS, but that are likely (e.g., highly likely) to be registered or recorded in DNS in the future by malicious actors. Therefore, an additional aspect of the Forward-MHDN solution may be to register or record potential MHDNs in the DNS. For example, one or more MHDNs (and/or potential MHDN(s)) may be registered or recorded in the DNS at (or after) step 750A of FIG. 7A, step 750B of FIG. 7C, step 750D of FIG. 7E, step 930 of FIG. 9, step 1050 of FIG. 10, and/or step 1160 of FIG. 11. Proactive cyber protection methods described herein may prevent malicious actors from registering or recording potential MHDNs and then using them in threats and/or attacks. Additionally or alternatively, lists of potential MHDNs that are not yet registered or recorded in DNS may be compared to databases of newly registered domain names, and if/when a match is found, a CSaaS provider and/or CTI provider may be notified of the newly registered potential MHDN and may then use it in one or more proactive protection methods such as described herein.

Figure 12:
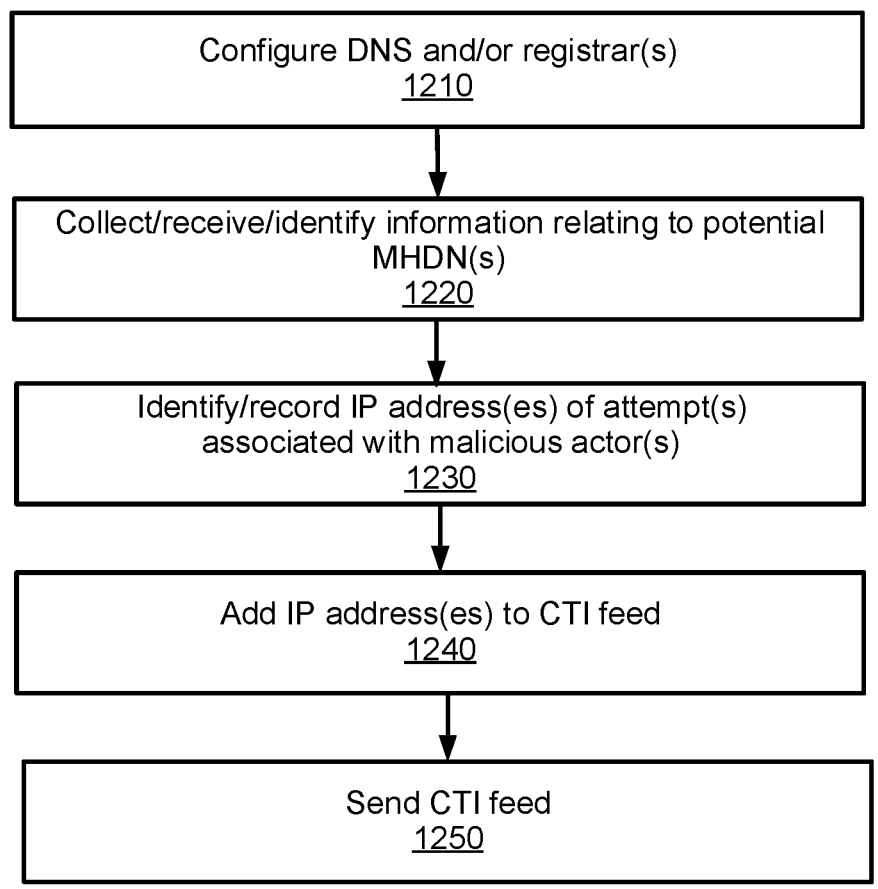
FIG. 12 shows an example method for MHDN remediation.

FIG. 12 shows a method 1200 for MHDN remediation. The method 1200 may be performed by, for example, a CSaaS provider. At step 1210, a DNS and/or one or more registrars may be configured. The DNS and/or the one or more registrars may be configured (e.g., by a CSaaS provider) such that the CSaaS provider controls one or more servers that may be the authoritative name servers for one or more potential MHDNs. At step 1220 information relating to one or more (potential) MHDNs may be collected/received/identified. For example, information may be collected by observing/monitoring attempts to resolve one or more potential MHDNs and/or determine if there are records in the DNS for one or more potential MHDNs. Attempts, for example DNS requests, may be originated by malicious actors who may be determining if/whether a given potential MHDN may still be available for registering and/or recording in the DNS (and thus available for use in MHDN-vectored threats and/or attacks). At step 1230, one or more source IP addresses of such attempts (e.g., DNS requests), which may be associated with Internet hosts operated by malicious actors, may be identified and/or recorded. At step 1240, the one or more IP addresses may be included in a CTI feed. At step 1250, the CTI feed comprising the one or more IP addresses (e.g., IP addresses associated with Internet hosts operated by one or more malicious actors) may be provided/sent/published (e.g., by a CSaaS provider).

In at least some examples, one or more legitimate domain names of popular brands may be used as input to a Forward-MHDN solutions. For example, a large quantity (e.g., the top 20,000 entries in the Tranco (https://tranco-list.eu/database) of popular brands may be used as input to a Forward-MHDN solution. Because of popular brands' recognition among Internet users, their (legitimate) domain names are likely to be targeted by malicious actors who will create MHDNs and use them in MHDN-vectored threats and/or attacks. Similar to a Forward-MHDN solution for CSaaS customers, the output of a Forward-MHDN solution may be domain names that are registered or recorded in the DNS and that may be potential MHDNs that may attempt to mimic the domain names of popular brands. The number of potential MHDNs may number in the hundreds or thousands (or any other quantity) for at least some popular brands. Similar to the method 1200, one or more potential MHDNs may be used to protect one or more networks from associated attacks by, for example, publishing the potential MHDNs in CTI feeds that may be provided to subscribers for use in protecting subscribers' networks, and for example, adding the MHDNs (and/or potential MHNDs) to any caches that may be accessed by any MHDN detectors/Inverse-MHDN solutions (such as to avoid re-computing and/or re-detecting an MHDN that has already been identified). Accordingly, the method 1200 described with respect to FIG. 12 may be applied to popular domain names (and/or any list of domain names) and/or applied as an input (e.g., training data) to any Inverse-MHDN solution described herein (e.g., any of methods 300A, 300B, 300C, 400, 500, and/or 600).

In at least some examples, each potential MHDN generated may not have been investigated to determine if it was recorded in DNS by malicious actors, for example, due to a potentially large number of potential MHDNs that may be mimicking (popular) domains. In this situation, a CTI feed may designate one or more un-investigated potential MHDN as low-confidence (and/or with any other designation indicating a lack of certainty as to MHDN status). Accordingly, for example, a packet filtering device may be configured with a packet filtering rule that may have one or more potential MHDNs as a matching criterion and that may allow one or more packets but monitors (e.g., logs, captures) the one or more packets and/or an associated packet flow. Subsequently, for example, if one or more packets comprising the potential MHDN is observed by the packet filtering device in actual network communications, an investigation for actual maliciousness may be conducted before taking appropriate remedial actions. A Forward-MHDN solution may generate potential MHDN(s) for the domain names of popular brands and then proactively register or record these MHDNs that have not yet been recorded by malicious actors. Additionally or alternatively, one or more lists of potential MHDNs for the domain names of popular brands that may not yet be registered in DNS may be compared to one or more databases of newly registered domain names. If/when a match is found, a CSaaS provider and/or a CTI provider may be notified of the newly registered potential MHDN(s). The CSaaS provider and/or the CTI provider may use the newly registered potential MHDN(s) in one or more proactive protection methods such as described herein. Additionally or alternatively, one or more lists of potential MHDNs that may not yet be registered or recorded in DNS may be published in CTI feeds and subsequently may comprise matching criteria of packet filtering rules that may be used to configure packet filtering devices. If at a future time, malicious actors register or record these potential MHDNs and use them in MHDN-vectored threats and attacks, then the packet filter devices may be able to observe the MHDNs in packet traffic and take actions to protect associated networks.

Figure 13:
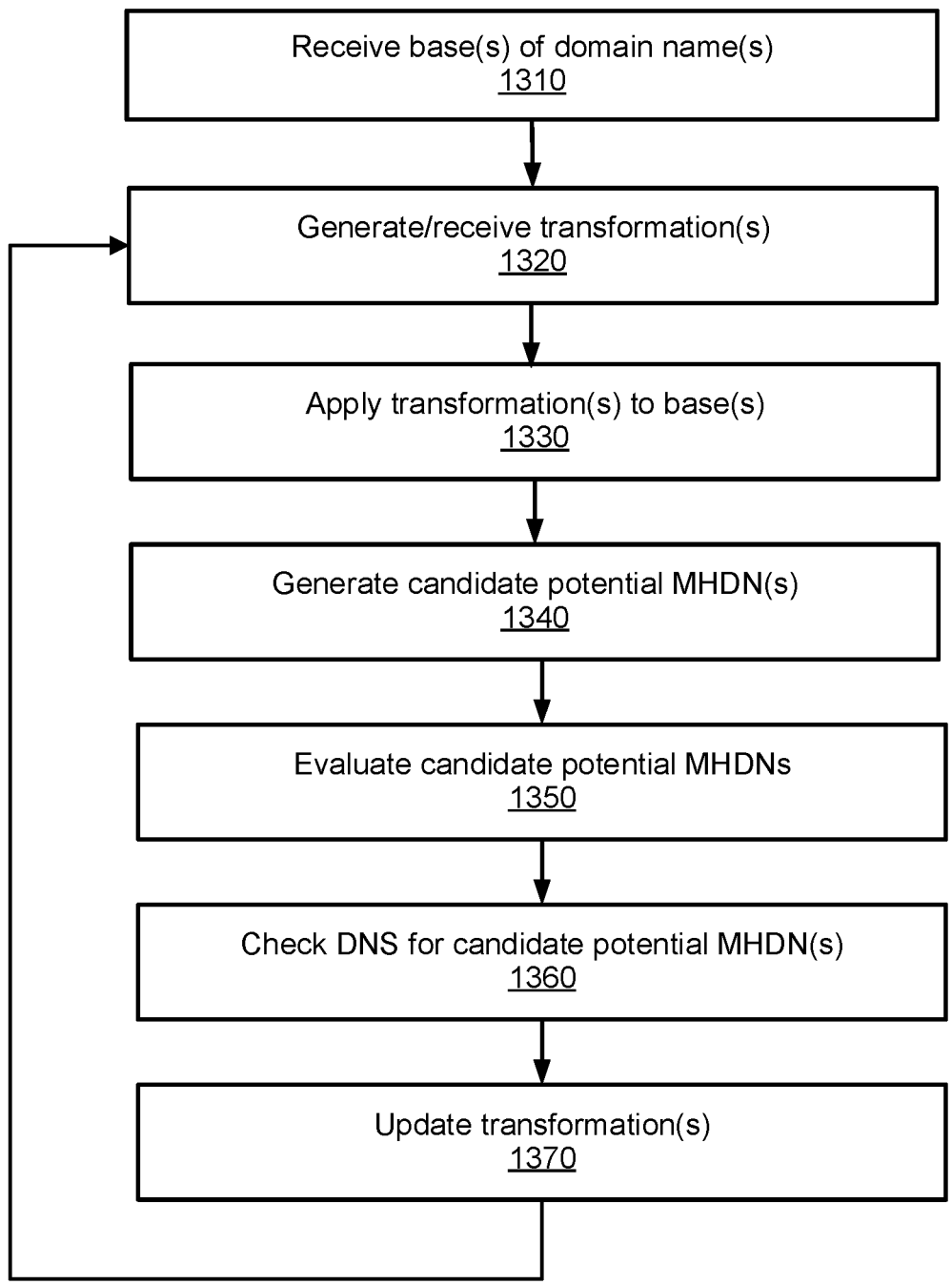
FIG. 13 shows an example method for MHDN generation.

FIG. 13 shows an example method 1300 for MHDN generation. Method 1300 and/or Forward-MHDN solutions described herein may comprise, for example, MAGMA. MAGMA may comprise a genetic and/or evolutionary algorithm for generating potential MHDNs. At step 1310, a base of a domain name (and/or a plurality of bases of a respective plurality of domain names) may be received. For example, MAGMA may accept a base such as a word (e.g., "example") as one or more inputs that may comprise a primary domain name label (PDNL, e.g., the "+1" of an eTLD+1) of a trusted domain name (e.g., "example.com"). At step 1320, one or more transformations (e.g., DNA strand(s) may be generated/received. For example, MAGMA may evolve a population of potential MHDNs that may be likely to have already been registered or recorded in the DNS by one or more malicious actors and/or that are not yet registered or recorded in the DNS by malicious actors but likely may be in the future. The population of potential MHDNs may be analyzed to determine/generate transformations that correspond to the features that transform a non-MHDN to a potential MHDN.

At step 1330, the one or more transformations may be applied to the base(s) of the received domain name(s). At step 1340 one or more potential candidate MHDNs may be generated, for example, based on applying the one or more transformations to the base(s) of the received domain names. For example, MAGMA may comprise one or more procedures/modes, such as one or more training procedures/modes and/or one or more application procedures/modes. One or more training procedures/modes may comprise a self-training machine learning genetic algorithm that may generate a population of candidate potential MHDNs. At step 1350, candidate potential MHDNs may be evaluated. For example, MAGMA may evaluate each candidate potential MHDN, such as by using a fitness function that may comprise multiple subfunctions. At step 1360, the DNS or a DNS database may be checked to see whether it includes the candidate potential MHDNs. For example, subfunctions may comprise a subfunction that (selectively) checks if a candidate potential MHDN being evaluated is associated with a resource record in the Internet's DNS or with an entry in some DNS database of domain names that may be in DNS. For example, the Ask-DNS procedure described herein (e.g., one or more of steps 760-762) may be performed. The Ask-DNS procedure may be performed, for example, by checking one or more databases of domain names that are in the DNS and that may be constructed in a way to optimize search speed and/or avoid the time/cost of querying DNS. MAGMA may select the most fit potential MHDNs and may apply genetic operators (e.g., crossover and/or mutation operators, that may be learned by recreating and/or mimicking methods and/or techniques used by malicious actors to create actual MHDNs) to generate a next population of candidates. A mutation may comprise a process that may (randomly) alter bytes in DNA. Bytes may be inserted, deleted, and/or replaced with a new random byte. MAGMA may repeat an evolutionary cycle until convergence to a stable, fit population may be achieved. MAGMA may discover methods and/or techniques (e.g., during the evolutionary process) that may be used by malicious actors to create actual MHDNs. MAGMA may provide information about the discovered methods and/or techniques to one or more MHDN detectors and/or Inverse-MHDN solutions which may use the information to improve their performance. For example, at step 1370, one or more transformations may be updated. The one or more transformations may be updated to include transformation(s) identified from DNS (e.g., based on step 1360) as potentially most likely corresponding to potential MHDNs. One or more steps of the method 1300 may be repeated. For example, after the one or more transformations are updated at step 1370, the transformations may be provided for candidate potential MHDN generation at step 1320. MAGMA's fitness function(s) may be provided to one or more MHDN detectors and/or Inverse-MHDN solutions which may measure a confidence that an MHDN detector's input is an MHDN. For example, MAGMA's fitness function(s) may be applied at step 1350 in the evaluation of candidate potential MHDNs.

A genetic algorithm may use incremental evaluation (e.g., one candidate may be evaluated per cycle), partial evaluation (e.g., some, but not all, candidates may be evaluated per cycle), and/or complete evaluation (e.g., all candidates may be evaluated per cycle). MAGMA's fitness function may apply some, but not necessarily all, subfunctions (e.g., an evaluation of a candidate may or may not include a DNS query/lookup or DNS database search).

MAGMA may take as input a word (e.g., "example") that corresponds to the primary domain name label (PDNL) of an actual domain name (e.g., the "+1" subdomain label of an eTLD+1 domain name). MAGMA may use a genetic algorithm to produce as output a (e.g., bounded) list comprised of {potential MHDN, DNS record status, fitness score} 3-tuples, e.g., {{example.com, DNS resolvable, −11.668}, {www.exomple.net, DNS unresolvable, −11.673}, {admin.example.net, DNS untested/unknown, −5.883}, . . . }.

One or more potential MHDNs that may be associated with "DNS resolvable" statuses may already be recorded in the DNS and/or may have been created by and/or recorded in the DNS by one or more malicious actors. The potential MHDNs that may be associated with "DNS unresolvable" statuses may be viewed as MHDNs that are not yet recorded in the DNS but may be likely to be recorded in the DNS by one or more malicious actors in the (near) future. Potential MHDNs that may be associated with "untested" statuses may have not yet been tested for membership in the DNS. Potential MHDNs that may be associated with "untested" statuses may have been checked, for example, in one or more databases of domain names in the DNS, which may be a way to optimize search speed and/or avoid the time/cost of querying DNS.

Figure 14:
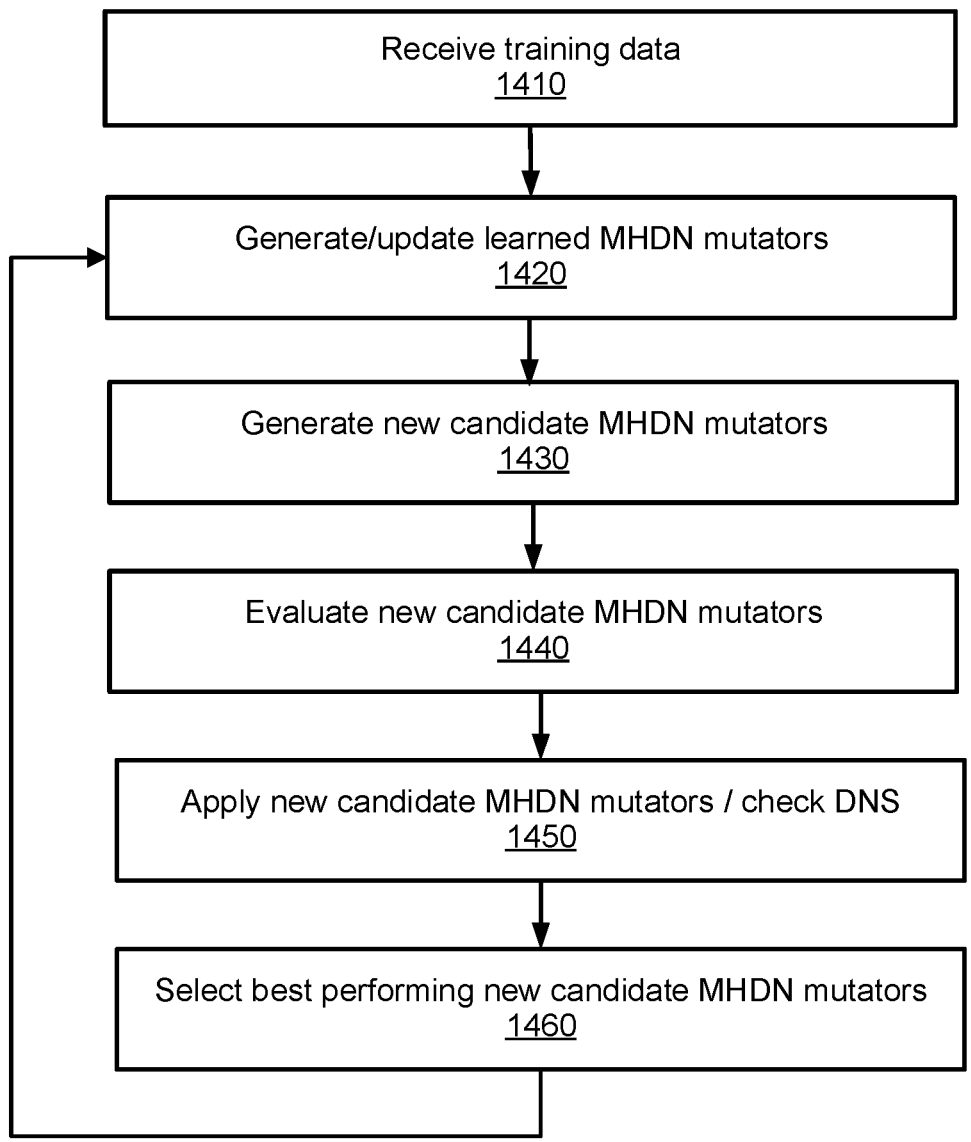
FIG. 14 shows an example method for learned MHDN mutator generation.

FIG. 14 shows an example method 1400 for generating learned MHDN mutators (e.g., DNA strands, transformations, etc.). At step 1410, training data may be received. For example, MAGMA may accept as input information about MHDN creation techniques that may be used by malicious actors as well as information about actual/real MHDNs. MAGMA may use this information, for example, to improve its performance. Such information may be provided by MHDN detectors and/or Inverse-MHDN solutions. At step 1420, learned MHDN mutators (e.g., DNA strands, transformations, etc.) may be generated. Learned MHDN mutators may be generated, for example, based on the received training data. For example, MAGMA may discover methods and/or techniques that may be used by one or more malicious actors to create actual MHDNs. Methods and/or techniques that may be used by one or more malicious actors to create actual MHDNs may be represented in the form of MHDN mutators and/or transformations that may be applied to a base and/or a domain name to generate candidate MHDNs. At step 1430, new candidate MHDN mutators may be generated. For example, MAGMA may provide information about the discovered methods and/or techniques to MHDN detectors and/or Inverse-MHDN solutions, which may use the information to improve their performance.

At step 1440, the new candidate MHDN mutators may be tested/evaluated for fitness and/or likelihood of predicting an MHDN, such as described with respect to step 733 and fitness function 724. At step 1450, the new candidate MHDN mutators may be applied to a base domain and its output (e.g., candidate MHDN(s)) may be checked against the DNS. For example, after a MAGMA instance halts and/or produces an output, performance of the MAGMA instance may be measured by the difference between the number of potential MHDNs in the output with "DNS resolvable" status and the number of actual MHDNs recorded in the DNS (which may be an estimate). The performance may be measured by the number of potential MHDNs in an output with "DNS unresolvable" status and "DNS untested" status that may have a high probability of being registered or recorded in the DNS in the (near) future by one or more malicious actors (where probability may be, for example, determined/computed as some function of a potential MHDN's evaluation score). At step 1460, new candidate MHDN mutators deemed to have scored best based on this performance may be selected for further training and/or for use in one or more cybersecurity operations. For example, the learned MHDN mutators may be updated to include the selected new candidate MHDN mutators, such that the method 1400 may return to step 1420.

MAGMA may include the following advantages as compared to other Forward-MHDN technologies. MAGMA may use knowledge produced by an MHDN detector (e.g., an Inverse-MHDN solution) about actual MHDN creation techniques, for example the operations, used by one or more malicious actors. The output of the MHDN detector may comprise operations used by one or more malicious actors to generate the (input) MHDN. These operations may then be input into MAGMA, which may use them to generate and/or evaluate populations of potential MHDNs. This process may have an advantage of using knowledge of, and statistics about, actual MHDN creation techniques discovered by MHDN detectors to generate, evaluate, and/or evolve populations of potential MHDNs that may comprise actual MHDNs of the input domain name that may be registered or recorded in the DNS and/or potential MHDNs that may not be registered or recorded in the DNS but may likely be registered or recorded in the future by one or more malicious actors. As an MHDN detector discovers new operations used to create actual MHDNs and/or produces increasingly more accurate statistical information (because, for example, of increases over time in the number of samples) about the MHDN creation operations that is used as input to MAGMA, MAGMA may continue to improve its performance.

MAGMA may self-train. That is, MAGMA is a machine learning algorithm that may train itself via the DNS, and/or one or more other DNS databases of resolvable domain names, while it may execute with minimal-or-no human operator maintenance and/or supervision. For example, at step 1370 of FIG. 13, updated transformations may be applied in subsequent iterations of candidate potential MHDN generation, wherein the updated transformations may be based on checking DNS information of previously evaluated candidate potential MHDNs (e.g., at step 1350). As another example, at step 1460 of FIG. 14, the best performing/scoring new candidate MHDN mutators (e.g., MHDN mutators that may produce the most fit MHDN candidate(s)) may be applied in subsequent iterations of learned MHDN mutator generation, wherein the updated learned MHDN mutators may be based on checking DNS information of previously evaluated new candidate MHDN mutators (e.g., at step 1450).

MAGMA may learn and/or remember in terms of MHDN creation techniques, which may be normalized and/or generalized to be applicable to different inputs, for example, what MAGMA learns from generating and/or evaluating potential MHDNs of an input that may be a popular brand likely to be targeted by malicious actors. For example, "google", may be similarly applicable to generating high-quality potential MHDNs (e.g., potential MHDNs with relatively high evaluation function scores) of other popular brands likely to be targeted by malicious actors, such as "apple" or "microsoft". MAGMA may improve its performance upon its execution (e.g., every time it is executed). When MAGMA learns MHDN creation techniques, information about the techniques may be provided to MHDN detectors and/or Inverse-MHDN solutions (which may use the information to improve their performance). For example, MAGMA may comprise one or more training procedures/modes in which groups of base domain names are collectively (e.g., in series or in parallel) trained, wherein the groups comprise one or more common characteristics (e.g., well known technology companies such as Google and Microsoft; news organizations such as CNN and MSNBC; educational organizations such as colleges and continuing education programs; etc.). Such groups may be associated with a common set of MHDN mutators that may be based on the particular one or more common characteristics of the group of base domain names. Results from this training (e.g., MHDN mutators, DNA strands, potential MHDNs, fitness values, etc.) on a common group of domain names may be used, for example, in one or more application procedures/modes in which the training results are applied to a new base domain name (or a plurality of new base domain names), such as described with respect to steps 731-736, step 740A, step 740B, and/or step 740D.

MAGMA may be efficient in the sense that an evaluation function, and/or fitness function, which may comprise relatively expensive subfunctions, such as for example a time-consuming DNS query, may be selectively applied to only a subset of the candidates (e.g., the highest quality candidates) in a current population. Such efficiencies may be necessary because, for example, within the available time and computer resource constraints, it may be impractical to issue DNS queries for each candidate in a population that may have a large number (e.g., 10,000-100,000) of candidates in each evolutionary cycle, when each DNS query may require a 20-120 msec roundtrip, when there may be many evolutionary cycles, and/or when upstream DNS resolvers may apply throttling to limit the rate of DNS query requests from the same source.

MAGMA may be predictive in the sense that MAGMA may find MHDNs that are already registered or recorded in the DNS and/or may generate high quality potential MHDNs that are not yet registered or recorded in the DNS but that malicious actors may be likely to register or record in DNS.

One or more differentiating traits may result in MAGMA outputs (e.g., lists comprised of potential MHDNs) that may enable various examples described herein for protecting customers' enterprise networks from MHDN-vectored threats and/or attacks.

MAGMA may identify MHDNs preemptively. For example, MAGMA may identify already-existing MHDNs (e.g., MHDNs registered or recorded in the DNS by one or more malicious actors) that may be imitating a CSaaS provider's subscriber(s)/customer(s) before they are ever used to deceive the customers or the customers' users (e.g., business partners). These MHDNs may be included in CTI feeds that may be sent/published to, or consumed by, subscribers to the CTI feeds. Subscribers may include a CSaaS provider's customers and/or their associated packet-filtering device(s). The packet-filtering device(s) may be configured with packet-filtering rules derived from this CTI on MHDNs. Using these packet-filtering rules, a CSaaS provider's customers' networks may be protected from associated MIDN-vectored threats and/or attacks. For example, a CSaaS provider's customer that may have its MHDNs in CTI may be protected from spear phishing attacks on its employees. These MHDNs may be added to one or more (e.g., any) caches that may be accessed by any MHDN detectors and/or Inverse-MHDN solutions (for example, to assist in avoiding unnecessary re-computing and/or re-detecting an MHDN that has already been identified as such).

MAGMA may discover MHDNs. For example, MAGMA may discover MHDNs that may not be associated with a CSaaS provider's customers, for example MHDNs of a popular trusted brand that may not be a subscriber to the CSaaS provider's service, and these MHDNs may be similarly included in CTI feeds that may be provided/sent to, or consumed by, subscribers to the CTI feeds. Subscribers may comprise the CSaaS provider's customers and their associated packet-filtering device(s). The packet-filtering device(s) may be configured with packet-filtering rules derived from this MHDN CTI. Using these packet-filtering rules, the CSaaS provider's customers' networks may be protected from associated MHDN-vectored threats and/or attacks. For example, some or all of the CSaaS provider's customers' users may be protected from phishing attacks associated with these MHDNs. These MHDNs may be added to one or more (e.g., any) caches that may be accessed by any MHDN detectors and/or Inverse-MHDN solutions (e.g., to assist in avoiding unnecessary re-computing and/or re-detecting an MHDN that has already been identified as such).

MAGMA may register or record MHDNs. A CSaaS provider's customers may be protected from future threats by registering or recording the best unregistered or unrecorded potential MHDNs that MAGMA outputs if/when the MAGMA input may comprise a CSaaS provider's customer's domain name (e.g., a primary domain name label, or PDNL). This protection may be because MAGMA learns and applies the MHDN creation methods of malicious actors, and/or because its output is not limited to MHDNs that are already registered or recorded in DNS. This operation may help prevent malicious actors from registering or recording these MHDNs in DNS and then launching threats and/or attacks vectored by these MHDNs. A CSaaS provider may detect if/when malicious actors may query the DNS for the existence of these MHDNs, for example, by controlling authoritative name servers associated with these MHDNs. IP addresses of the packets comprising the DNS query requests may represent cyber threat intelligence on the malicious actor(s). Accordingly, the IP addresses may be included in a CTI feed and/or published/sent to subscribers (e.g., CSaaS provider customers and/or associated packet-filtering devices), which may use such CTI to protect their networks from these malicious actors.

MAGMA may be applied to one or more organizations that may not be CSaaS provider customers but that may have a common interest in protecting their networks from cyber threats and/or attacks. For example, members of a vertical Information Sharing and Analysis Center (ISAC) industry consortium, such as the Financial Services ISAC (FS-ISAC—see www.fsisac.com), may be dedicated to reducing cyber-risk in the global financial system. MAGMA may be used to discover the MHDNs associated with the members of the FS-ISAC, and these MHDNs may then be included in CTI feeds that may be published/sent to the FS-ISAC (and/or to possibly other subscribers to the CTI feeds). The FS-ISAC may provide the CTI feeds to the consortium members and/or their customers to use in protecting their networks from MHDN-vectored attacks. These MHDNs may be added to one or more (e.g., any) caches that may be accessed by any MHDN detectors and/or Inverse-MHDN solutions (e.g., to assist in avoiding unnecessary re-computing and/or re-detecting an MHDN that may have already been identified as such).

One or more other considerations may be taken into account in effecting the disclosed MAGMA systems and methods. Not all of the "fittest" candidates in MAGMA's population may actually correspond to currently registered domain names in the DNS. Part of MAGMA's purpose and/or utility may be to preempt malicious actors by predicting MHDNs that the malicious actors may be likely to register or record in the DNS in the future for use in MHDN-vectored threats and/or attacks. MAGMA may have/use a mode, such as an "apply" mode and/or "quick" mode, that may be intended as a tool for use by CSaaS (e.g., CSAAS 140) cybersecurity analysts, that may apply all MAGMA DNA currently in memory to a given base, and/or that may check a result from such an application against the DNS (e.g., DNS 170) and/or one or more databases of domain names that may be in the DNS. For example, one or more application procedures/modes may be applied in an "apply" mode and/or "quick" mode during which training results (e.g., output from one or more training modes) may be applied to one or more new base domain names (e.g., such as described with respect to steps 731-736, step 740A, step 740B, and/or step 740D).

Figure 15:
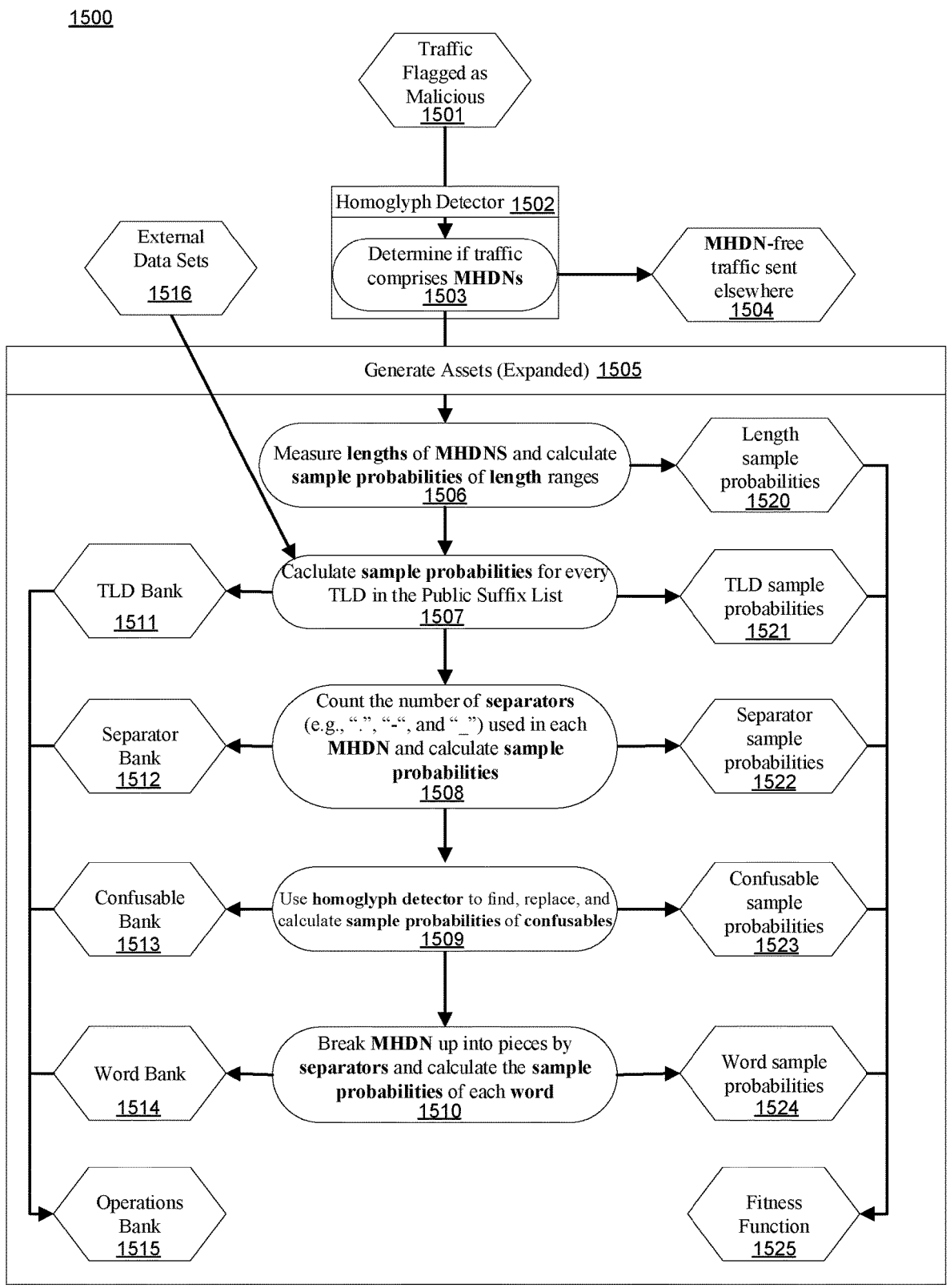
FIG. 15 shows an example for MHDN detection and/or generation, in accordance with one or more aspects of the disclosure.

FIG. 15 shows an example 1500 for MHDN detection and/or generation. The example 1500 may comprise one or more operations/devices described herein for MHDN detection, and/or one or more operations/devices of the example 1500 may be applied to any MHDN detection operation/device described herein. Additionally or alternatively, the example 1500 may comprise one or more operations/devices described herein for MHDN generation, and/or one or more operations/devices of the example 1500 may be applied to any MHDN generation operation/device described herein.

Traffic may be flagged as (potentially) malicious (1501). For example, a threat event log may be received that may comprise an indication of one or more packets of traffic being potentially malicious and/or comprising a domain name of a potentially malicious actor (e.g., an MHDN). Homoglyph detector/detection 1502 may receive the traffic flagged as (potentially) malicious. At step 1503, homoglyph detector/detection 1502 may determine if/whether traffic comprises one or more MHDNs. For example, homoglyph detector/detection 1502 may comprise any MHDN detector/detection operation described here (e.g., such as the method(s)/device(s) described with respect to FIG. 3A, FIG.

3B, and/or FIGS. 3C-3D). At step 1504, traffic determined to be MHDN-free traffic may be sent elsewhere, such as for further processing by a cybersecurity application and/or by a cyberanalyst. Traffic determined to comprise (or potentially comprise) one or more MHDNs may be applied as an input for asset generation. Asset generator/generation 1505 may generate one or more assets for use in determining one or more MHDNs and/or one or more candidate MHDNs. For example, asset generator/generation 1505 may comprise any MHDN asset generator/generation operation described herein (e.g., such as the method(s)/device(s) described with respect to FIG. 7A, FIGS. 7B-7C, and/or FIGS. 7D-7E).

Steps 1506-1510 may collectively determine/calculate/generate sample probabilities 1520-1524, banks 1511-1515, operations bank 1515, and/or fitness function 1525. Sample probabilities may be the probabilities of operation results. For example, for TLDs, words, confusables, and/or lengths, sample probability may be item-by-item (e.g., "com" may have a sample probability, "admin" may have a sample probability, "o to 0" may have a sample probability, "length between 8 and 16" may have a sample probability, etc.). As another example, for separators, sample probability may correspond to a number of uses of item per real MHDN, such as "2 dots in the domain name," may have a sample probability, etc. A maximum probability may comprise a sample probability of a least frequently used technique. A minimum probability may be used to assign a sample probability to a technique that may be technically possible but that may not yet be observed in practice, such as a TLD (that may not have been seen in an actual MHDN but is still in the Public Suffix List, a length longer or shorter than has been seen previously, etc.). Any other type of sample probability may be used for the sample probabilities 1520-1524 referenced herein.

At step 1506, lengths of one or more MHDNs may be measured and/or sample probabilities of length ranges may be determined/calculated/generated. A length of domain name may comprise (or correspond to) a number of UTF-8 characters in the domain name. For example, each length range of a domain name may have an associated probability of the domain name being an MHDN. For example, a domain name comprising a length range greater than a threshold value may have an associated probability of being an MHDN that may be less than an associated probability of another domain name, comprising a length range less than the threshold value, of being an MHDN. Length sample probabilities may be determined/provided/stored (1520).

At step 1507, sample probabilities for TLDs may be determined/calculated/generated. The sample probabilities for TLDs may be determined for every TLD in a Public Suffix List. For example, when creating MHDNs, malicious actors may be more likely to use some TLDs than other different TLDs. TLDs may comprise the rightmost label in a domain name, such as "com" and/or "net". The Internet Governance Forum (IGF) manages most TLDs. In this context, TLD may additionally or alternatively mean an eTLD, which may comprise multi-subdomain TLDs that may correspond to the Public Suffix List. The sample probabilities for TLDs may be based on one or more external data sets that may be received as input(s) (1516). The one or more external data sets may comprise one or more of: a public suffix list (e.g., the Public Suffix List), a confusables list, customer names, and/or any other data and/or data set (such as any data described and/or referenced to herein). A public suffix list may comprise a list of all known (e)TLDs that may help generate one or more of MAGMA's assets. Any (e)TLD on the public suffix list that is not included in an actual MHDN detected by an MHDN detector (such as that described herein) may be assigned a minimum probability. A confusables list may comprise a list of confusable characters, and/or groups of characters, that may be used/useful in creating (potential) MHDN(s). An MHDN detector/Inverse-MHDN process, as described herein, may detect confusables in part because it may maintain a list of possible confusables. An MHDN generator, such as MAGMA, may use a list of confusable characters to create candidates during evolution. The MAGMA confusables list may be augmented with usage probabilities that MAGMA may derive from information received from MHDN detectors/Inverse-MHDN processes. Customer names may comprise a list of a CSaaS's (e.g., CSAAS 140's) subscribers/customers' domain names (e.g., PDNLs, FQDNs, BDNs), which may be used/usable as base(s) for generating potential MHDNs. The potential MHDNs may be used to prevent malicious actors from abusing CSaaS' (e.g., CSAAS 140's) subscribers/customers' domain names in MHDN-vectored threats and/or attacks. TLD sample probabilities may be determined/provided/stored (1521). A TLD bank 1511 may be determined/generated. The TLD bank 1511 may be determined/generated based on the sample probabilities for the TLDs. For example, each TLD in the TLD bank 1511 may comprise an associated probability in the TLD samples probabilities 1521.

At step 1508, separators used in each MHDN may be counted and/or separator sample probabilities may be determined/calculated/generated. For example, each separator and/or location of a separator (e.g., splitting words, in between words, before TLD, after TLD, etc.) in a domain name may have an associated probability of the domain name being an MHDN. For example, a domain name comprising a separator (e.g., "-") in between a base word (e.g., "micro-soft") may have an associated probability of being an MHDN that may be greater than an associated probability of another domain name, that may comprise a separator after a TLD (e.g., "microsoft-support"), of being an MHDN. A separator may comprise any valid delimiting character in a valid domain name, such as ".", "-", and "_". Separator sample probabilities may be determined/provided/stored (1522). A separator bank 1512 may be determined/generated. The separator bank 1512 may be determined/generated based on the separator sample probabilities. For example, each separator in the separator bank 1512 may comprise an associated probability in the separator sample probabilities 1522.

At step 1509, sample probabilities of confusables may be determined/calculated/generated. For example, a homoglyph detector/detection may find, replace, and/or calculate sample probabilities of confusables. A confusable may be or comprise a character (and/or collection of characters) visually similar to another character (and/or collection of characters), such as number "1" for letter "l" or two letters "nn" for one letter "m". As used herein, homoglyphic characters may comprise confusables. For example, confusables are examples of known malicious homoglyphic characteristics. For example, each confusable in a domain name may have an associated probability of the domain name being an MHDN. For example, a domain name comprising a confusable (e.g., "nn") in a misspelled work (e.g., "nnicrosoft") may have an associated probability of being an MHDN that may be greater than an associated probability of another domain name, that may comprise a confusable (e.g., "nn") in a word spelled correctly (e.g., "announce"), of being an MHDN. As another example, a domain name comprising a confusable (e.g., "nn") in a correctly spelled word (e.g., "annex") but that is similar to another word that comprises an inverse of the confusable (e.g., "m") in another correctly spelled word (e.g., "amex" such as may refer to American Express) may have an associated probability of being an MHDN that may be greater than an associated probability of another domain name, that may also comprise a confusable (e.g., "nn") in a correctly spelled word (e.g., "announce") but that may not be similar to any other correctly spelled word comprising an inverse of the confusable (e.g., "m"), of being an MHDN. A similarity between a word and/or a segment of an input domain name (e.g., a potential MHDN and/or an MHDN) and a word and/or segment of a non-MHDN or likely non-MHDN may be based on a maximum Levenshtein distance. A maximum Levenshtein distance may be a tunable parameter, as described herein. A maximum Levenshtein distance may comprise a maximum Levenshtein distance between a query and a "match" in a lookup backend. "Levenshtein distance" may be defined as a number of changes (e.g., removal, addition, substitution, etc.) required to turn one string into another. For example, the Levenshtein distance between the strings "example" and "oxamples" would be two. Past this maximum, the Levenshtein distance may be pegged to the length of the string with which search sets are queried. Some processes may be particularly sensitive to this parameter. If it is too small, it may have a reduced ability to find important words in strings in the presence of errors, such as finding "example" in "example.com". Larger values of the maximum distance may incur a heavy performance cost, which may make this larger value ideal for some applications that can pay the cost in return for better results. Larger values still may actually decrease a quality of the results (in addition to being potentially impractical to run due to extremely high performance costs). For example, for a machine analyst in a cybersecurity application (such as Centripetal's AI Analyst™) it may be advantageous to trade off between the accuracy of an engine and the increase in computation time. To accomplish this, the maximum Levenshtein distance may be increased to a value such as one or two. One or more weight parameters may benefit from re-tuning to try to mitigate the number of false positives to have the most effective cost function. For example, for a cybersecurity gateway application (such as Centripetal's RuleGATE®) it may be advantageous to prioritize the speed of computation, even if it results in a tradeoff of decreasing the accuracy. To accomplish this, one may set the maximum Levenshtein distance to a value of zero, which is considered exact matching. In such a manner, it may be advantageous to retune weight parameters to try to mitigate the number of false positives to have the most effective cost function.

Confusable sample probabilities may be determined/provided/stored (1523). A confusable bank 1513 may be determined/generated. The confusable bank 1513 may be determined/generated based on the confusable sample probabilities. For example, each confusable in the confusable bank 1513 may comprise an associated probability in the confusable sample probabilities 1523.

At step 1510, one or more MHDNs may be broken/segmented/divided into pieces/segments by separators and/or sample probabilities of each word (and/or segment) may be determined/calculated/generated. For example, each word and/or segment of a domain name may have an associated probability of the domain name being an MHDN. For example, a domain name comprising what may appear to be a misspelled word (e.g., "supprt") may have an associated probability of being an MHDN that may be different from an associated probability of another domain name, that may comprise a similar word/segment spelled correctly (e.g., "support"), of being an MHDN. A word/segment may comprise any run of characters that may be (frequently) found in at least one real MHDN, or an actual MHDN (such as subdomains like "www", "admin", and "support") after splitting that MHDN on all valid separators. Word sample probabilities may be determined/provided/stored (1524). A word bank 1514 may be determined/generated. The word bank 1514 may be determined/generated based on the word sample probabilities. For example, each word in the word bank 1514 may comprise an associated probability in the word sample probabilities 1524.

An operations bank 1515 may be determined/generated based on one or more of the TLD bank, the separator bank 1512, the confusable bank, the word bank 1514, and/or any other bank. For example, the operations bank 1515 may comprise one or more operations that use, as one or more variables, data from the one or more banks 1511-1514. MAGMA may use such MHDN creation methods and/or techniques to generate operations and insert them in the operations bank 1515. The MHDN creation methods and/or techniques that may be included in the operations bank 1515 may comprise information on MHDN creation methods and/or techniques that may be used by malicious actors to create actual MHDNs. Such information may be provided by Inverse-MHDN processes (such as described herein) which may include such information in one or more of their outputs.

A fitness function 1525 may be determined/generated based on one or more of the length sample probabilities 1520, TLD sample probabilities 1521, separator sample probabilities 1522, confusable sample probabilities 1523, word sample probabilities, and/or any other sample probability/probabilities. For example, the fitness function 1525 may comprise one or more functions that use, as one or more variables, the one or more sample probabilities 1520-1524.

Any of steps 1503, 1506, 1507, 1508, 1509, and/or 1510 may be performed by one or more computing devices. Any of steps 1503, 1506, 1507, 1508, 1509, and/or 1510, while shown sequentially, may be performed in a different order (e.g., during, before, and/or after any of the other steps of FIG. 15), and/or may be optionally performed (e.g., skipped) and/or repeated. The operations bank 1515 may comprise one or more of TLD bank 1511, separator bank 1512, confusable bank 1513, word bank 1514, and/or any other bank(s). For example, each of the banks 1511-1514 may be optional, and/or one or more additional banks may be included within and/or for application and/or determination of the operations bank 1515. The fitness function 1525 may be based on one or more of length sample probabilities 1520, TLD sample probabilities 1521, separator sample probabilities 1522, confusable sample probabilities 1523, word sample probabilities, and/or any other probability/probabilities. Each of the probabilities 1520-1524 may be optional, and/or one or more additional probabilities may be included for application and/or determination of the fitness function 1525.

One or more parameters for operations and/or functions described herein may be variable and/or may be weighted by one or more variables. For example, an operations bank (e.g., operations bank 725 and/or operations bank 1515), a fitness function (e.g., fitness function 724 and/or fitness function 1525), and/or a cost function (e.g., cost function described with respect to step 343) may comprise one or more variable (and/or variably weighted) parameters. A customer type may be a tunable parameter, as described herein. For example, a customer type may be weighted. A weight of a customer type may correspond to a cost incurred during optimization, for example, if a segment matches a value in a customer domain data set (e.g., "$C_C$"). For example, the string "examplecustomer" may be given a cost of $C_C$. A popular type may be a tunable parameter, as described herein. A popular type may be weighted. For example, a weight of a popular type may correspond to a cost incurred during optimization, for example, if a segment matches a value in a popular domains data set, (e.g., "$C_P$"). For example, the string "Fruit" may be given a cost of "$C_P$". An English type may be a tunable parameter, as described herein. For example, an English type may be weighted. A weight of English type may correspond to a cost incurred during optimization, for example, if a segment matches a value in an English word data set (e.g., "$C_E$"). For example, the string "castle" may be given a cost of "$C_E$". A TLD type may be a tunable parameter, as described herein. For example, a TLD type may be weighted. A weight of a TLD type may correspond to a cost incurred during optimization, for example, if a segment matches a value in a TLD data set. A TLD may be distinct from "eTLDs", such that TLDs may be a subset of eTLDs. A number of slices may be a tunable parameter, as described herein. For example, a number of slices may be weighted. A weight of a number of slices may correspond to a multiplier on a cost incurred, for example, based on a number of segments in a particular segmentation. Larger numbers of segments may cost more than smaller numbers of segments. A weight of a Levenshtein distance may be a tunable parameter, as described herein. For example, a Levenshtein distance may be weighted. A weight of a Levenshtein distance may correspond to a multiplier on a cost incurred by a large Levenshtein distance between a segment and a closest string in lookup data.

A computing device may perform a method comprising multiple operations. The computing device may receive an input domain name for homoglyphic domain name detection. The computing device may generate a normalized character string corresponding to the input domain name by applying one or more normalization operations to the input domain name, wherein the one or more normalization operations may be configured to reduce homoglyphic characteristics in the input domain name. The computing device may generate a plurality of segmentations of the normalized character string, wherein generating each segmentation, of the plurality of segmentations, may comprise segmenting the normalized character string into a respective plurality of segments, and wherein each segmentation comprises a different plurality of segments. The computing device may select a first segmentation, of the plurality of segmentations, based on cost values corresponding to each respective segmentation determined using a cost function. The computing device may compare the selected first segmentation with at least one list of known domain names to determine whether one or more segments of the selected first segmentation match a base of a known domain name in the at least one list of known domain names. The computing device may determine that the input domain name is a homoglyphic domain name based on a determination that the one or more segments of the selected first segmentation match a base of a known domain name in the at least one list of known domain names. The computing device may send, based on the determination that the input domain name is a homoglyphic domain name, an indication that the input domain name has been detected as a homoglyphic domain name. The computing device may generate the normalized character string by at least one of: replacing at least one non-English language letter in the input domain name with at least one corresponding English language letter; replacing a number in the input domain name with a corresponding letter; or replacing a capitalized letter in the input domain name with a corresponding lowercase letter. The computing device may generate the normalized character string by: removing, from the input domain name, an effective top-level domain (eTLD); replacing one or more confusable characters with one or more corresponding American Standard Code for Information Interchange (ASCII) characters; and removing, from the input domain name, non-ASCII-compatible text. The computing device may: determine, for each segmentation of the plurality of segmentations, the respective cost values, wherein the cost function may be configured to assign a cost value to a given segmentation based on a likelihood that the plurality of segments of the given segmentation occur in the at least one list of known domain names. The cost function may be configured to assign a cost value to a given segmentation based on a watchlist of known words associated with cybersecurity vulnerabilities. The cost function may be configured to assign a cost value to a given segmentation based on at least one of: a list of known words, a list of popular words associated with domain names, or a list of popular domain names. The cost function may be configured to assign a cost value to a given segmentation based on at least one of: a watchlist of domain names associated with a protected customer. The at least one list of known domain names may comprise at least one of: a list of popular domains; or a watchlist of domain names associated with a protected customer. The indication may comprise the input domain name and at least one of: one or more segments of the selected first segmentation, or the normalized character string. The indication may comprise metadata corresponding to a likelihood that the input domain name is a malicious homoglyphic domain name (MHDN). The computing device may determine whether the input domain name is a malicious homoglyphic domain name (MHDN) based on: determining that the input domain name imitates a corresponding known domain name, of the at least one list of known domain names, based on a known malicious homoglyphic characteristic. The computing device may determine that the input domain name imitates a corresponding known domain name by: determining a likelihood that the input domain name is an MHDN based on a fitness function generated based on a plurality of known MHDNs; and determining that the likelihood that the input domain name is an MHDN satisfies a threshold likelihood. The computing device may, before generating the normalized character string, determine that the input domain name is in an acceptable format for homoglyphic domain name detection, wherein the acceptable format may be based on at least one of: the input domain name being absent from the at least one list of known domain names; or the input domain name satisfying a maximum length requirement. The computing device may receive the input domain name by receiving a domain name system (DNS) query request comprising the input domain name. The computing device may send the indication that the input domain name has been detected as a homoglyphic domain name by sending the indication in response to the DNS query request. The computing device may detect the input domain name in an electronic communication on a protected customer network. The computing device may also perform one or more additional operations. The computing device may comprise one or more processors; and memory storing instructions that, when executed by the one or more processors, cause the computing device to perform the described method, additional operations, and/or include additional elements. A system may comprise the computing device configured to perform the described method, additional operations, and/or include additional elements; a second computing device configured to communicate with the computing device; and/or one or more networks. The computing device may comprise any computing device described herein (e.g., such as shown in FIG. 1 and/or FIG. 2). The one or more networks may comprise any network described herein (e.g., such as shown in FIG. 1 and/or FIG. 2).

A computing device may perform a method comprising multiple operations. The computing device may receive training data comprising a plurality of known MHDNs, wherein each known MHDN of the plurality of known MHDNs is a domain name that comprises at least one homoglyphic characteristic such that a respective known MHDN imitates another domain name. The computing device may generate, based on the training data, a set of operations for use in generating the one or more potential MHDNs, wherein each operation of the set of operations may be configured to modify a base domain name according to a respective homoglyphic characteristic. The computing device may generate a first candidate mutator, wherein the first candidate mutator may comprise one or more first operations selected from the set of operations. The computing device may generate a first candidate MHDN, using the first candidate mutator, by applying the one or more first operations of the first candidate mutator to a first base domain name. The computing device may determine a first fitness value corresponding to a likelihood of the first candidate MHDN being an actual MHDN. The computing device may, based on determining that the first fitness value satisfies a first threshold fitness, determine whether the first candidate MHDN is resolvable by a domain name system (DNS) based on whether the DNS includes a record corresponding to the first candidate MHDN. The computing device may, based on the first fitness value and the determination of whether the first candidate MHDN is resolvable by the DNS, send the first candidate MHDN to a cybersecurity application. The one or more first operations, of the first candidate mutator, comprise at least one of: a replacement operation that was generated based on the training data indicating a first homoglyphic characteristic corresponding to one or more characters and one or more homoglyphic replacement characters in at least one known MHDN, wherein the computing device may generate the first candidate MHDN based on applying the replacement operation to change one or more characters of the first base domain name to a corresponding one or more homoglyphic replacement characters; a character addition operation that was generated based on the training data indicating a second homoglyphic characteristic corresponding to one or more added characters in at least one known MHDN, wherein the computing device may generate the first candidate MHDN based on applying the character addition operation to add the one or more added characters to the first base domain name; or a character removal operation that was generated based on the training data indicating a third homoglyphic characteristic corresponding to one or more removed characters in at least one known MHDN, wherein the computing device may generate the first candidate MHDN based on applying the character removal operation to remove the one or more removed characters from the first base domain name. The training data set may comprise information indicating one or more known homoglyphic characteristics, wherein the computing device may generate the set of operations further based on the known homoglyphic characteristics. The training data set may comprise information indicating known confusable character pairs, wherein the computing device may generate the set of operations further based on the known confusable character pairs. The computing device may generate the set of operations by using a machine learning model configured to determine corresponding operations associated with homoglyphic characteristics of the plurality of known MHDNs. The computing device may generate the first candidate mutator by selecting an operation, from the set of operations, as part of the one or more first operations based on: a frequency of occurrence of a first homoglyphic characteristic, corresponding to a selected operation, among the homoglyphic characteristics corresponding to the plurality of known MHDNs. The computing device may generate the first candidate mutator by selecting an operation, from the set of operations, as part of the one or more first operations based on: a confusable rating of a second homoglyphic characteristic, corresponding to the selected operation, wherein the confusable rating may be determined based on a likelihood of a domain name having the second homoglyphic characteristic being confused with another domain name. The computing device may generate the first candidate mutator by selecting at least two operations as the one or more first operations. The computing device may select the at least two operations based on determining that each of the at least two operations are complementary operations, wherein the at least two operations may be determined to be complementary operations based on: determining a first probability that a potential MHDN, generated by applying the at least two operations in combination to the base domain name, is likely to be confused with another domain name; and determining one or more second probabilities that one or more potential MHDNs, generated by applying the at least two operations separately to the base domain name, is likely to be confused with another domain name, wherein the computing device may determine the at least two operations to be complementary operations based on the first probability exceeding a combination of the one or more second probabilities. The first candidate mutator may comprise one or more indications of the one or more first operations. The computing device may apply the one or more first operations to the first base domain name by: translating the one or more indications into one or more functional steps respectively corresponding to the one or more first operations; and performing the one or more functional steps to modify the first base domain name. The computing device may generate, based on the plurality of known MHDNs in the training data, a fitness function for use in evaluating one or more potential MHDNs, wherein the fitness function may be configured to indicate a likelihood of a candidate MHDN being an actual MHDN based on homoglyphic characteristics indicated by the training data set, wherein the computing device may determine the first fitness value based on the fitness function. The training data set may comprise information indicating one or more known homoglyphic characteristics. The computing device may generate, based on the known homoglyphic characteristics, a fitness function for use in evaluating one or more potential MHDNs, wherein the fitness function may be configured to indicate a likelihood of a candidate MHDN being an actual MHDN, wherein the computing device may determine the first fitness value based on the fitness function. The first fitness value may correspond to a combination of respective probabilities associated with each of a plurality of portions of the first candidate MHDN. The computing device may update the first fitness value based on the determining whether the first candidate MHDN is resolvable by the DNS, wherein the computing device may send the first candidate MHDN based on determining that the updated first fitness value satisfies a second threshold fitness, wherein the second threshold fitness may be greater than the first threshold fitness. The computing device may send the first candidate MHDN based on a determination that the first candidate MHDN is resolvable by the DNS. The computing device may send the first candidate MHDN, based on the first fitness value being greater than a second threshold fitness, after determining that the first candidate MHDN is not resolvable by the DNS. The computing device may select the at least two operations based on a type of modification corresponding to each of the at least two operations, wherein the type of modification corresponding to a respective operation comprises one of: replacing one or more characters; adding one or more characters; or removing one or more characters. The computing device may select the at least two operations based on determining that each of the at least two operations have a same type of modification. The computing device may select the at least two operations based on determining that each of the at least two operations have a different type of modification from each other operation in the at least two operations. The computing device may also perform one or more additional operations. The computing device may comprise one or more processors; and memory storing instructions that, when executed by the one or more processors, cause the computing device to perform the described method, additional operations, and/or include additional elements. A system may comprise the computing device configured to perform the described method, additional operations, and/or include additional elements; a second computing device configured to communicate with the computing device; and/or one or more networks. The computing device may comprise any computing device described herein (e.g., such as shown in FIG. 1 and/or FIG. 2). The one or more networks may comprise any network described herein (e.g., such as shown in FIG. 1 and/or FIG. 2).

A computing device may perform a method comprising multiple operations. The computing device may receive training data comprising a plurality of known MHDNs, wherein each known MHDN of the plurality of known MHDNs is a domain name that comprises at least one homoglyphic characteristic such that a respective known MHDN imitates another domain name. The computing device may generate, based on the training data, a set of operations for use in generating the one or more potential MHDNs. Each operation of the set of operations may be configured to modify a base domain name according to a respective homoglyphic characteristic. The computing device may generate a first candidate mutator, wherein the first candidate mutator may comprise one or more first operations selected from the set of operations. The computing device may generate a first candidate MHDN, using the first candidate mutator, by applying the one or more first operations of the first candidate mutator to a first base domain name. The computing device may determine a first fitness value corresponding to a likelihood of the first candidate MHDN being an actual MHDN. The computing device may, based on determining that the first fitness value satisfies a first threshold fitness, determine whether the first candidate MHDN is resolvable by a domain name system (DNS) based on whether the DNS includes a record corresponding to the first candidate MHDN. The computing device may, based on the first fitness value and the determination of whether the first candidate MHDN is resolvable by the DNS, generate one or more second candidate MHDNs by applying the one or more first operations of the first candidate mutator to one or more second base domain names. The computing device may send the one or more second candidate MHDNs to a cybersecurity application. The training data set comprises information indicating one or more known homoglyphic characteristics, wherein the computing device may generate the set of operations further based on the known homoglyphic characteristics. The computing device may generate, based on the plurality of known MHDNs in the training data, a fitness function for use in evaluating one or more potential MHDNs. The fitness function may be configured to indicate a likelihood of a candidate MHDN being an actual MHDN based on homoglyphic characteristics indicated by the training data set. The computing device may determine the first fitness value based on the fitness function. The training data set may comprise information indicating one or more known homoglyphic characteristics. The computing device to may generate, based on the known homoglyphic characteristics, a fitness function for use in evaluating one or more potential MHDNs, wherein the fitness function may be configured to indicate a likelihood of a candidate MHDN being an actual MHDN. The computing device may determine the first fitness value based on the fitness function. The computing device may update the first fitness value based on the determining whether the first candidate MHDN is resolvable by the DNS. The computing device may send the first candidate MHDN based on determining that the updated first fitness value satisfies a second threshold fitness, wherein the second threshold fitness is greater than the first threshold fitness. The computing device may also perform one or more additional operations. The computing device may comprise one or more processors; and memory storing instructions that, when executed by the one or more processors, cause the computing device to perform the described method, additional operations, and/or include additional elements. A system may comprise the computing device configured to perform the described method, additional operations, and/or include additional elements; a second computing device configured to communicate with the computing device; and/or one or more networks. The computing device may comprise any computing device described herein (e.g., such as shown in FIG. 1 and/or FIG. 2). The one or more networks may comprise any network described herein (e.g., such as shown in FIG. 1 and/or FIG. 2).

A computing device may perform a method comprising multiple operations. The computing device may receive training data comprising a plurality of known MHDNs, wherein each known MHDN of the plurality of known MHDNs may be a domain name that may comprise at least one homoglyphic characteristic such that a respective known MHDN imitates another domain name. The computing device may generate, based on the training data, a set of operations for use in generating the one or more potential MHDNs, wherein each operation of the set of operations may be configured to modify a base domain name according to a respective homoglyphic characteristic. The computing device may generate a first candidate mutator, wherein the first candidate mutator comprises one or more first operations selected from the set of operations. The computing device may generate a first candidate MHDN, using the first candidate mutator, by applying the one or more first operations of the first candidate mutator to a first base domain name. The computing device may determine a first fitness value corresponding to a likelihood of the first candidate MHDN being an actual MHDN. The computing device may generate one or more second candidate MHDNs by applying the one or more first operations of the first candidate mutator to one or more second base domain names. The computing device may send the one or more second candidate MHDNs to a cybersecurity application. The computing device may also perform one or more additional operations. The computing device may comprise one or more processors; and memory storing instructions that, when executed by the one or more processors, cause the computing device to perform the described method, additional operations, and/or include additional elements. A system may comprise the computing device configured to perform the described method, additional operations, and/or include additional elements; a second computing device configured to communicate with the computing device; and/or one or more networks. The computing device may comprise any computing device described herein (e.g., such as shown in FIG. 1 and/or FIG. 2). The one or more networks may comprise any network described herein (e.g., such as shown in FIG. 1 and/or FIG. 2).

A computing device may perform a method comprising multiple operations. The computing device may receive training data comprising a plurality of known MHDNs, wherein each known MHDN of the plurality of known MHDNs may be a domain name that comprises at least one homoglyphic characteristic such that a respective known MHDN imitates another domain name. The computing device may generate, based on the training data, a set of operations for use in generating the one or more potential MHDNs, wherein each operation of the set of operations may be configured to modify a base domain name according to a respective homoglyphic characteristic. The computing device may generate a first candidate mutator, wherein the first candidate mutator may comprise one or more first operations selected from the set of operations. The computing device may generate a first candidate MHDN, using the first candidate mutator, by applying the one or more first operations of the first candidate mutator to a first base domain name. The computing device may determine a first fitness value corresponding to a likelihood of the first candidate MHDN being an actual MHDN. The computing device may, based on determining that the first fitness value satisfies a threshold fitness, generate a second candidate mutator, comprising one or more second operations, based on the first candidate mutator by: modifying at least one operation of the one or more first operations, adding at least one operation to the one or more first operations, or removing at least one operation from the one or more first operations. The computing device may generate a second candidate MHDN, using the second candidate mutator, by applying the one or more second operations of the second candidate mutator to a first base domain name. The computing device may determine a second fitness value corresponding to a likelihood of the second candidate MHDN being an actual MHDN. The computing device may, based on determining that the second fitness value satisfies a second threshold fitness, send the second candidate MHDN to a cybersecurity application. The computing device may determine a second fitness value corresponding to a likelihood of the second candidate MHDN being an actual MHDN. The computing device may, based on determining that the second fitness value satisfies a second threshold fitness, determine whether the second candidate MHDN is resolvable by a domain name system (DNS) based on whether the DNS includes a record corresponding to the second candidate MHDN. The computing device may, based on the second fitness value and the determination of whether the second candidate MHDN is resolvable by the DNS, send the second candidate MHDN to a cybersecurity application. The computing device may determine a second fitness value corresponding to a likelihood of the second candidate MHDN being an actual MHDN. The computing device may, based on determining that the second fitness value satisfies a threshold fitness, generate one or more third candidate MHDNs by applying the one or more second operations of the second candidate mutator to one or more second base domain names. The computing device may send the one or more third candidate MHDNs to a cybersecurity application. The computing device may generate the set of operations by using a machine learning model configured to determine corresponding operations associated with homoglyphic characteristics of the plurality of known MHDNs. The computing device may generate, based on the plurality of known MHDNs in the training data, a fitness function for use in evaluating one or more potential MHDNs, wherein the fitness function is configured to indicate a likelihood of a candidate MHDN being an actual MHDN based on homoglyphic characteristics indicated by the training data set. The computing device may determine the first fitness value based on the fitness function. The training data set may comprise information indicating one or more known homoglyphic characteristics. The computing device may generate, based on the known homoglyphic characteristics, a fitness function for use in evaluating one or more potential MHDNs, wherein the fitness function may be configured to indicate a likelihood of a candidate MHDN being an actual MHDN. The computing device may determine the first fitness value based on the fitness function. The first candidate mutator may comprise one or more indications of the one or more first operations. The computing device may apply the one or more first operations to the first base domain name by: translating the one or more indications into one or more functional steps respectively corresponding to the one or more second operations, and performing the one or more functional steps. The second candidate mutator may comprise one or more indications of the one or more second operations. The computing device may apply the one or more second operations to the first base domain name by: translating the one or more indications into one or more functional steps respectively corresponding to the one or more second operations, and performing the one or more functional steps. The computing device may send the one or more second candidate MHDNs, based on the first fitness value being greater than a second threshold fitness, after determining that the one or more second candidate MHDNs is not resolvable by a domain name system (DNS) based on the DNS not including a record corresponding to the one or more second candidate MHDNs. The computing device may also perform one or more additional operations. The computing device may comprise one or more processors; and memory storing instructions that, when executed by the one or more processors, cause the computing device to perform the described method, additional operations, and/or include additional elements. A system may comprise the computing device configured to perform the described method, additional operations, and/or include additional elements; a second computing device configured to communicate with the computing device; and/or one or more networks. The computing device may comprise any computing device described herein (e.g., such as shown in FIG. 1 and/or FIG. 2). The one or more networks may comprise any network described herein (e.g., such as shown in FIG. 1 and/or FIG. 2).

A computing device may perform a method comprising multiple operations. The computing device may receive training data comprising a plurality of known MHDNs, wherein each known MHDN of the plurality of known MHDNs may be a domain name that comprises at least one homoglyphic characteristic such that a respective known MHDN imitates another domain name. The computing device may generate, based on the training data, a set of operations for use in generating the one or more potential MHDNs. Each operation of the set of operations may be configured to modify a base domain name according to a respective homoglyphic characteristic. The computing device may generate, based on the training data, a fitness function for use in evaluating one or more potential MHDNs. The fitness function may be configured to indicate a likelihood of a candidate MHDN being an actual MHDN based on the homoglyphic characteristics of the training data set. The computing device may generate a first candidate mutator, wherein the first candidate mutator may comprise one or more first operations of the set of operations. The computing device may generate a first candidate MHDN, using the first candidate mutator, by applying the one or more first operations of the first candidate mutator to a first base domain name. The computing device may determine, using the fitness function, a first fitness value of the first candidate MHDN. The computing device may, based on determining that the first fitness value satisfies a threshold fitness, send the first candidate MHDN to a cybersecurity application. The computing device may, based on determining that the first fitness value satisfies the threshold fitness, determine whether the first candidate MHDN is resolvable by a domain name system (DNS) based on whether the DNS includes a record corresponding to the first candidate MHDN. The computing device may also perform one or more additional operations. The computing device may comprise one or more processors; and memory storing instructions that, when executed by the one or more processors, cause the computing device to perform the described method, additional operations, and/or include additional elements. A system may comprise the computing device configured to perform the described method, additional operations, and/or include additional elements; a second computing device configured to communicate with the computing device; and/or one or more networks. The computing device may comprise any computing device described herein (e.g., such as shown in FIG. 1 and/or FIG. 2). The one or more networks may comprise any network described herein (e.g., such as shown in FIG. 1 and/or FIG. 2).

A computing device may perform a method comprising multiple operations. The computing device may generate a first set of candidate mutators. Each candidate mutator of the first set of candidate mutators may comprise a respective one or more first operations selected from a set of operations. Each operation of the set of operations may be configured to modify a base domain name according to a respective homoglyphic characteristic. The computing device may generate first candidate MHDNs, using the first set of candidate mutators, by applying the one or more first operations of each respective candidate mutator to a first base domain name. The computing device may determine, for each first candidate MHDN, a fitness value corresponding to a likelihood of the first candidate MHDN being an actual MHDN. The fitness values may be determined using a fitness function generated based on one or more known homoglyphic characteristics. The computing device may select a subset of the first set of candidate mutators based on the determined fitness values for the corresponding first candidate MHDNs. The computing device may generate a second set of candidate mutators comprising the selected subset of the first set of candidate mutators and a second plurality of mutators. Each mutator of the second plurality of mutators may be generated based on modifying a respective candidate mutator of the selected subset of the first set of candidate mutators. Modifying the respective candidate mutator may comprise: modifying at least one operation of the respective candidate mutator; adding at least one operation to the respective candidate mutator, or removing at least one operation from the respective candidate mutator. The computing device may generate second candidate MHDNs, using the second set of candidate mutators, by applying the operations of each respective candidate mutator to the first base domain name. The computing device may determine, for each second candidate MHDN, a fitness value corresponding to a likelihood of the second candidate MHDN being an actual MHDN. The fitness values may be determined using the fitness function. The computing device may iteratively generate and evaluate further sets of candidate mutators based on a prior set of candidate mutators until a stopping criteria is met. The computing device may, based on determining that the stopping criteria is met, output one or more candidate mutators of a current set of candidate mutators for use in generating potential MHDNs. Stopping criteria may comprise at least one of: a maximum number of iterations; or a threshold fitness value. The computing device may select the one or more mutators of the current set of candidate mutators for use in generating potential MHDNs based on determining that a fitness value of respective candidate MHDNs corresponding to the one or more mutators exceed a threshold fitness value. The computing device may also perform one or more additional operations. The computing device may comprise one or more processors; and memory storing instructions that, when executed by the one or more processors, cause the computing device to perform the described method, additional operations, and/or include additional elements. A system may comprise the computing device configured to perform the described method, additional operations, and/or include additional elements; a second computing device configured to communicate with the computing device; and/or one or more networks. The computing device may comprise any computing device described herein (e.g., such as shown in FIG. 1 and/or FIG. 2). The one or more networks may comprise any network described herein (e.g., such as shown in FIG. 1 and/or FIG. 2).

A computing device may perform a method comprising multiple operations for generation of one or more potential malicious homoglyphic domain names (MHDNs). The computing device may generate a first set of candidate mutators, wherein each candidate mutator of the first set of candidate mutators may comprise a respective one or more first operations selected from a set of operations. Each operation of the set of operations may be configured to modify a base domain name according to a respective homoglyphic characteristic. The computing device may generate first candidate MHDNs, using the first set of candidate mutators, by applying the one or more first operations of each respective candidate mutator to a first base domain name. The computing device may determine, for each first candidate MHDN, a fitness value corresponding to a likelihood of the first candidate MHDN being an actual MHDN. The fitness values may be determined using a fitness function generated based on one or more known homoglyphic characteristics. The computing device may select a subset of the first set of candidate mutators based on the determined fitness values for the corresponding first candidate MHDNs. The computing device may generate a second set of candidate mutators comprising the selected subset of the first set of candidate mutators and a second plurality of mutators, wherein each mutator of the second plurality of mutators may be generated based on modifying a respective candidate mutator of the selected subset of the first set of candidate mutators. Modifying the respective candidate mutator may comprise at least one of: modifying at least one operation of the respective candidate mutator, adding at least one operation to the respective candidate mutator, or removing at least one operation from the respective candidate mutator. The computing device may generate second candidate MHDNs, using the second set of candidate mutators, by applying the operations of each respective candidate mutator to the first base domain name. The computing device may determine, for each second candidate MHDN, a fitness value corresponding to a likelihood of the second candidate MHDN being an actual MHDN. The fitness values may be determined using the fitness function. The computing device may iteratively generate and evaluate further sets of candidate mutators based on the prior set of candidate mutators until a stopping criteria is met. The computing device may, based on determining that the stopping criteria is met, output one or more candidate mutators of a current set of candidate mutators for use in generating potential MHDNs. The stopping criteria may comprise at least one of: a maximum number of iterations, or a threshold fitness value. The computing device may select the one or more mutators of the current set of candidate mutators for use in generating potential MHDNs based on determining that a fitness value of respective candidate MHDNs corresponding to the one or more mutators exceed a threshold fitness value.

A computing device may perform a method comprising multiple operations. The computing device may determine a homoglyphic domain name. The computing device may determine an association between a trusted domain name and the homoglyphic domain name. The homoglyphic domain name detection process may use at least one metric. The at least one metric may comprise a cost function. The computing device may determine, based on the association, to block access to the homoglyphic domain name. The computing device may perform a homoglyphic domain name detection process. The computing device may comprise a packet-filtering device. The computing device may determine the homoglyphic domain name by identifying, inline, the homoglyphic domain name. The computing device may identify the homoglyphic domain name by using a packet filtering device. The computing device may also perform one or more additional operations. The computing device may comprise one or more processors; and memory storing instructions that, when executed by the one or more processors, cause the computing device to perform the described method, additional operations, and/or include additional elements. A system may comprise the computing device configured to perform the described method, additional operations, and/or include additional elements; a second computing device configured to communicate with the computing device; and/or one or more networks. The computing device may comprise any computing device described herein (e.g., such as shown in FIG. 1 and/or FIG. 2). The one or more networks may comprise any network described herein (e.g., such as shown in FIG. 1 and/or FIG. 2).

A computing device may perform a method comprising multiple operations. The computing device may determine a list of trusted domain names. The computing device may generate, based on determining that a generated domain name exceeds a threshold similarity with a trusted domain name from the list of trusted domain names, a homoglyphic domain name. The computing device may send the homoglyphic domain name for review. The computing device may also perform one or more additional operations. The computing device may comprise one or more processors; and memory storing instructions that, when executed by the one or more processors, cause the computing device to perform the described method, additional operations, and/or include additional elements. A system may comprise the computing device configured to perform the described method, additional operations, and/or include additional elements; a second computing device configured to communicate with the computing device; and/or one or more networks. The computing device may comprise any computing device described herein (e.g., such as shown in FIG. 1 and/or FIG. 2). The one or more networks may comprise any network described herein (e.g., such as shown in FIG. 1 and/or FIG. 2).

A computing device may perform a method comprising multiple operations. The computing device may determine a trusted domain name. The computing device may generate, using a genetic algorithm, a list of homoglyphic domain names based on the trusted domain name. The genetic algorithm may be a self-training algorithm. The computing device may generate the list of homoglyphic domain names by evaluating potential homoglyphic domain names using a fitness function. The computing device may evaluate the list of homoglyphic domain names by determining a number of resolvable domain names within the list of homoglyphic domain names. The computing device may generate a list of trusted domain names, comprising the trusted domain name, using information provided by a homoglyphic domain name detector. The information may comprise information associated with one or more operators to create homoglyphic domain names. The computing device may also perform one or more additional operations. The computing device may comprise one or more processors; and memory storing instructions that, when executed by the one or more processors, cause the computing device to perform the described method, additional operations, and/or include additional elements. A system may comprise the computing device configured to perform the described method, additional operations, and/or include additional elements; a second computing device configured to communicate with the computing device; and/or one or more networks. The computing device may comprise any computing device described herein (e.g., such as shown in FIG. 1 and/or FIG. 2). The one or more networks may comprise any network described herein (e.g., such as shown in FIG. 1 and/or FIG. 2).

A computing device may perform a method comprising multiple operations. The computing device may generate a domain name. The computing device may determine that the generated domain name exceeds a threshold similarity with a trusted domain name from a list of trusted domain names. The computing device may determine, based on exceeding the threshold similarity, that the generated domain name is a homoglyphic domain name. The computing device may receive one or more packets. The computing device may detect the homoglyphic domain name in the one or more packets. The computing device may determine, based on detecting the homoglyphic domain names in the one or more packets, to block access to the homoglyphic domain name. The computing device may also perform one or more additional operations. The computing device may comprise one or more processors; and memory storing instructions that, when executed by the one or more processors, cause the computing device to perform the described method, additional operations, and/or include additional elements. A system may comprise the computing device configured to perform the described method, additional operations, and/or include additional elements; a second computing device configured to communicate with the computing device; and/or one or more networks. The computing device may comprise any computing device described herein (e.g., such as shown in FIG. 1 and/or FIG. 2). The one or more networks may comprise any network described herein (e.g., such as shown in FIG. 1 and/or FIG. 2).

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

What is claimed is:

1. A computing device for malicious homoglyphic domain name (MHDN) detection, wherein the computing device comprises:
    one or more processors; and
    memory storing instructions that, when executed by the one or more processors, cause the computing device to:
        receive a feed comprising a plurality of domain names, wherein the feed comprises domain names that have been assigned a low confidence level of being a cyberthreat;
        generate, by inputting each domain name from the feed into an MHDN detection process, a second feed comprising one or more MHDNs, wherein the MHDN detection process comprises:
            generating a normalized character string corresponding to an input domain name by applying one or more normalization operations to the input domain name, wherein the one or more normalization operations are configured to reduce homoglyphic characteristics in the input domain name;
            selecting a best segmentation of the normalized character string, based on evaluating one or more segmentations against a threshold cost value, wherein the selecting is further based on at least one list of known domain names;
            comparing the selected best segmentation with bases of known domain names in the at least one list of known domain names to determine whether one or more segments of the selected best segmentation correspond to a base of a known domain name in the at least one list of known domain names;
            determining that the input domain name is an MHDN if the one or more segments of the selected best segmentation correspond to a base of a known domain name in the at least one list of known domain names; and
            based on a determination that the input domain name is an MHDN, adding the input domain name to the second feed; and
        output, based on adding, during the MHDN detection process, at least one input domain name to the second feed, the second feed, wherein the second feed comprises one or more MHDNs.

2. The computing device of claim 1, wherein the feed comprises a cyberthreat intelligence feed.

3. The computing device of claim 1, wherein the plurality of domain names comprise newly registered domain names.

4. The computing device of claim 1, wherein the instructions, when executed by the one or more processors, cause the computing device to generate the normalized character string by at least one of:
    replacing at least one non-English language letter in the input domain name with at least one corresponding English language letter;
    replacing a number in the input domain name with a corresponding letter; or
    replacing a capitalized letter in the input domain name with a corresponding lowercase letter.

5. The computing device of claim 1, wherein selecting the best segmentation of the normalized character string comprises selecting, from a plurality of segmentations of the normalized character string, the best segmentation based on cost values corresponding to each respective segmentation determined using a cost function, wherein the cost function is configured to assign a cost value to a given segmentation based on the at least one list of known domain names.

6. The computing device of claim 1, wherein selecting the best segmentation of the normalized character string comprises iteratively generating the one or more segmentations by:
    generating, based on the at least one list of known domain names, a first segmentation of the normalized character string as a current segmentation, wherein generating the first segmentation comprises segmenting the normalized character string into a respective plurality of segments;

determining a cost value for the current segmentation by using a cost function; and if the cost value corresponding to the current segmentation satisfies the threshold cost value, select the current segmentation as the best segmentation, and if the cost value corresponding to the current segmentation does not satisfy the threshold cost value, generating a next segmentation of the normalized character string based on the at least one list of known domain names.

7. The computing device of claim 1, wherein the at least one list of known domain names comprises at least one of:
a list of popular domains; or
a watchlist of domain names associated with one or more protected customers.

8. The computing device of claim 1, wherein the instructions, when executed by the one or more processors, cause the computing device to output the second feed by:
sending the second feed to a security operations center, or
sending the second feed to a training database.

9. The computing device of claim 1, wherein outputting the second feed causes generation of one or more packet filtering rules based on the one or more MHDNs.

10. The computing device of claim 1, wherein the instructions further cause the computing device to generate the normalized character string by:
removing, from the input domain name, an effective top-level domain (eTLD);
replacing one or more confusable characters with one or more corresponding American Standard Code for Information Interchange (ASCII) characters; and
removing, from the input domain name, non-ASCII-compatible text.

11. A method for malicious homoglyphic domain name detection, wherein the method comprises:
receiving, by a computing device, a feed comprising a plurality of domain names, wherein the feed comprises domain names that have been assigned a low confidence level of being a cyberthreat;
generating, by inputting each domain name from the feed into an MHDN detection process, a second feed comprising one or more MHDNs, wherein the MHDN detection process comprises:
generating a normalized character string corresponding to an input domain name by applying one or more normalization operations to the input domain name, wherein the one or more normalization operations are configured to reduce homoglyphic characteristics in the input domain name;
selecting a best segmentation of the normalized character string, based on evaluating one or more segmentations against a threshold cost value, wherein the selecting is further based on at least one list of known domain names;
comparing the selected best segmentation with bases of known domain names in the at least one list of known domain names to determine whether one or more segments of the selected best segmentation correspond to a known domain name in the at least one list of known domain names;
determining that the input domain name is an MHDN if the one or more segments of the selected best segmentation correspond to a base of a known domain name in the at least one list of known domain names; and based on a determination that the input domain name is an MHDN, adding the input domain name to the second feed; and
outputting, based on adding, during the MHDN detection process, at least one input domain name to the second feed, the second feed, wherein the second feed comprises one or more MHDNs.

12. The method of claim 11, wherein the feed comprises a cyberthreat intelligence feed.

13. The method of claim 11, wherein the plurality of domain names comprise newly registered domain names.

14. The method of claim 11, wherein generating the normalized character string comprises at least one of:
replacing at least one non-English language letter in the input domain name with at least one corresponding English language letter;
replacing a number in the input domain name with a corresponding letter; or
replacing a capitalized letter in the input domain name with a corresponding lowercase letter.

15. The method of claim 11, wherein selecting the best segmentation of the normalized character string comprises selecting, from a plurality of segmentations of the normalized character string, the best segmentation based on cost values corresponding to each respective segmentation determined using a cost function, wherein the cost function is configured to assign a cost value to a given segmentation based on the at least one list of known domain names.

16. The method of claim 11, wherein selecting the best segmentation of the normalized character string comprises iteratively generating the one or more segmentations by:
generating, based on the at least one list of known domain names, a first segmentation of the normalized character string as a current segmentation, wherein generating the first segmentation comprises segmenting the normalized character string into a respective plurality of segments;
determining a cost value for the current segmentation by using a cost function; and
if the cost value corresponding to the current segmentation satisfies the threshold cost value, select the current segmentation as the best segmentation, and
if the cost value corresponding to the current segmentation does not satisfy the threshold cost value, generating a next segmentation of the normalized character string based on the at least one list of known domain names.

17. The method of claim 11, wherein the at least one list of known domain names comprises at least one of:
a list of popular domains; or
a watchlist of domain names associated with one or more protected customers.

18. The method of claim 11, wherein the outputting the second feed comprises:
sending the second feed to a security operations center, or
sending the second feed to a training database.

19. The method of claim 11, wherein outputting the second feed causes generation of one or more packet filtering rules based on the one or more MHDNs.

20. The method of claim 11, wherein generating the normalized character string further comprises:
removing, from the input domain name, an effective top-level domain (eTLD);
replacing one or more confusable characters with one or more corresponding American Standard Code for Information Interchange (ASCII) characters; and removing, from the input domain name, non-ASCII-compatible text.

21. One or more non-transitory computer-readable media having instructions stored thereon for homoglyphic domain name detection that, when executed by one or more computing devices, cause the computing devices to:
  receive a feed comprising a plurality of domain names, wherein the feed comprises domain names that have been assigned a low confidence level of being a cyberthreat;
  generate, by inputting each domain name from the feed into an MHDN detection process, a second feed comprising one or more MHDNs, wherein the MHDN detection process comprises:
    generating a normalized character string corresponding to an input domain name by applying one or more normalization operations to the input domain name, wherein the one or more normalization operations are configured to reduce homoglyphic characteristics in the input domain name;
    selecting a best segmentation of the normalized character string, based on evaluating one or more segmentations against a threshold cost value, wherein the selecting is further based on at least one list of known domain names;
    comparing the selected best segmentation with bases of known domain names in the at least one list of known domain names to determine whether one or more segments of the selected best segmentation correspond to a base of a known domain name in the at least one list of known domain names;
    determining that the input domain name is an MHDN if the one or more segments of the selected best segmentation correspond to a base of a known domain name in the at least one list of known domain names; and
    based on a determination that the input domain name is an MHDN, adding the input domain name to the second feed; and
  output, based on adding, during the MHDN detection process, at least one input domain name to the second feed, the second feed, wherein the second feed comprises one or more MHDNs.

22. The one or more non-transitory computer-readable media of claim 21, wherein the feed comprises a cyberthreat intelligence feed.

23. The one or more non-transitory computer-readable media of claim 21, wherein the plurality of domain names comprise newly registered domain names.

24. The one or more non-transitory computer-readable media of claim 21, wherein the instructions, when executed by the one or more computing devices, further cause the computing devices to generate the normalized character string by at least one of:
  replacing at least one non-English language letter in the input domain name with at least one corresponding English language letter;
  replacing a number in the input domain name with a corresponding letter; or
  replacing a capitalized letter in the input domain name with a corresponding lowercase letter.

25. The one or more non-transitory computer-readable media of claim 21, wherein selecting the best segmentation of the normalized character string comprises selecting, from a plurality of segmentations of the normalized character string, the best segmentation based on cost values corresponding to each respective segmentation determined using a cost function, wherein the cost function is configured to assign a cost value to a given segmentation based on the at least one list of known domain names.

26. The one or more non-transitory computer-readable media of claim 21, wherein selecting the best segmentation of the normalized character string comprises iteratively generating the one or more segmentations by:
  generating, based on the at least one list of known domain names, a first segmentation of the normalized character string as a current segmentation, wherein generating the first segmentation comprises segmenting the normalized character string into a respective plurality of segments;
  determining a cost value for the current segmentation by using a cost function; and
  if the cost value corresponding to the current segmentation satisfies the threshold cost value, select the current segmentation as the best segmentation, and
  if the cost value corresponding to the current segmentation does not satisfy the threshold cost value, generating a next segmentation of the normalized character string based on the at least one list of known domain names.

27. The one or more non-transitory computer-readable media of claim 21, wherein the at least one list of known domain names comprises at least one of:
  a list of popular domains; or
  a watchlist of domain names associated with one or more protected customers.

28. The one or more non-transitory computer-readable media of claim 21, wherein the instructions, when executed by the one or more computing devices, cause the computing devices to output the second feed by:
  sending the second feed to a security operations center, or sending the second feed to a training database.

29. The one or more non-transitory computer-readable media of claim 21, wherein outputting the second feed causes generation of one or more packet filtering rules based on the one or more MHDNs.

30. The one or more non-transitory computer-readable media of claim 21, wherein the instructions, when executed by the one or more computing devices, further cause the computing devices to generate the normalized character string by:
  removing, from the input domain name, an effective top-level domain (eTLD);
  replacing one or more confusable characters with one or more corresponding American Standard Code for Information Interchange (ASCII) characters; and
removing, from the input domain name, non-ASCII-compatible text.

* * * * *